US006516355B1

(12) United States Patent
Hartmann et al.

(10) Patent No.: US 6,516,355 B1
(45) Date of Patent: Feb. 4, 2003

(54) METHODS AND APPARATUS FOR CONTROLLING DIGITAL COMMUNICATIONS SWITCHING EQUIPMENT

(75) Inventors: Curtis Hartmann, Branford, CT (US); Osman Ali Duman, Shelton, CT (US)

(73) Assignee: ADC Newnet, Inc., Minnetonka, MN (US)

( * ) Notice: Subject to any disclaimer, the term of this patent is extended or adjusted under 35 U.S.C. 154(b) by 1102 days.

(21) Appl. No.: 08/662,077

(22) Filed: Jun. 12, 1996

Related U.S. Application Data

(63) Continuation-in-part of application No. 08/555,040, filed on Nov. 8, 1995.

(51) Int. Cl.[7] ................................................ G06F 9/54
(52) U.S. Cl. ........................ 709/317; 709/328; 379/269
(58) Field of Search ................................ 395/680, 683; 379/269; 709/317

(56) References Cited

U.S. PATENT DOCUMENTS

| | | | | | |
|---|---|---|---|---|---|
| 4,853,956 | A | * | 8/1989 | Astmann | 379/269 |
| 5,062,103 | A | * | 10/1991 | Davidson et al. | 370/58.1 |
| 5,542,070 | A | * | 7/1996 | LeBlanc et al. | 703/20 |
| 5,546,584 | A | * | 8/1996 | Lundin et al. | 709/315 |
| 5,691,973 | A | * | 11/1997 | Ramstrom et al. | 379/252 |

OTHER PUBLICATIONS

Radford, John, "Implementing a Real–Time, Embedded, Telecommunication Switching System in Smalltalk," OOPSLA '95, pp. 77–82.*

Orfali et al., "Essential Client/Server Survival Guide", Van Nostrand Reinhold, pp. 341, 344, 345, 348, 349, 422, 423.*

* cited by examiner

*Primary Examiner*—St. John Courtenay, III
(74) *Attorney, Agent, or Firm*—Pennie & Edmonds LLP

(57) ABSTRACT

A "generic" switch messaging protocol is disclosed for message handling and switch supervision in conjunction with a number of switching engines, each of which is conversant with the generic messaging protocol, each switching engine also being conversant with a specific switch messaging protocol. An object oriented development system is also disclosed utilizing a "generic" switch messaging protocol and a plurality of switching engines, each of which is conversant with the generic messaging protocol and each of which is conversant with a specific switch messaging protocol. Certain switch messages are not "genericized" because their functionality is different from the functionality of other switches. These messages generally include initialization and maintenance messages which are hardware specific and have no counterpart in another switch from a different vendor. In order to handle these messages, specific data files are provided in the switching engine for automatic download to the switch as well as a specific MML for interpreting configuration commands. Also, according to the invention, some commands or messages which are not otherwise supported by a particular switch can nevertheless be supported in the API by providing the switch engine with the intelligence to combine native switch messages to "emulate" a functionality which is not directly provided by the switch.

15 Claims, 3 Drawing Sheets

METHODS AND APPARATUS FOR CONTROLLING DIGITAL COMMUNICATIONS SWITCHING EQUIPMENT

This application is a continuation-in-part of application Ser. No. 08/555,040 filed Nov. 8, 1995 entitled System Permitting User Defined Managed Objects for Configuration of Telecommunications Equipment, the complete disclosure of which is incorporated by reference herein.

BACKGROUND OF THE INVENTION

1. Field of the Invention

The invention relates to high capacity digital telecommunications switches which are controlled by a host. More particularly, the invention relates to compatible methods for controlling otherwise incompatible digital telecommunications switches as well as apparatus incorporating the methods.

2. State of the Art

Modern telecommunications systems utilize high capacity digital switching systems to process calls and effect different types of telecommunications. These switches are typically built in a modular form utilizing a bus and a plurality of modular cards which are mounted in racks and slots. A typical switch is the LNX-2000 from Excel, Inc., Sagamore Beach, Mass. Prior art FIG. 1 shows the general physical configuration of the LNX-2000 and prior art FIG. 2 shows a general block circuit diagram illustrating a bus and a plurality of modular cards.

Referring now to FIGS. 1 and 2, the digital switch 10 includes a rack 12 having slots 14*a*–14*t* which are associated with a bus 16. Typically, a redundant bus 16*a* is also provided as a back-up should the bus 16 fail for any reason. The first two slots 14*a*, 14*b* are usually reserved for a power supply 18 and a redundant power supply 18*a*. The last two slots 14*s*, 14*t* are usually reserved for a switch matrix CPU 20 and a redundant switch matrix CPU 20*a*. Each matrix CPU is provided with a respective control link 22, 22*a* for connection to a host 40. The control links are usually RS-232 serial links Each matrix CPU may also be provided with a reference clock port (not shown). The other slots are provided for modular cards 24, 26, 28, 30, and 32*a–k*, for example. The cards may provide access telecommunications channels, provide telecommunications signalling, or provide other telecommunications services. For example, card 24 shown in FIG. 2 provides a 192-channel T1 interface Card 26 provides a 256-channel E1 interface. Card 28 provides a 24-channel ISDN Primary Rate interface. Card 30 provides digital signal processing such as tone generation, tone reception, digital voice recording and playback, etc. It will be appreciated that some of the interface cards will rely on functions of other cards in order to execute certain telecommunications functions. In general, each of the cards will rely on the matrix CPU for intelligent control of their basic functions. In addition, the T1 interfaces and the E1 interfaces may cooperate to provide conversions. The ISDN interfaces will rely on the T1 or E1 interfaces for B channel access. The DSP cards may be called upon by all of the interface cards to generate appropriate signalling tones.

Each of the cards in switch 10 is typically configured to operate in a user definable manner. Configuration of the cards is effected by the host 40 which sends configuration data to the matrix CPU 20 (20*a*) which in turn remembers the configuration data for each card in the switch. In addition, the matrix CPU contains system software which is downloaded to it by the host. The system software governs the basic switch operation. Call processing activities are controlled by the host which remains in communication with the matrix CPU so long as the switch is in service.

Typical switch configuration commands issued by the host to the switch (the matrix CPU) include: resetting line cards, changing the service state of a card (placing it in and out of service), resetting the matrix CPU, downloading system software to the matrix CPU, setting the system time, system network synchronization, assigning logical span IDs, changing a channel service state, changing a channel configuration, changing a trunk type configuration (defining the signalling protocol for a particular channel or group of channels), changing a start dialing signalling protocol, configuring timers and filters (for signalling), busying out trunks, setting answer supervision mode(for each channel), setting release modes for a channel, setting call setup inpulsing parameters. Once configured, the switch remains configured until a card or the matrix CPU is reset, or until a change in service dictates changing one or more of the configuration parameters. For example, if new trunks are added or new cards are added, additional configuration will be required. Usually, the configuration data is saved as a file by the host and downloaded to the matrix CPU together with system software if the switch is reset.

Typical ongoing communication between the switch (the matrix CPU) and the host includes call processing, control of tone generation and reception, and call progress analysis. Call processing relates to how the switch handles incoming and outgoing calls and includes the functions of call setup, cross connections, inseize/outseize call control, incoming call setup, inseize control instructions, outgoing call setup, outseize control instructions and connection management. Tone generation control includes defining tone specifications, tone detection, digit collection, tone generation, outpulsing setup, and generating tones for prompting and call status information (e.g. dial tones and busy signals). Call progress analysis is generally used when originating a call to the PSTN and includes the functions of invoking the analysis, designing the analysis, configuring global parameters and cadence pattern parameters, setting pattern defaults and pattern ID5 and setting class and tone group defaults.

The LNX 2000 Switch provides a host messaging protocol and specific message formats for communication between a host and the switch. Other switches provide their own host messaging protocols which deal with similar activities but which have different message formats. Thus, a host must be programmed in one way to control one brand of switch and in a different way to control another brand of switch. That is, different switches use different hardware components and therefore respond to different message sets. For example, the Summa 4 SDS Series of switches includes a Network Bus Controller Card, a Bus Repeater Card, a Direct Inward Dial Card, an E&N Trunk Card, a Subscriber Line Interface Card, a Universal Trunk Card, a Digital Conference Card, among others. These cards require different messages for configuration and operation than the coards mentioned above with regard to the LNX 2000 Switch. Moreover, the SDS Series utilizes its own Unix-based command language which is different from the command language used by the LNK 2000 Switch.

Parent application Ser. No. 08/555,040 discloses an object oriented development system for the configuration of telecommunications equipment including one or more digital telecommunications switches. FIG. 3 illustrates a graphical representation of the structure of the development system.

The development system includes an object server 50 having at least one man/machine interface (MMI) agent 52, an object server 54 with predefined managed objects 56 and a database management library 58, a server applications programmer interface (API) 60 coupled to the MMI and the object server for hiding the internal architecture of the object services from the MMI agent with respect to the managed objects 56, and means for permitting the developer to create and define user-defined managed objects 57 which utilize the database management library and the database which stores managed object related data, and which does not require the server API to be rewritten. The server applications programmer interface (API) is organized and designed in a manner such that the user defined objects are automatically supported by the API. Predefined managed objects are initialized at start-up before the initialization of the user-defined objects. The development environment allows for the rapid development and deployment of new telecommunications services using combinations of predefined managed objects and user defined managed objects. The managed objects can include hardware such as shelf, rack, board, switch, signalling, etc., service software such as call processing triggers and features, configuration software such as rule group and alarm, and user defined objects. As shown in FIG. 3, a hardware object 56*a* is provided to interface with a high speed digital switch so that applications developed in the system 50 can act as a host to the switch. As mentioned above, however, switches from different manufacturers communicate using different protocols. This makes object definition more complicated because the switch signalling and supervision messages of the API of the system 50 must be rewritten to accommodate the protocol of different switches.

SUMMARY OF THE INVENTION

It is therefore an object of the invention to provide a method by which a single API can be used to control a number of switches having different message protocols.

It is also an object of the invention to provide modular switching engines for use with an object oriented development system for the configuration of telecommunications equipment including one or more digital telecommunications switches.

It is another object of the invention to provide an object oriented development system for the configuration of telecommunications equipment including one or more digital telecommunications switches which includes a number of switching engines so that a number of switches utilizing different messaging protocols can be controlled from a single API.

It is still another object of the invention to provide methods and apparatus whereby a single host computer can be used to control a plurality of different switches, each switch having a different messaging protocol.

In accord with these objects which will be discussed in detail below, the methods of the present invention include providing a "generic" switch messaging protocol for message handling and switch supervision and providing a number of switching engines, each of which is conversant with the generic messaging protocol, each switching engine also being conversant with a specific switch messaging protocol. The apparatus according to the invention includes an object oriented development system utilizing a "generic" switch messaging protocol and a plurality of switching engines, each of which is conversant with the generic messaging protocol and each of which is conversant with a specific switch messaging protocol. According to the invention, certain switch messages are not "genericized" because their functionality is different from the functionality of other switches. These messages generally include initialization and maintenance messages which are hardware specific and have no counterpart in another switch from a different vendor. In order to handle these messages, specific data files are provided in the switching engine for automatic download to the switch as well as a specific NML for interpreting configuration commands. Also, according to the invention, some commands or messages which are not otherwise supported by a particular switch can nevertheless be supported in the API by providing the switch engine with the intelligence to combine native switch messages to "emulate" a functionality which is not directly provided by the switch.

Additional objects and advantages of the invention will become apparent to those skilled in the art upon reference to the detailed description taken in conjunction with the provided figures.

BRIEF DESCRIPTION OF THE DRAWINGS AND APPENDICES

Table I is "Access Services~Switching Engine Interface Specification" including its own "Appendix A: Surnma Four Switching Engine Interface Specification" (190 pages total); and Table II is "Excel Switching Engine Interface Specification" (39 pages).

DETAILED DESCRIPTION OF THE PREFERRED EMBODIMENTS

In accord with the present invention, the functionality of a high speed digital switch is divided into four areas: media, in-band signalling, connection, and switch managed objects. Media refers to the ability to generate tones, collect digits, outpulse digits, and play recorded announcements. In-band signalling refers to the ability to perform conventional in-band signalling such as call progress analysis. Connection refers the ability to manage connections such as call processing. Switch managed objects refers to configuring and initializing boards, spans, ports, etc. A generic messaging protocol according to the invention is organized according to the first three of these four areas of functionality. The fourth area of functionality is serviced by a superset of commands which includes commands for configuring and maintaining a variety of switches. A switching engine according to the invention is provided with a media server, an in-band signalling server, a connection server, and a switch managed objects server.

Figure 4:
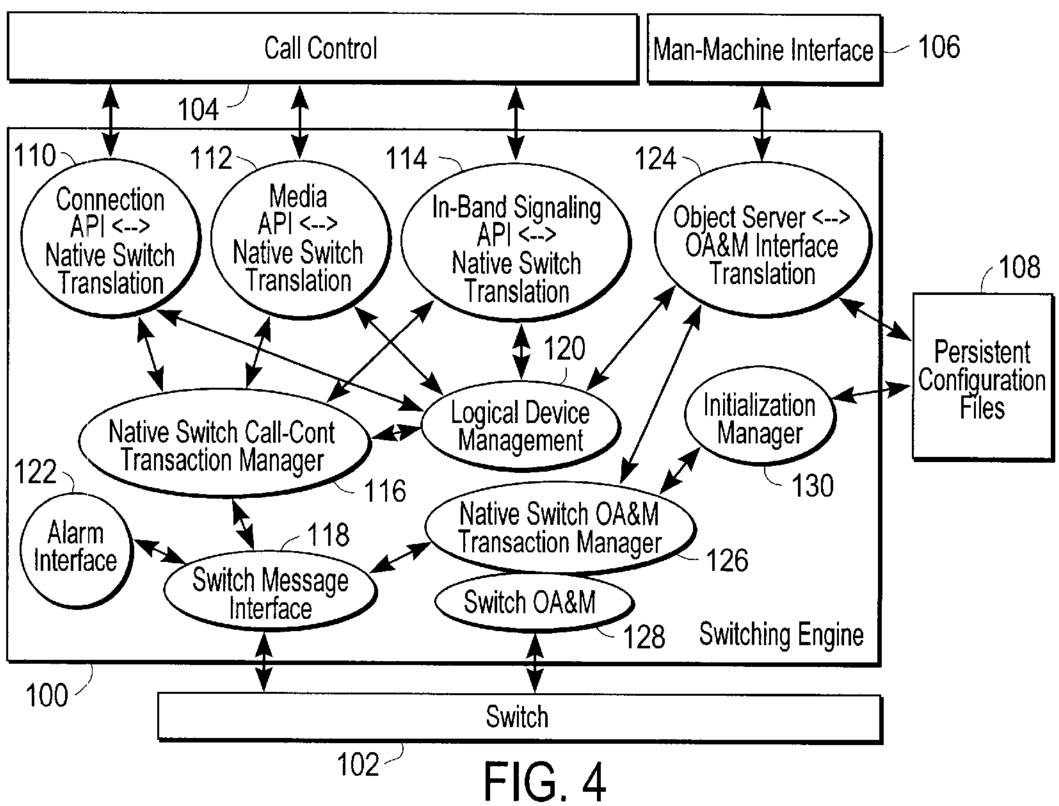
FIG. 4 is a block diagram of a switching engine according to the invention.

Before explaining the specifics of the generic messaging protocol, it is useful to examine first the internal functionality of a switching engine according to the invention. FIG. 4 shows an internal functional diagram of a switching engine 100 according to the invention. It will be appreciated from FIG. 4 that the switching engine 100 communicates on the one hand with a particular brand of switch 102 and on the other hand with the Call Control entity (call processing application) 104 and the Man-Machine Interface 106 of a development system according to the invention which is described in detail below with reference to FIG. 5. The switching engine 100 is also provided with the ability to read from and write to persistent configuration files 108 which are particular to a given switch 102 and which contain configuration and maintenance functions.

Referring now to FIG. 4 in detail, the switching engine 100 is provided with several translators, managers and interfaces. The first three areas of functionality mentioned above are handled by the Call Control entity 104. Therefore, the switching engine 100 is provided with a Connection API translator 110, a Media API translator 112, and an In-band Signalling API translator 114 for communicating with the Call Control entity 104. These translators provide the logic necessary to convert generic messages from the Call Control entity 104 into native messages for the particular switch 102 and to convert native messages from the switch to generic messages which are used by the Call Control 104. Accordingly, these translators communicate with the switch 102 via a Call Control Transaction Manager 116 and a Switch Message Interface 118. The Control Transaction Manager 116 provides the logic necessary to manage API transactions on a per-device basis. In this regard, a Logical Device Management 120 communicates with the Control Transaction 'Manager 116 and each of the translators mentioned above. The Logical Device Management 120 provides the logic necessary to manage per-device information. Finally, the Switch Message Interface 118 provides the logic necessary to communicate with the switching matrix. In this regard, an Alarm Interface 122 communicates with the Switch Message Interface 118 to convert native switch alarms to alarms which can be used by the development system of the invention.

The fourth area of functionality mentioned above is handled by the MMI 106 via a superset of commands which includes configuration and maintenance commands for several switches. Each switching engine 100 is provided with an Object Server Interface Translator 124 which provides the logic necessary to convert object server API messages from the MMI into native switch "operation, administration, and maintenance" (OA&M) messages and to convert native OA&M messages into object server API messages. In order to manage OA&M messages on a per-device basis, the Object Server Interface Translator 124 also communicates with the Logical Device Management 120. Messages to and from the Object Server Interface Translator 124 pass through the Native Switch OA&M Transaction Manager 126 and the Switch OA&M 128 which provide the logic necessary to manage transactions with the switch 102 over an OA&M interface. As mentioned above, some of the OA&M messages for a given switch are stored in data files 108 and are used at the time the switch is initialized. These files are accessed by the Object Server Interface Translator 124 and an Initialization Manager 130, the latter of which provides the logic necessary to initialize the switch on cold start-up.

As mentioned above, the switching engines according to the invention all communicate with a generic message protocol of the invention and each switching engine communicates with a particular brand of digital switch. The diagram in FIG. 4 is a general schematic diagram which applies to each of the several switching engines of the invention. The differences between the switching engines lie in how they deal with the generic messages from the development system of the invention. Therefore, in order to further elaborate on the functionality of each of the switching engines, it is necessary to first explain the generic message protocol.

The generic message protocol is divided into three areas of functionality as described above. For each area of functionality, the invention provides a server interface having a protocol model, message formats and call-control structures, a set of call control primitives, parameter information and protocol for passing parameters, and a call control library.

The In-band Signalling Server Interface

The In-band Signalling Server (IBSS) protocol model includes Request (REQ), Indication (IND), Response (RSP), and Confirmation (CNF). An IBSS_MSQ_REQ primitive is used by the Call Control entity (CCE) when it requires the use of switching engine functionality. An IBSS_MSG_IND primitive is used by the switching engine to notify the CCE of a REQ. An IBSS_MSG_RSP primitive is used by the CCE to acknowledge receipt of an IND. An IBSS_MSG_CNF primitive is used by the switching engine to notify the CCE that REQuested activity has been completed successfully.

The format of IBSS messages includes a header in the form of IBSS_MSG_HDR_S, followed by a variable number of parameters in the form of IBSS_MSG_PRM_S structures stored consecutively, followed by an "end of parameters" indicator. The "C" structure of the header and parameter format is set out in Table I at pages 26–28.

Nineteen call control primitives are provided for the IBSS. These generally include Outseize, Release, Answer, Wink, Flash, Error, Digits, Inseize, and CPA, each coupled with one or more of Request (REQ), Indication (IND), Response (RSP), and Confirmation (CNF) as appropriate. A complete listing of the IBSS call control primitives is set out in Table I at pages 28–34.

Some of the call control primitives utilize parameter information which is set out in Table I at pages 35–36.

The IBSS also provides a call control library to facilitate packing and unpacking of IBSS API messages. Seven library calls are provided, the details of which are set out in Table I at pages 36–45.

The Connection Server Interface

The Connection Server (CONS) protocol model includes Command (CMD), Acknowledge (ACK), Not Acknowledged (NACK), and Indication (IND). A CONS_MSG_CMD primitive is used by the CCE to request the switching engine to construct or tear down a connection. A CONS_MSG_ACK primitive is returned to the CCE by the switching engine to indicate successful processing of a CND. A CONS_MSG_NACK primitive is returned to the CCE by the switching engine to indicate unsuccessful processing of a CND. A CONS_MSG_IND primitive is an autonomous event which indicates whether a logical device is in service or out of service.

The format of CONS messages is CONS_MSG_S in which all header and message specific data is included. The "C" structure of the CONS message format is set out in Table I at pages 50–51.

Seventeen call control primitives are provided for the CONS. These generally include 2 Way Connection (2_WAY_CONN), 1 Way Connection (1_WAY_CONN), Disconnection (DISC), and Persistent Connection (NAIL_UP), each of which is coupled to one of (CND), (ACK), and (NACK). Two autonomous primitives are provided in conjunction with (IND) to indicate in service (CONS_INS_STATE_IND) and out of service (CONS_OOS_STATE_IND). A complete listing of the CONS call control primitives is set out in Table I at pages 52–58.

The CONS also provides a call control library to facilitate packing and unpacking of CONS API messages. The library calls are set out in Table I at pages 60–61.

The Media Server Interface

The Media Server (MEDS) protocol model includes Command (CND), Acknowledge (ACK), Not Acknowledged (NACK), and Indication (IND). A MEDS_MSG_CMD primitive is used by the CCE to request the switching engine to perform a media function. A MEDS_MSG_ACK primitive is returned to the CCE by the switching engine to indicate successful processing of a CMD. A MEDS_MSG_NACK primitive is returned to the CCE by the switching engine to indicate unsuccessful processing of a CMD. A MEDS_MSG_IND is used to notify the CCE that an autonomous event relating to a previous command has occurred.

The format of MEDS messages is MEDS_MSG_S in which all header and message specific data is included. The "C" structure of the MEDS message format is set out in Table I at pages 64–65.

Twenty-six call control primitives are provided for the MEDS. These generally include Connect Tone (CONN_TONE), Disconnect Tone (DISC_TONES), Collect Digits (COLL_DIG), Stop Collecting Digits (STP_DIG_COLL), Outpulse Digits (OUTP_DIG), Connect a Recorded Announcement (CONN_ANN), and Disconnect Announcement (DISC_ANN).

The MEDS_CONN_TONE_CMD primitive is used to generate a variety of tones such as dialtone, ringback, line busy, reorder (fast busy), intercept, and bong. The result of the Connect Tone command is either MEDS_CONN_TONE_ACK or MEDS_CONN_TONE_NACK. Some tones are continuous until Discontinued. Other tones complete autonomously and completion is indicated by MEDS_TONE_CMPLT_IND. The MEDS_COLL_DIG_CMD is used to initiate collection of NP or DTMF digit tones. The result of the Collect Digits command is either MEDS_COLL_DIG_ACK or NEDS_COLL_DIG_NACK. In addition, when digit collection is completed, the autonomous primitive MEDS_COLL_DIGITS_IND issues. If there is an error in collecting digits, the autonomous primitive MEDS_COLL_ERR_IND issues. The other primitives in the MEDS API operate in a similar manner. A complete listing of the MEDS call control primitives is set out in Table I at pages 65–71.

The MEDS also provides a call control library to facilitate packing and unpacking of MEDS API messages. The library calls are set out in Table I at pages 73–74.

Specific Switching Engine Interfaces

As mentioned above, the invention provides a separate switching engine for each brand of digital switch. The switching engines bridge communications between the development system and different switches. Each of the switching engines provides the Servers described above so that the development system communicates with each switching engine in the same manner. Therefore, each switching engine is provided with appropriate translators to convert IBSS, CONS, and MEDS API messages to native switch messages and vice-versa. In addition, each switching engine provides a Managed Object Server which contains all of the logic necessary for the configuration, initialization, and maintenance of a particular type of switch. Utilizing the API described above and the published specifications for an digital switch, one skilled in the art can create a switching engine for use with the development system described herein and in the parent application. The Appendices attached hereto include the specifications for two switching engines according to the invention which are designed to control two popular families of digital switches.

The Surnma Four Switching Engine Interface

The details of the Summa Four Switching Engine Interface are set out in Table I pages 75–215. The Summa Four Family of Specialty Digital Switching (SDS) platforms utilize programmable inpulse/outpulse rules and answer supervision templates for inband signalling, connection commands/reports (voice path control and conference control) for establishing and tearing down connections, voice path control commands for tone signalling, and an SNMP interface for OA&M purposes.

The IBSS implementation in the Summa Four Switching Engine utilizes the SDS programmable inpulse/outpulse rules and answer supervision templates to effect the functionality of the IBSS described above. Each of the IBSS functions are directly supported by corresponding native SDS switch messages. IBSS implementation details are set out in Table I at pages 75–94.

The CONS implementation in the Summa Four Switching Engine utilizes the SDS commands/reports and also provides additional logic to maintain connection status per device so that conference points can be allocated when the need arises. In addition, a per-device transaction state is maintained in order to differentiate between reports which could have multiple meanings. Each of the CONS functions are directly supported by one or more native SDS switch messages. CONS implementation details are set out in Table I at pages 94–111.

The MEDS implementation in the Summa Four Switching Engine utilizes the SDS voice path control to effect the functionality of the MEDS described above. All of the MEDS functions except MEDS_TONE_CMPLT_IND are directly supported by one or more native SDS messages. In the case of the MEDS_TONE_CMPLT_IND primitive, the switching engine starts a timer for certain tones when the MEDS_CONN_TONE_ACK is returned. When the time expires, the NEDS_TONE_CMPLT_IND primitive is returned. MEDS implementation details are set out in Table I at pages 111–135.

The Object Server in the Summa Four Switching Engine utilizes tables in the SDS management information database (MIB). Each managed object in the Object Server is equivalent to an individual table in the MIB. When a configuration command is entered into the MML command interpreter (of the development system), the command is parsed and encoded into an Object Server Request PDU which is passed to Object Server for processing. The switching engine maintains a mapping between command parameters and the MIB table attributes. Based on the mapping, the switching engine builds variable binding lists for SNMP get-set PDU5. A dialog is then initiated between the switching engine and the Summa Four SNMP agent. At the completion of the dialog, results are returned to an MML interpreter. Object Server implementation details are set out in Table I at pages 135–200.

The Excel Switching Engine Interface

The details of the Excel LNX-2000 Switching Engine Interface are set out in Table II pages 216–254. The LNX-2000 platforms utilize a programmable host interface having host messages to effect the functionality of the API described above. The IBSS implementation in the LNX-2000 Switching Engine utilizes a direct translation of API messages to and from native LNX-2000 host messages. Details of the IBSS implementation are set out in Table II pages 216–220.

The CONS interface is implemented as a direct translation between CONS API primitives and LNX-2000 host messages to provide connection related as well as some maintenance services. In most cases the mapping of messages between the CONS API and the LNX2000 are one to one. In some cases, however, several native host messages are used to effect a single API message. Details of the CONS implementation are set out in Table II pages 221–224.

The MEDS interface is implemented as a direct translation between MEDS API primitives and LNX-2000 host messages to provide media related functionality. Details of the MEDS implementation are set out in Table II pages 225–229.

The Object Server in the LNX-2000 Switching Engine utilizes LNX host messages to configure and initialize the LNX-2000. When a configuration command is entered into the MML command interpreter (of the development system), the command is parsed and encoded into an Object Server Request PDU which is passed to Object Server for processing. The switching engine maintains a mapping between command parameters and the LNX host messages. Based on the mapping, the switching engine populates the corresponding LNX message and sends it to the switch for processing. When a reply or an indication is received from the LNX-2000, the switching engine builds a Reply PDU and sends it back to the MML. Object Server implementation details are set out in Table II at pages 230–254.

As mentioned above, the API and switching engines of the invention are particularly well suited for use in an applications development environment such as disclosed in the parent application. The present invention incorporates the features of the development system of the parent application with the features of a "generic" API for controlling a digital switch and a number of switching engines for controlling different switches.

Figure 5:
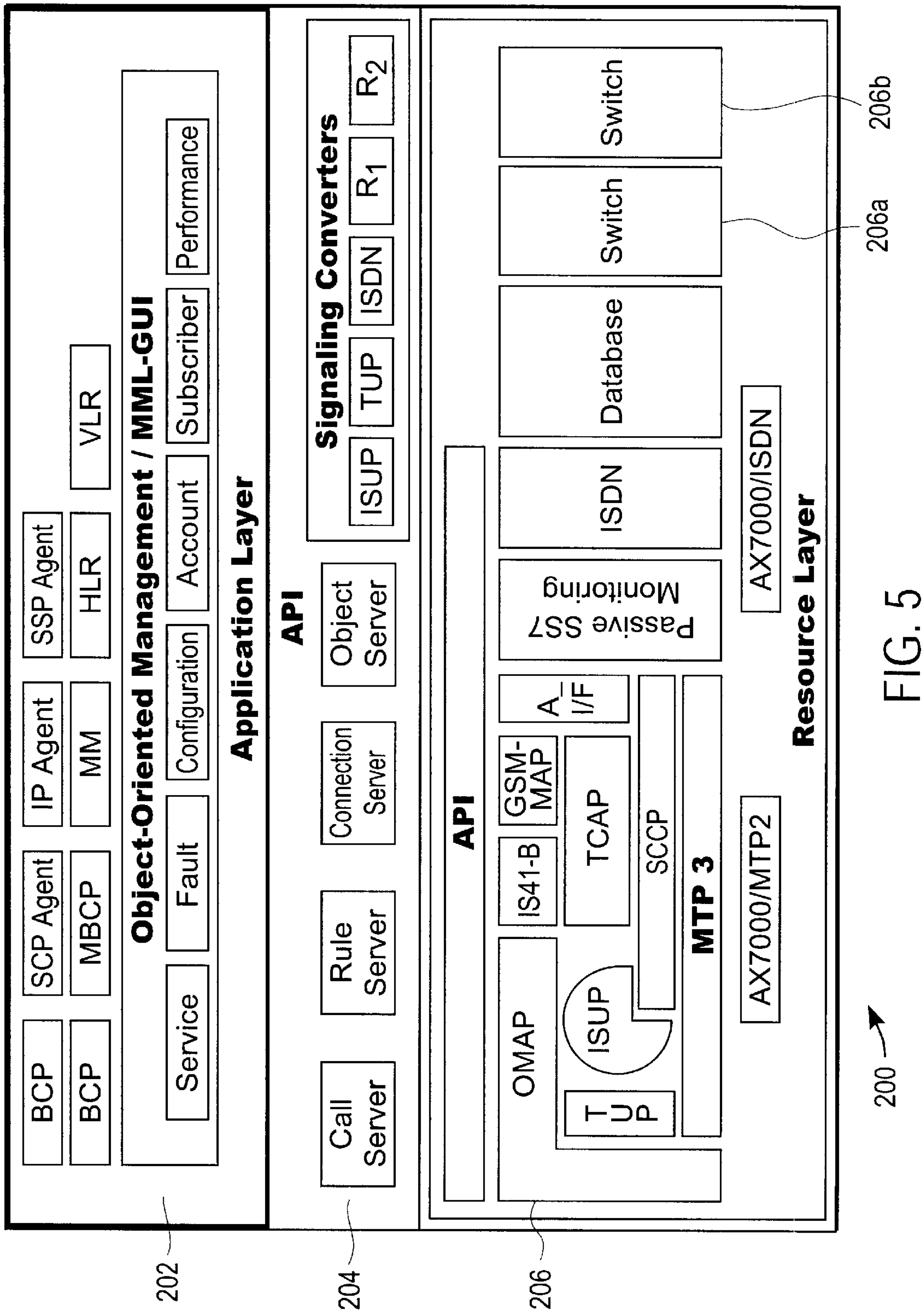
FIG. 5 is a block diagram of an object oriented development system for the configuration of telecommunications equipment including a plurality of switching engines according to the invention.

Turning now to FIG. 5, an applications development system 200 according to the invention generally includes an application layer 202, an object layer 204 and a resource layer 206. The application layer 202 includes a graphical interface with tools for developing telecommunications service applications. The application layer 202 calls upon the server layer 204 to rapidly perform tasks involving signalling and switching. The server layer is provided with its own programming interface (API) so that new services may be added the system in order to support new applications. The server layer 204 calls on the resource layer 206 to control hardware and to interface with the telecommunications system. The resource layer is also provided with its own programming interface (API) so that new hardware devices and new connection services can be added to the system in order to support new applications created in the application layer via new object servers created in the server layer to support the new hardware devices and new connection services.

As seen in FIG. 5, a number of switching engines 206*a*, 206*b*, for example, are provided in the resource layer 206 in order to control digital switches as described above. The ISS, CONS, and MEDS Servers described above are provided in the server layer 204. Applications created in the application layer can use the generic API according to the invention to thereby control several different types of digital switches.

There have been described and illustrated herein several embodiments of methods and apparatus for controlling digital communications switching equipment. While particular embodiments of the invention have been described, it is not intended that the invention be limited thereto, as it is intended that the invention be as broad in scope as the art will allow and that the specification be read likewise. Thus, while particular switching engines have been disclosed for use with particular digital switches, it will be appreciated that other switching engines could be created utilized according to the methods of the invention. Also, while particular sets of generic messages have been shown, it will be recognized that other sets of generic messages could be created and utilized with similar results obtained. Moreover, while particular configurations have been disclosed in reference to a development environment incorporating the methods and apparatus of the invention, it will be appreciated that other configurations could be used as well. Furthermore, it will be understood that different development environments can utilize the methods and apparatus disclosed herein. In addition, while the invention has been disclosed with reference to certain host programmable switches, it will be appreciated that the invention can also be used with SCSA, MVIP, and other standards for computer switching on a card rather than in a separate switch which is controlled by a host through a serial interface. Thus, as used herein, the term "switch" includes both a card for a computer and a separate switch coupled to a host. It will therefore be appreciated by those skilled in the art that yet other modifications could be made to the provided invention without deviating from its spirit and scope as so claimed.

TABLE I

Draft Copy
EBS Confidential

AccessSERVICES™
Switching Engine Interface Specification

Part No. D-0084-00-000-000

July 19, 1995

EBS

2 Enterprise Drive
Shelton, CT 06484
(203) 925-6100
FAX: (203) 926-2664

Restrictions: The information contained in this document is subject to change without notice. EBS, Inc. makes no warranty of any kind with regard to this material. EBS, Inc. shall not be liable for errors contained herein or for incidental or consequential damages in connection with the use of this material. This document contains proprietary information that is protected by copyright; it is intended for your internal use only, it is not to be disclosed to third parties. All rights reserved. No part of this document may be photocopied or reproduced in any way without the prior written permission of EBS, Inc.

TRADEMARKS

AccessMANAGER, AccessMANAGER/Advanced, and AccessSERVICES are trademarks of EBS, Inc.

Solaris, Sun, Sun-3 Sun-4, Sun386i, SunInstall, SunOS, and SPARC, Sun Microsystems, Sun Workstations are trademarks of Sun Microsystems, Inc. SPARC is a registered trademark of SPARC International, Inc.

SPARC CPU-2CE is a trademark of SPARC International, Inc. licensed to FORCE COMPUTERS, Inc.

Motorola and the Motorola logo are registered trademarks of Motorola, Inc. in the U.S.A. and other countries.

DeltaSeries, SYSTEM V/88, and Series FT are trademarks of Motorola, Inc. in the U.S.A.

UNIX is a registered trademark of UNIX Systems Laboratories, Inc. in the U.S.A. and other countries.

SFVME-100, SFVME-200,SFVME-300 and SFVME-400 are registered trademarks of Solflower Computers, Inc.

SDS is a registered trademark of Summa Four, Inc.

All other products or services mentioned in this document are identified by the trademarks or service marks of their respective companies or organizations.

NOTICES AND WARRANTY INFORMATION

The information in this document is subject to change without notice and should not be construed as commitment by EBS, Inc. EBS, Inc. assumes no responsibility or makes no warranties for any errors that may appear in this document and disclaims any implied warranty of merchantability or fitness for a particular purpose.

COPYRIGHT INFORMATION

The Software and design described in this document is furnished under a license agreement. No part of this document may be used, or stored electronically or copied in any form or any means without any accordance with the terms of such license or prior written consent of EBS, Inc.

ALL RIGHTS RESERVED

Copyright 1995 by
Engineering and Business Systems, Inc. (EBS)
2 Enterprise Drive
Shelton, CT 06484

*Chapter 1:* Introduction

1.1 Scope

This manual forms part of a complete documentation package that describes EBS's AccessSERVICES product line. This manual is organized into chapter's which individually detail the major functional capabilities of the AccessSERVICES Switching Engine along with appendices which describe Switching Engine implementations on various platforms.

- Chapter 1: Introduction - This chapter provides an introduction to the manual, along with preconditions for using it.
- Chapter 2: Functional Overview
- Chapter 3: In-band Signalling Interface Specification
- Chapter 4: Connection Interface Specification
- Chapter 5: Media Interface Specification
- Appendix A: Summa4 Switching Engine Specification

1.2 Preconditions

It is assumed that the reader has a general understanding of the following:

- Fundamental telephony concepts of switching and signalling
- UNIX Operating System API
- Message-Based Inter-process Communication
- EBS AccessMANAGER API
- EBS AccessSERVICES Functional Capabilities
- 'C' Programming Language EBS Confidential EBS Confidential

*Chapter 2:* Functional Overview

2.1 Chapter Overview

This chapter is organized into the following topics:

- What is a Switching Engine?
- Functional Capabilities

2.2 What is a Switching Engine?

An AccessSERVICES Switching Engine (SWE) is a resource layer functional entity which serves as an interface between switching equipment and the AccessSERVICES Application and Server layer entities, thus isolating them from the dependencies of any given switch and thus providing application portability across multiple switching platforms. This switch independence is accomplished through the use of a common set of generic interfaces whereby the SWE translates between native switch primitives and SWE interface primitives. The Switching Engine's place in the AccessSERVICES architecture is show below:

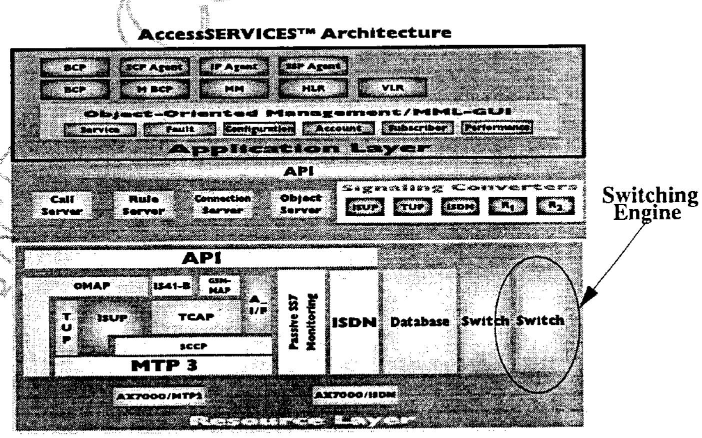

From an interface point-of-view, the SWE directly communicates with the following entities:

- Object Server
- Call Processing

2.3 Functional Capabilities

The Switching Engine provides AccessSERVICES with following functionality:

- Media Server - the capability to play tones, collect digits, outpulse digits, and play recorded announcements.
- In-band Signaling Server - the capability to perform conventional in-band signalling.
- Connection Server - the capability to manage connections.
- Switch Managed Object Server - the capability to configure and initialize switch specific entities (i.e. boards, spans, ports).

From an internal functional point-of-view the Switching Engine is diagrammed as follows:

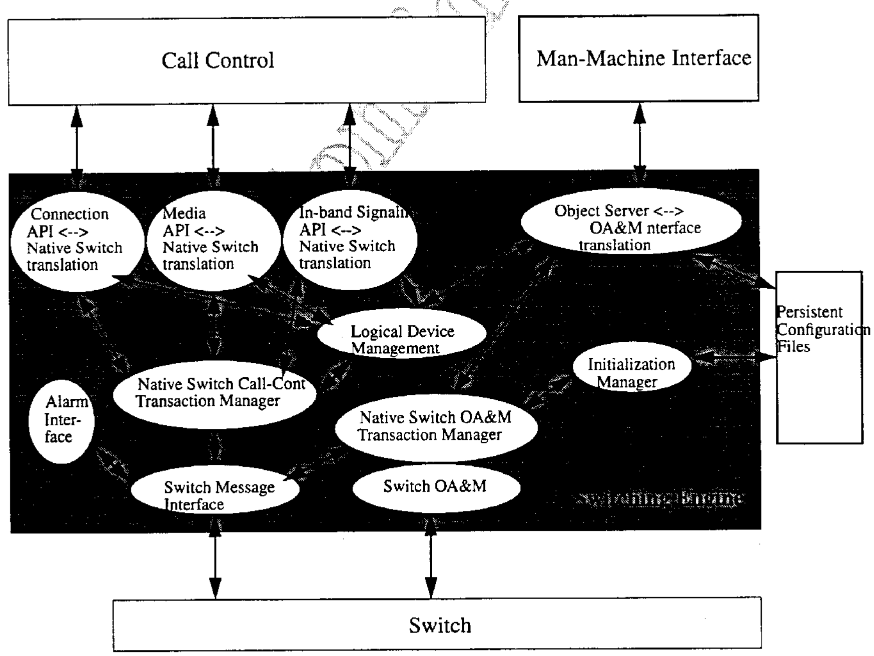

This internal functionality is defined as follows:

- Connection API <--> Native Switch Translation - Logic necessary to convert Connection Server API primitives into native switch commands and visa versa.
- Media API <--> Native Switch Translation - Logic necessary to convert Media Server API primitives into native switch commands and visa versa.
- In-band Signalling API <--> Native Switch Translation - Logic necessary to convert In-band Signalling Server API primitives into native switch commands and visa versa.
- Object Server <--> OA&M Interface Translation - Logic necessary to convert Object Server API primitives into native switch OA&M primitives.
- Alarm Interface -Logic necessary convert from native switch alarms to AccessALARM.
- Native Switch Call-Control Transaction Manager - Logic necessary to manage API transactions on a per-device basis.
- Switch Message Interface - Logic necessary to communicate with the switching matrix.
- Logical Device Management - Logic necessary to manage per-device information.
- Native Switch OA&M Transaction manager - Logic necessary to manager transactions with the switch over the OA&M interface.
- Initialization Manager - Logic necessary to initialize the switch from the backup store upon cold start-up.

The rest of chapters in this manual will detail the specific interfaces that the Switching Engine provides, along with switch specific implementations of these interfaces in the appendices.

EBS Confidential

EBS Confidential

Chapter 3: In-band Signalling Server (IBSS) Interface Specification

3.1 Chapter Overview

This chapter defines the interface between the AccessSERVICES Switching Engine and Call-Control for Inband Signalling, using the In-band Signalling Protocol Application Programmer's Interface (API). This API is designed to provide call-setup, call tear-down and maintenance functionality for the traditional in-band signalling supported by today's host programmable switches.

This chapter is organized into the following topics:

- Protocol Model
- Message Formats and Call-Control Structures
- Call-Control Primitives
- Parameter Information
- Call-Control Library
- Call Scenarios

3.2 Protocol Model

The AccessSERVICES Switching Engine In-band Signalling Server (IBSS) Application Programmer's Interface (API) provides a generic, portable protocol through which the in-band signaling capabilities of various switching entities (host programmable switches and VRU cards with signalling capabilities) can be utilized without sacrificing their inherent programmability. The API consists of AccessMANAGER SPM IPC messages passed between the Switching Engine and the Call-Control Entity (call processing application) using OSI-like primitives. The end-to-end message exchange is detailed in the following diagram:

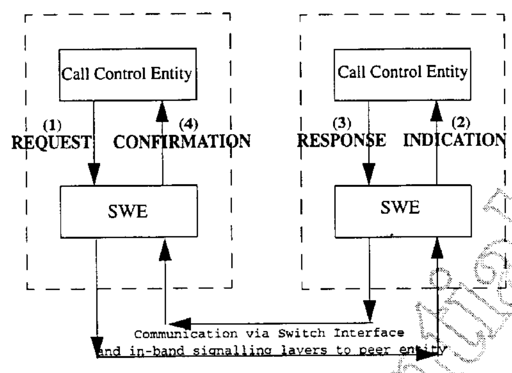

Figure 1:
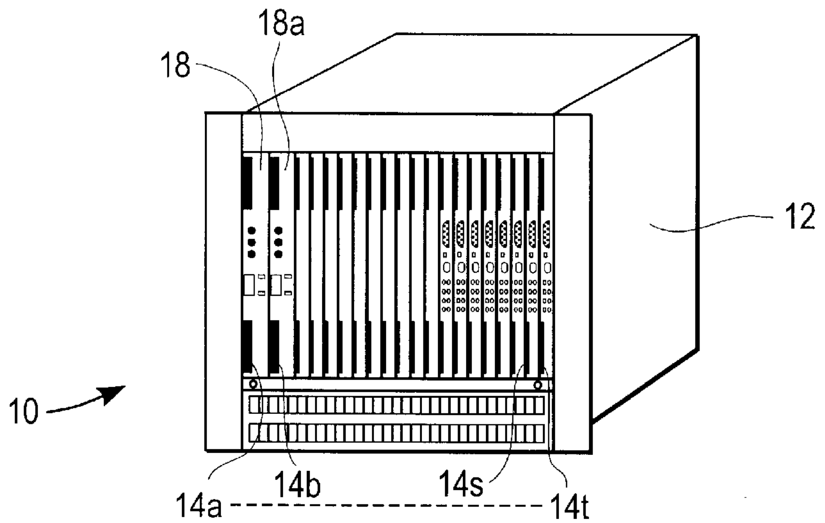
FIG. 1 is a perspective view of a prior art high speed digital switch.
Figure 3:
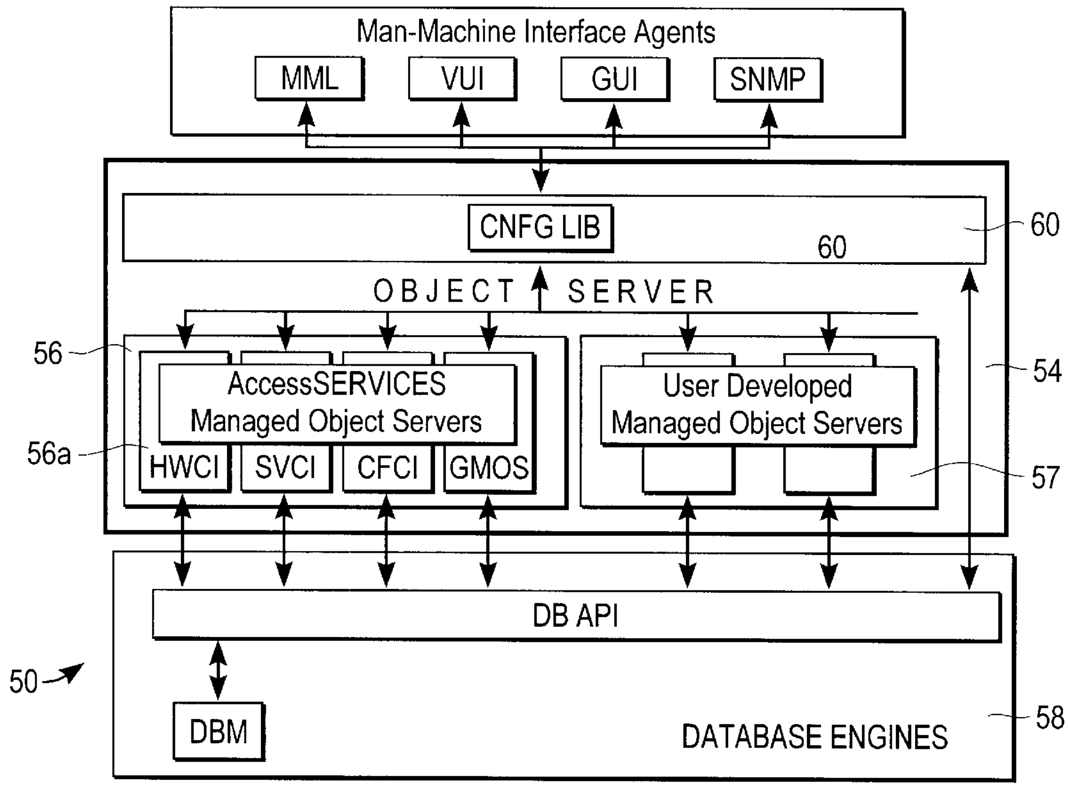
FIG. 3 is a block diagram of an object oriented development system for the configuration of telecommunications equipment.

Figure 3 - 1 IBSS API Protocol Mode

The primitives that are exchanged between the Call Control Entity (CCE) and the Switching Engine (SWE) include the following:

REQUEST (REQ) - primitive used by the CCE when it requires the use of SWE functionality.

INDICATION (IND) - primitive used by the SWE to notify the CCE of a REQUEST.

RESPONSE (RSP) - primitive used by the CCE to acknowledge receipt of an INDICATION primitive.

CONFIRMATION (CNF)- primitive used by SWE to notify the CCE that the REQUESTed activity has completed successfully.

All IBSS API operations are based on this protocol model and the peer-to-peer communication via these primitives, although in some cases a particular operation utilizes only some of the primitives.

3.3 Message Formats and Call-Control Structures

IBSS messages are exchanged between the SWE and Call-Control Application via the AccessMANAGER Signalling Point Manager (SPM) API in the data portion of an *IPCmsg_t* structure. Each message contains a header in the form of an *IBSS_MSG_HDR_S* followed by a variable number of parameters, in the form of *IBSS_MSG_PRM_S* structures, stored consecutively, followed finally by an "End of Parameters" indicator. The "C" structure for *IBSS_MSG_HDR_S* is given below:

```
typedef struct {
        DWORD           prim_id;
```

```
        SYS_LOG_DEV_ID      log_dev;
        WORD                pass_thru;
        WORD                rep_cntrl;
} IBSS_MSG_HDR_S;
```

Figure 2:
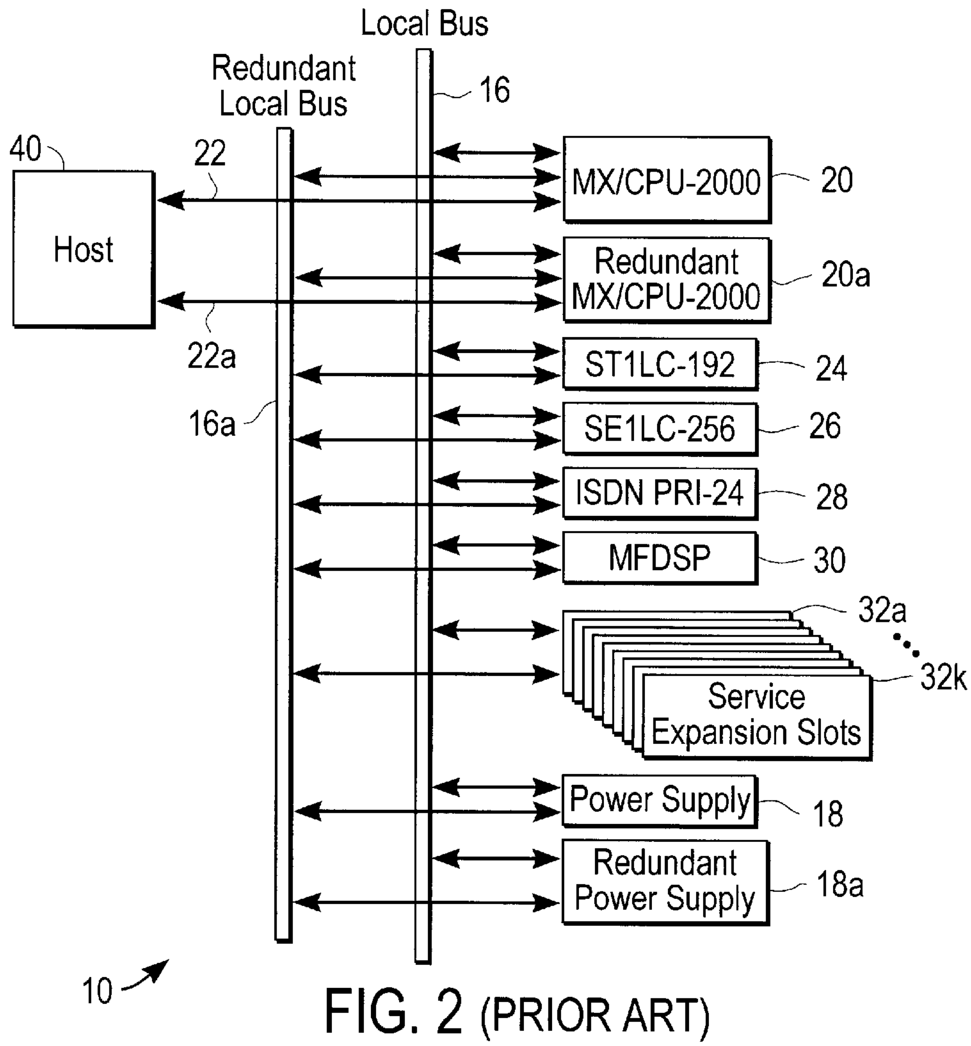
FIG. 2 is a block diagram of a prior art switch bus.

Figure 3 - 2 IBSS API Message Header where the *prim_id* field indicates the primitive identifier, *log_dev* indicates the logical device on which the operation will be or was performed, *pass_thru* indicates a transparent value set in REQ messages and returned in successive CNF and IND messages, and *rep_cntrl* indicates the filtering control of successive CNF and IND messages when a REQ message is issued. The *rep_cntrl* field can take on the follow values:

- L_IBSS_RET_CNF_ERR - this will return a CNF or ERROR_IND primitive in response to a REQ primitive.
- L_IBSS_RET_ERR - this will only return an ERROR_IND primitive in response to a REQ primitive.
- L_IBSS_RET_NONE - this will return no messages in response to a REQ primitive.

The "C" structure for the *IBSS_MSG_PRM_S* is given below:

```
typedef union{
        IBSS_DIG_S              sup_fld_1;
        IBSS_DIG_S              sup_fld_2;
        IBSS_DIG_S              sup_fld_3;
        IBSS_DIG_S              sup_fld_4;
        IBSS_DIG_S              sup_fld_5;
        IBSS_NO_DATA_S          strd_fld_1;
        IBSS_NO_DATA_S          strd_fld_2;
        IBSS_NO_DATA_S          strd_fld_3;
        IBSS_NO_DATA_S          strd_fld_4;
        IBSS_NO_DATA_S          strd_fld_5;
        IBSS_ERR_CODE_S         error;
        IBSS_CPA_CODE_S         cpa_code;
        IBSS_OUTSEIZE_INFO_S    outsz;
        IBSS_INSEIZE_INFO_S     insz;
        IBSS_NO_DATA_S          eop;
} IBSS_MSG_PRM_U;
```

EBS Confidential

```
typedef struct {
        DWORD               param_id;
        IBSS_MSG_PRM_U      param;
} IBSS_MSG_PRM_S;
```

Figure 3 - 3 IBSS API Message Parameter

Where *param_id* indicates parameter type and *param* provides the parameter related data. The details of the *IBSS_MSG_PRM_U* will be provided in a later section.

The *IBSS_MSG_HDR_S* and *IBSS_MSG_PRM_S* structures are laid out in an *IPCmsg_t* data portion in the following fashion:

| |
|---|
| *IBSS_MSG_HDR_S* |
| Parameter 1<br>*IBSS_MSG_PRM_S* |
| Parameter 2<br>*IBSS_MSG_PRM_S* |
| Parameter 3<br>*IBSS_MSG_PRM_S* |
| . . . . . . . . |
| . . . . . . . . |
| Parameter N<br>*IBSS_MSG_PRM_S* |

Figure 3 - 4 IBSS Message Format (within an IPCmsg_t 'data' field)

In order to access these parameters, a group of library routines are provided by the API to facilitate the 'building' and 'parsing' of messages. These library routines will be discussed in a later section.

3.4 Call-Control Primitives

This section contains a detailed description of the functionality behind the various primitives provided in the IBSS API along with the message contents. Please refer to the following section for a description of individual signalling parameters.

3.4.1 IBSS_OUTSEIZE_REQ

This primitive is used to initiate an outbound call (outbound seizure) on the specified logical device using a default pre-programming signalling scenario or another signalling scenario available within the switch. The *IBSS_OUTSEIZE_REQ* primitive should contains digit parameters as called for in the outbound scenario. These digits can be provided in the *IBSS_OUTSEIZE_REQ* in the form of L_PRM_SUP_FLD_X_DIGS parameters where 'X' represents a value between 1 and 5, or from previously inpulsed and stored digits in the form of a L_PRM_STRD_FLD_X_DIGS parameters where 'X' represents a value between 1 and 5. Upon successful execution of the outgoing signalling scenario, a *IBSS_OUTSEIZE_CNF* primitive will be returned. If an error occurs during processing of the outgoing scenario an *IBSS_ERROR_IND* is returned with an error code indicating the reason for the failure. NOTE: The exact requirements for parameters is highly dependent upon the underlying signaling scenario.

Table 3-1 IBSS_OUTSEIZE_REQ Message Contents

| Parameter | Reference | Type |
|---|---|---|
| L_PRM_OUTSZ_INFO | | M |
| L_PRM_SUP_FLD_1_DIGS | | O |
| L_PRM_SUP_FLD_2_DIGS | | O |
| L_PRM_SUP_FLD_3_DIGS | | O |
| L_PRM_SUP_FLD_4_DIGS | | O |
| L_PRM_SUP_FLD_5_DIGS | | O |
| L_PRM_STRD_FLD_1_DIGS | | O |
| L_PRM_STRD_FLD_2_DIGS | | O |
| L_PRM_STRD_FLD_3_DIGS | | O |
| L_PRM_STRD_FLD_4_DIGS | | O |
| L_PRM_STRD_FLD_5_DIGS | | O |
| L_PRM_EOP | | M |

3.4.2 IBSS_RELEASE_REQ

This primitive is used to tear-down an already existing call. Upon successful release of the logical device (within the switch), an *IBSS_RELEASE_CNF* primitive will be returned.

Table 3-2 IBSS_RELEASE_REQ Message Contents

| Parameter | Reference | Type |
|---|---|---|
| L_PRM_EOP | | M |

3.4.3 IBSS_ANSWER_REQ

This primitive is used to initiate answer signalling on the specified logical device. Upon successful processing an *IBSS_ANSWER_CNF* is returned.

Table 3-3 IBSS_ANSWER_REQ Message Contents

| Parameter | Reference | Type |
|---|---|---|
| L_PRM_EOP | | M |

3.4.4 IBSS_WINK_REQ

This primitive is used to initiate 'wink' signalling on the specified logical device. Upon successful processing an *IBSS_WINK_CNF* is returned.

Table 3-4 IBSS_WINK_REQ Message Contents

| Parameter | Reference | Type |
|---|---|---|
| L_PRM_EOP | | M |

3.4.5 IBSS_FLASH_REQ

This primitive is used to initiate hook-flash signalling on the specified logical device. Upon successful processing an *IBSS_FLASH_CNF* is returned.

Table 3-5 IBSS_FLASH_REQ Message Contents

| Parameter | Reference | Type |
|---|---|---|
| L_PRM_EOP | | M |

3.4.6 IBSS_ERROR_IND

This primitive is returned when an operation on the specified logical device fails to execute successfully within the switch. No further primitives will be returned. Contained within the *IBSS_ERROR_IND* message will be a L_PRM_ERROR_CODE parameter which provides an error code and switch specific diagnostic value.

Table 3-6 IBSS_ERROR_IND Message Contents

| Parameter | Reference | Type |
|---|---|---|
| L_PRM_ERROR_CODE | | M |
| L_PRM_EOP | | M |

Confidential

3.4.7 IBSS_DIGITS_IND

This primitive is returned whenever the switches' inseizure scenario returns signalling information. Note: While each supplied field is specified as "Optional", at least one parameter will exist if this primitive is returned.

Table 3-7 IBSS_DIGITS_IND Message Contents

| Parameter | Reference | Type |
|---|---|---|
| L_PRM_SUP_FLD_1_DIGS | | O |
| L_PRM_SUP_FLD_2_DIGS | | O |
| L_PRM_SUP_FLD_3_DIGS | | O |
| L_PRM_SUP_FLD_4_DIGS | | O |
| L_PRM_SUP_FLD_5_DIGS | | O |
| L_PRM_EOP | | M |

3.4.8 IBSS_RELEASE_IND

This primitive is returned when the specified logical device goes onhook. This is an indication that all call related information should be freed. No further action is required on this device. It may, however, be necessary to release any connected resources by issuing *IBSS_RELEASE_REQ* primitives on those devices.

Table 3-8 IBSS_RELEASE_IND Message Contents

| Parameter | Reference | Type |
|---|---|---|
| L_PRM_EOP | | M |

3.4.9 IBSS_ANSWER_IND

This primitive is returned when the specified logical device becomes answered. It may be necessary to "answer" a connected device by issuing a *IBSS_ANSWER_REQ* primitive.

Table 3-9 IBSS_ANSWER_IND Message Contents

| Parameter | Reference | Type |
|---|---|---|
| L_PRM_EOP | | M |

3.4.10 IBSS_INSEIZE_IND

This primitive is returned when a seize is detected on the specified logical device. Call Control should respond with a *IBSS_INSEIZE_RSP* primitive if additional signalling information is required. The content of this message depends upon underlying switch inseizure scenario. If a *IBSS_INSEIZE_RSP* primitive is sent, it will cause the incoming signalling to complete with successive *IBSS_DIGITS_IND* primitives providing the signalling information.

Table 3-10 IBSS_INSEIZE_IND Message Contents

| Parameter | Reference | Type |
|---|---|---|
| L_PRM_SUP_FLD_1_DIGS | | O |
| L_PRM_SUP_FLD_2_DIGS | | O |
| L_PRM_SUP_FLD_3_DIGS | | O |
| L_PRM_SUP_FLD_4_DIGS | | O |
| L_PRM_SUP_FLD_5_DIGS | | O |
| L_PRM_EOP | | M |

3.4.11 IBSS_WINK_IND

This primitive is returned when a wink is detected on the specified logical device and the underlying outseizure scenario reports it. Please see switch specific documentation in the appendices.

Table 3-11 IBSS_WINK_IND Message Contents

| Parameter | Reference | Type |
|---|---|---|
| L_PRM_EOP | | M |

3.4.12 IBSS_FLASH_IND

This primitive is returned when a hook-flash is detected on the specified logical device. No additional action is required on this device.

Table 3-12 IBSS_FLASH_IND Message Contents

| Parameter | Reference | Type |
|---|---|---|
| L_PRM_EOP | | M |

3.4.13 IBSS_CPA_IND

This primitive is returned when call progress analysis is used during outseizure. The *L_PRM_CPA_CODE* indicates which call progress tone was detected during CPA.

ASI Confidential

Table 3-13 IBSS_CPA_IND Message Contents

| Parameter | Reference | Type |
|---|---|---|
| L_PRM_CPA_CODE | | M |
| L_PRM_EOP | | M |

3.4.14 IBSS_OUTSEIZE_CNF

This primitive is returned when the *IBSS_OUTSEIZE_REQ* primitive has been successfully processed by the switch on the specified logical device. No additional action is required on this device.

Table 3-14 IBSS_OUTSEIZE_CNF Message Contents

| Parameter | Reference | Type |
|---|---|---|
| L_PRM_EOP | | M |

3.4.15 IBSS_RELEASE_CNF

This primitive is returned when the *IBSS_RELEASE_REQ* primitive has been successfully processed by the switch and the specified logical device is onhook. No additional action is required on this device.

Table 3-15 IBSS_RELEASE_CNF Message Contents

| Parameter | Reference | Type |
|---|---|---|
| L_PRM_EOP | | M |

3.4.16 IBSS_ANSWER_CNF

This primitive is returned when the *IBSS_ANSWER_REQ* primitive has been successfully processed by the switch and the specified logical device is offhook. No additional action is required on this device.

EIS Confidential

Table 3-16 IBSS_ANSWER_CNF Message Contents

| Parameter | Reference | Type |
|---|---|---|
| L_PRM_EOP | | M |

3.4.17 IBSS_WINK_CNF

This primitive is returned when the *IBSS_WINK_REQ* primitive has been successfully processed by the switch and a 'wink' has been sent on the specified logical device. No additional action is required on this device.

Table 3-17 IBSS_WINK_CNF Message Contents

| Parameter | Reference | Type |
|---|---|---|
| L_PRM_EOP | | M |

3.4.18 IBSS_FLASH_CNF

This primitive is returned when the *IBSS_FLASH_REQ* primitive has been successfully processed by the switch and a hook-flash has been sent on the specified logical device. No additional action is required on this device.

Table 3-18 IBSS_FLASH_CNF Message Contents

| Parameter | Reference | Type |
|---|---|---|
| L_PRM_EOP | | M |

3.4.19 IBSS_INSEIZE_RSP

This primitive is used to initiate an inbound call (inbound seizure) on the specified logical device using a default pre-programmed signalling scenario or another signalling scenario available within the switch. If an error occurs during processing of the incoming scenario, an IBSS_ERROR_IND is returned with an error code indicating the reason for the failure. It is possible to receive additional information during execution of the incoming scenario depending upon how the scenario was programmed. Please see switch specific documentation in the appendices.

MCS Confidential

Table 3-19 IBSS_INSEIZE_RSP Message Contents

| Parameter | Reference | Type |
|---|---|---|
| L_PRM_INSZ_INFO | | M |
| L_PRM_EOP | | M |

3.5 Parameter Information

The *param* field of the *IBSS_MSG_PRM_S* structure is comprised of a union of parameters, each of which defines the structure of the corresponding parameter indicated in the *parm_id* field. These parameters are defined below:

3.5.1 L_PRM_EOP (End of Parameters)

This parameter is used in every message to indicate the last parameter.

3.5.2 L_PRM_SUP_FLD_X_DIGS (Supplied Signalling Digits)

This parameter is used when the *param_id* is *L_PRM_SUP_FLD_X_DIGS*. This parameter is accessed through the *sup_fld_x* field of the *param* union. The digits reside in the *digits* field (one digit per byte) and *len* is set to their length.

```
typedef struct {
        BYTE        digits[L_MAX_DIG_LEN];
        BYTE        len;
} IBSS_DIG_S;
```

3.5.3 L_PRM_STRD_FLD_X_DIGS (Stored Signalling Digits)

This parameter is used to indicate a digit field stored within the switch.

3.5.4 L_PRM_ERROR_CODE (Error Code)

This parameter is used when the *param_id* is *L_PRM_ERROR_CODE*. This parameter is accessed through the *error* field of the *param* union. The *code* field contains the error code and the *diag* field may contain the underlying switch error code.

```
typedef struct {
        BYTE        code;
        BYTE        diag;
} IBSS_ERR_CODE_S;
```

ABC Confidential

3.5.5 L_PRM_OUTSZ_INFO (Outseize Information)

This parameter is used when the *param_id* is *L_PRM_OUTSZ_INFO*. This parameter is accessed through the *outsz* field of the *param* union. The outgoing scenario id is specified in the *scen_id* field and an indication of whether or not to perform CPA is specified in the *cpa_flag* field.

```
typedef struct {
        BYTE        scen_id;
        BOOL        cpa_flag;
} IBSS_OUTSEIZE_INFO_S;
```

3.5.6 L_PRM_INSZ_INFO (Inseize Information)

This parameter is used when the *param_id* is *L_PRM_INSZ_INFO*. This parameter is accessed through the *insz* field of the *param* union. The incoming scenario id is specified in the *scen_id* field.

```
typedef struct {
        BYTE        scen_id;
} IBSS_INSEIZE_INFO_S;
```

3.5.7 L_PRM_CPA_CODE (Call Progress Analysis Code)

This parameter is used when the *param_id* is *L_PRM_CPA_CODE*. This parameter is accessed through the *cpa_code* field of the *param* union. The call progress analysis code is specified in the *code* field.

```
typedef struct {
        BYTE        code;
} IBSS_CPA_CODE_S;
```

3.6 IBSS Call-Control Library

The In-band Signaling Call-Control Interface Library is provided to aid call-control in packing and unpacking IBSS API messages. The available library calls are listed below.

Table 3-20 IBSS CC Library Routines

| Library Routine | Section | Description |
|---|---|---|
| f_IBSS_initSig | 3.6.8 on page 14 | Initialize the IBSS library |
| f_IBSS_getHdr | 3.6.9 on page 15 | Retrieve IBSS message header information |
| f_IBSS_getParam | 3.6.10 on page 16 | Retrieve IBSS message parameter information |

IBSS Confidential

Table 3-20 IBSS CC Library Routines

| Library Routine | Section | Description |
|---|---|---|
| f_IBSS_putHdr | 3.6.11 on page 17 | Fill IBSS message header information |
| f_IBSS_putParam | 3.6.12 on page 18 | Fill IBSS message parameter information |
| f_IBSS_sndMsg | 3.6.13 on page 19 | Send a message to IBSS |
| f_IBSS_errstr | 3.6.14 on page 20 | Return string for IBSS error code |

EBS Confidential

3.6.8 f_IBSS_initSig

NAME

| | |
|---|---|
| ***f_IBSS_initSig*** | Initialize the In-band Signalling Server Library. |

SYNOPSIS

| | |
|---|---|
| ***int*** | ***f_IBSS_initSig ( IPCaddr_t *my_addr );*** |

DESCRIPTION

| | |
|---|---|
| ***f_IBSS_initSig*** | Initializes the IBSS API library. *My_addr* must contain the IPCaddr_t that your process registered with. |

RETURN VALUES

*f_IBSS_initSig*() returns:

| | |
|---|---|
| 0 | on success. |
| -1 | on failure and set *errno* to indicate the error. |

ERRORS

| | |
|---|---|
| EINVALADDR | *My_addr* is invalid. |
| EADDRNULL | *My_addr* is NULL. |

EBS Confidential

3.6.9 f_IBSS_getHdr

NAME

| | |
|---|---|
| ***f_IBSS_getHdr*** | Retrieve the logical device and primitive id from a IBSS message. |

SYNOPSIS

| | |
|---|---|
| ***int*** | ***f_IBSS_getHdr (IPCmsg_t *ipc_msg, IBSS_MSG_HDR_S *hdr);*** |

DESCRIPTION

| | |
|---|---|
| ***f_IBSS_getHdr*** | retrieves the logical device and IBSS primitive id from the *IPCmsg_t* pointed to by *ipc_msg* and stores it in the *IBSS_MSG_HDR_S* pointed to by *hdr.* |

RETURN VALUES

*f_IBSS_getHdr*() returns:

| | |
|---|---|
| 0 | on success. |
| -1 | on failure and set *errno* to indicate the error. |

ERRORS

| | |
|---|---|
| EINVALMSG | Message is not from IBSS. |
| EIPCMSGNULL | *Ipc_msg* is NULL. |
| EHDRNULL | *Hdr* is NULL. |
| ENOTINIT | IBSS library not initialized. |

EBS Confidential

3.6.10 f_IBSS_getParam

NAME

| | |
|---|---|
| ***f_IBSS_getParam*** | Retrieve a parameter from an IBSS message. |

SYNOPSIS

| | |
|---|---|
| ***int**** | ***f_IBSS_getParam ( IPCmsg_t *ipc_msg, IBSS_MSG_PRM_S *param);*** |

DESCRIPTION

| | |
|---|---|
| ***f_IBSS_getParam*** | retrieves a parameter from the IBSS message pointed to by *ipc_msg* and copies it to the *IBSS_MSG_PRM_S* pointed to by *param*. |

RETURN VALUES

*f_IBSS_getParam*() returns:

| | |
|---|---|
| 0 | on success. |
| -1 | on failure and set *errno* to indicate the error. |

ERRORS

| | |
|---|---|
| EINVALPRM | Invalid parameter type (param_id). |
| EIPCMSGNULL | *Ipc_msg* is NULL. |
| EPARAMNULL | *Param* is NULL. |
| ENOTINIT | IBSS library not initialized. |

EBS Confidential

3.6.11 f_IBSS_putHdr

NAME

| | |
|---|---|
| ***f_IBSS_putHdr*** | Place logical device, primitive id, pass_thru value, and reply control information into an IBSS message. |

SYNOPSIS

| | |
|---|---|
| ***int*** | ***f_IBSS_putHdr (IPCmsg_t *ipc_msg, IBSS_MSG_HDR_S* hdr);*** |

DESCRIPTION

| | |
|---|---|
| ***f_IBSS_putHdr*** | place the IBSS_MSG_HDR_S pointed to by *hdr* into the *IPCmsg_t* pointed to by *ipc_msg*. |

RETURN VALUES

*f_IBSS_putHdr*() returns:

| | |
|---|---|
| 0 | on success. |
| -1 | on failure and set *errno* to indicate the error. |

ERRORS

| | |
|---|---|
| EINVALHDR | *Hdr* contains invalid information. |
| EIPCMSGNULL | *Ipc_msg* is NULL. |
| EHDRNULL | *Hdr* is NULL. |
| ENOTINIT | IBSS library not initialized. |

EIBS Confidential

3.6.12 f_IBSS_putParam

NAME

*f_IBSS_putParam* Place a parameter into an IBSS message.

SYNOPSIS

*int* ***f_IBSS_putParam ( IPCmsg_t *ipc_msg, IBSS_MSG_PRM_S *param);***

DESCRIPTION

*f_IBSS_putParam* Place an IBSS_MSG_PRM_S pointed to by *param* into the *IPCmsg_t* pointed to by *ipc_msg*. The parameter is placed into the message immediately following the previously "put" parameter. If no previous parameter has been "put", the parameter is placed immediately following the header.

RETURN VALUES

*f_IBSS_putParam*() returns:

0 on success.

-1 on failure and set *errno* to indicate the error.

ERRORS

EINVALPARTYP Invalid parameter type (param_id).

EINVALPRMFMT Invalid parameter format.

EIPCMSGNULL *Ipc_msg* is NULL.

EPARAMNULL *Param* is NULL.

ENOTINIT IBSS library not initialized.

EIBS Confidential

3.6.13 f_IBSS_sndMsg

NAME

| | |
|---|---|
| ***f_IBSS_sndMsg*** | Send a message to the IBSS |

SYNOPSIS

| | |
|---|---|
| ***int*** | ***f_IBSS_sndMsg ( IPCmsg_t *ipc_msg);*** |

DESCRIPTION

| | |
|---|---|
| ***f_IBSS_sndMsg*** | sends a previously built *IPCmsg_t* pointed to by *ipc_msg* to the IBSS. |

RETURN VALUES

*f_IBSS_sndMsg*() returns:

| | |
|---|---|
| 0 | on success. |
| -1 | on failure and set *errno* to indicate the error. |

ERRORS

| | |
|---|---|
| EIPCMSGNULL | *Ipc_msg* is NULL. |
| ENOTINIT | IBSS library not initialized. |

EBS Confidential

3.6.14 f_IBSS_errStr

NAME

| | |
|---|---|
| ***f_IBSS_errStr*** | Return a string for the error code |

SYNOPSIS

| | |
|---|---|
| ***char **** | ***f_IBSS_errStr ( BYTE code);*** |

DESCRIPTION

| | |
|---|---|
| ***f_IBSS_errStr*** | returns a string for the error code specified in *code*. |

RETURN VALUES

*f_IBSS_errStr*() returns:

| | |
|---|---|
| pointer to string | on success. |
| NULL | on failure if no string exists for the error code. |

EBS Confidential

3.7 IBSS Call Scenarios

The following scenarios are given as an example of the message flows for incoming and outgoing calls using the IBSS API. NOTE: The primitive exchange is highly dependent upon the underlying signalling scenario.

EBS Confidential

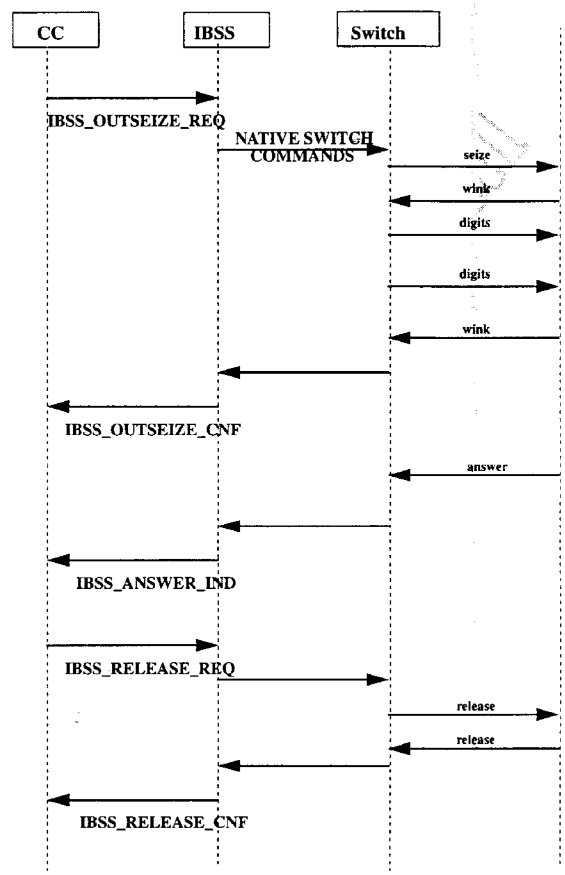
Comments:

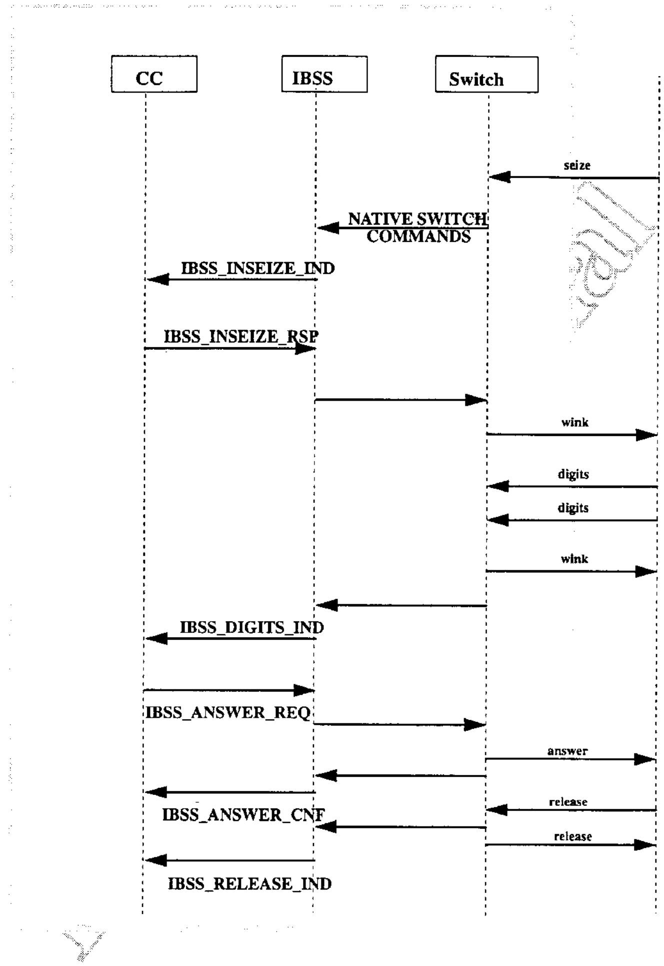
CC
IBSS
Switch
seize
NATIVE SWITCH COMMANDS
IBSS_INSEIZE_IND
IBSS_INSEIZE_RSP
wink
digits
digits
wink
IBSS_DIGITS_IND
IBSS_ANSWER_REQ
answer
release
IBSS_ANSWER_CNF
release
IBSS_RELEASE_IND EBS Confidential

*Chapter 4:* Connection Server Interface Specification

4.1 Chapter Overview

This chapter defines the interface between the AccessSERVICES Switching Engine and Call-Control for connection related services, using the AccessSERVICES Switching Engine (SWE) Connection Server (CONS) Application Programmer's Interface.[1] The SWE CONS API is designed to provide flexible endpoint management and an enhanced "connection view" to ease application development.

This chapter is organized into the following topics:

- Connection View Model
- Message formats and Call-Control Structures
- Call-Control Primitives
- Call-Control Library

4.2 Connection View Model

The CONS connection related functionality is built around an enhanced connection view upon which all connection related primitives are performed. From the CONS connection view perspective a single device can be connected to many devices as shown below:

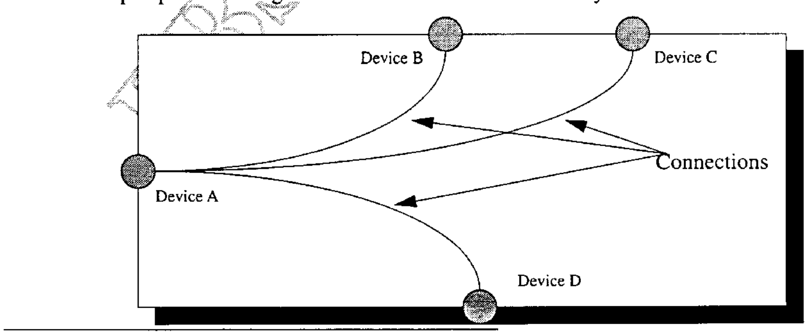

1. Other CONS related services, such as hunting, are handled outside of the Switching Engine and are beyond the scope of this document.

Figure 4 - 1 Connection View Model

In this particular case, Device A is connected to Device B, Device C, and Device D each with a separate logical connection. Thus it is possible for Device A to break its connection with Device B without effecting its connections with Device C and D. It is also possible to connect more devices to Device A and even more devices to any of the other devices Device A is connected to. Practically speaking, if you wish to connect another device to Device A, you can simply issue a CONS connection primitive specifying Device A and the device you wish to connect.

But from an implementation perspective it is not possible to directly connect a single device to many devices, thus it is necessary to internally allocate conference circuitry to handle these multi-party requests. So from the perspective of the Connection View a single device may be connected to many other devices, but in reality these connections are made through conference points. The allocation and management of these conference points, to a limited extent, is hidden from the user, thus enforcing a higher-level Connection View instead of low-level primitives and commands.

4.3 Message Formats and Call-Control Structures

CONS messages are exchanged between the SWE(CONS) and call-control application via the AccessMANAGER Signalling Point Manager (SPM) API in the *data* field of an *IPCmsg_t* structure. Each message contains a *CONS_MSG_S* in which all necessary header and message specific data is carried. The *CONS_MSG_S* is given below:

```
typedef struct {
        DWORD              prim_id;
        DWORD              pass_thru;
        DWORD              rep_cntrl;
        CONS_MSG_DATA_Umsg_data;
} CONS_MSG_S;
```

Figure 4 - 2 Connection Server Message Structure where *prim_id* is the message primitive, *pass_thru* is a transparent data field sent in CMDs and returned in ACKS, NACKS, and INDs, *rep_cntrl* is the message reply control, and *msg_data* is a union of all per-message data portions.

The *prim_id* definitions are given in section 4.4 on page 3.

The *rep_cntrl* definitions are defined as follows:

- L_CONS_RET_ALL - which will return an ACK or NACK in response to a CMD primitive.
- L_CONS_RET_ERR - which will only return a NACK.

- L_CONS_RET_NONE - which will not return an ACK or NACK in response to a CMD.

This *msg_data* union is given below:

```
typedef union {
          .
          .
          .
          CONS_2_WAY_CONN_CMD_S       two_way_cmd;
          CONS_2_WAY_CONN_ACK_S       two_way_ack;
          CONS_2_WAY_CONN_NACK_S      two_way_nack;
          CONS_1_WAY_CONN_CMD_S       one_way_cmd;
          CONS_1_WAY_CONN_ACK_S       one_way_ack;
          CONS_1_WAY_CONN_NACK_S      one_way_nack;
          CONS_DISC_CMD_S             disc_cmd;
          CONS_DISC_ACK_S             disc_ack;
          CONS_DISC_NACK_S            disc_nack;
          CONS_NAIL_UP_CMD_S          nail_up_cmd;
          CONS_NAIL_UP_ACK_S          nail_up_ack;
          CONS_NAIL_UP_NACK_S         nail_up_nack;
          CONS_NAIL_UP_DISC_CMD_S     nail_up_disc_cmd;
          CONS_NAIL_UP_DISC_ACK_S     nail_up_disc_ack;
          CONS_NAIL_UP_DISC_NACK_S nail_up_disc_nack;
          CONS_INS_STATE_IND_S        ins_state_ind;
          CONS_OOS_STATE_IND_S        oos_state_ind;

} CONS_MSG_DATA_U;
```

Figure 4 - 3 Per-message Data Portion

These message specific field will be detailed in the following sections.

4.4 Call-Control Primitives

This section contains a detailed description of the functionality behind the various primitives provided in the CONS API along with message contents for the individual primitives. Please refer to the following section for a description of individual primitives.

4.4.15 CONS_2_WAY_CONN_CMD

This primitive constructs a two-way voice path, with or without a conference bridge, between the logical devices specified in the *CONS_2_WAY_CONN_CMD_S* structure. A *CONS_2_WAY_CONN_ACK* or *CONS_2_WAY_CONN_NACK* will be returned to indicate the success or failure of the command. The *CONS_2_WAY_CONN_CMD_S* structure, which resides within the *CONS_MSG_DATA_S msg_data* union, is given below:

```
typedef struct {
        SYS_LOG_DEV_ID          log_dev_a;
        SYS_LOG_DEV_ID          log_dev_b;
        DWORD                   conn_cntrl;
        DWORD                   disc_cntrl;
} CONS_2_WAY_CONN_CMD_S;
```

*Log_dev_a* and *log_dev_b* represent the two logical devices to be connected, *conn_cntrl* represents the connecting device's conference control, and *disc_cntrl* represents any disconnecting devices's conference control. Connecting conference control allows the connecting entity, either *log_dev_a* or *log_dev_b* in this case, to determine how it will be connected to the other device, either through a standard two-way voice connection or through a conference point -- to which other devices may already be connected. There are three (3) connecting conference control options, they include:

- L_CCTRL_W_CONF (connect with conference) - connect a two-way voice path between *log_dev_a* to *log_dev_b* in which both devices are connected to a single conference point. If neither *log_dev_a* or *log_dev_b* is involved in (connected to) an existing conference, a conference circuit instance will be internally allocated and both devices will be connected to it. If either *log_dev_a* or *log_dev_b* is involved in an existing conference, the conference-less device will be added to the associated devices' conference with all parties previously involved in the conference now being "connected" two-way to the new device. In cases when both *log_dev_a* and *log_dev_b* are involved in existing conferences, these conferences will be merged and all parties will become members of a single collective conference, size permitting.
- L_CCTRL_W_CONF_IF_REQ (connect with conference, if required) - connect a two-way voice path between *log_dev_a* to *log_dev_b* where the resulting connection will contain a conference point only if *log_dev_a* or *log_dev_b* is previously involved in a connection (with a conference or not). In cases where neither device is previously involved in a connection, a simple two-way voice path will be constructed. In cases where either or both devices is involved in a conference, behavior will be consistent with the L_CCTRL_W_CONF option.
- L_CCTRL_WO_CONF (connect without conference) - connect a two-way voice path without a conference point (always use a simple two-way connection). If either device is involved in an existing connection without a conference point, its' connected device will listen to silence if this operation is successful. If either device is involved in an existing conference, it will be removed from the conference prior to connection. NOTE: Future L_CCTRL_W_CONF or L_CCTRL_W_CONF_IF_REQ connect operations on these devices will not "remember" that they were connected using the L_CCTRL_WO_CONF connect operation.

Through these conference control options, users of the API are not required to explicitly allocate and maintain conference circuits. Conferences become "bound" to logical devices in the sense that they are "connected" to it.

Disconnecting conference control will be discussed in a later section.

4.4.16 CONS_2_WAY_CONN_ACK

This primitive is returned to indicate the successful processing of a CONS_2_WAY_CONN_CMD. Its' structure, which resides within the *CONS_MSG_DATA_S msg_data* union, is given below:

```
typedef struct {
        CONS_2_WAY_CMD_S    cmd;
} CONS_2_WAY_CONN_ACK_S;
```

where the *cmd* field represents the *CONS_2_WAY_CONN_CMD_S* passed in the original CONS_2_WAY_CONN_CMD message.

4.4.17 CONS_2_WAY_CONN_NACK

This primitive is returned to indicate the unsuccessful processing of a CONS_2_WAY_CONN_CMD. Its' structure, which resides within the *CONS_MSG_DATA_S msg_data* union, is given below:

```
typedef struct {
        DWORD               err_code;
        DWORD               diag;
        CONS_2_WAY_CMD_S    cmd;
} CONS_2_WAY_CONN_NACK_S;
```

where *err_code* contains the reason for failure, *diag* contains a switch specific error code, and the *cmd* field contains the *CONS_2_WAY_CONN_CMD_S* passed in the original CONS_2_WAY_CONN_CMD message.

4.4.18 CONS_1_WAY_CONN_CMD

This primitive is used to construct a one-way voice, with or without a conference bridge, between the logical devices specified in the *CONS_1_WAY_CONN_CMD_S* structure. A *CONS_1_WAY_CONN_ACK* or *CONS_1_WAY_CONN_NACK* will be returned to indicate the success or failure of the command. This *CONS_1_WAY_CONN_CMD_S* structure, which resides within the *CONS_MSG_DATA_S msg_data* union, is given below:

```
typedef struct {
```

```
        SYS_LOG_DEV_ID      speak_dev;
        SYS_LOG_DEV_ID      listen_dev;
        DWORD               conn_cntrl;
        DWORD               disc_cntrl;
} CONS_1_WAY_CONN_CMD_S;
```

*Speak_dev* and *listen_dev* represent the two logical devices to be connected, *conf_cntrl* represents the connecting device conference control, and *disc_cntrl* represents any disconnecting device conference control. The options for *conf_cntrl* are given in the section on the CONS_2_WAY_CONN_CMD. The major difference between the CONS_2_WAY_CONN_CMD and the CONS_1_WAY_CONN_CMD is that a device may be involved in an unlimited number of one-way connections when "speaking" without requiring the use of an internal conference point. Thus, one device may "broadcast" to an unlimited number of other "listen-only" devices--without using a conference point.

Also, it is possible to issue the CONS_1_WAY_CONN_CMD (without previously disconnecting) using two devices that are already involved in a two-way connection, so as to convert a two-way voice into a one-way voice path. Any devices that are removed from an already existing connection are subject to disconnecting conference control. This will be discussed in a later section.

4.4.19 CONS_1_WAY_CONN_ACK

This primitive is returned to indicate the successful processing of a CONS_1_WAY_CONN_CMD. Its' structure, which resides within the *CONS_MSG_DATA_S msg_data* union, is given below:

```
typedef struct {
        CONS_1_WAY_CMD_S    cmd;
} CONS_1_WAY_CONN_ACK_S;
```

where the *cmd* field represents the *CONS_1_WAY_CONN_CMD_S* passed in the original CONS_1_WAY_CONN_CMD message.

4.4.20 CONS_1_WAY_CONN_NACK

This primitive is returned to indicate the unsuccessful processing of a CONS_1_WAY_CONN_CMD. Its' structure, which resides within the *CONS_MSG_DATA_S msg_data* union, is given below:

```
typedef struct {
        DWORD               err_code;
        DWORD               diag;
        CONS_1_WAY_CMD_S    cmd;
} CONS_1_WAY_CONN_NACK_S;
```

where *err_code* contains the reason for failure, *diag* contains a switch specific error code, and the *cmd* field contains the *CONS_1_WAY_CONN_CMD_S* passed in the original CONS_1_WAY_CONN_CMD message.

4.4.21 CONS_DISC_CMD

This primitive is used to remove a device from a connection and tear-down the voice path. The device and disconnecting conference control information are specified in the *CONS_DISC_CMD_S* structure. A *CONS_DISC_ACK* or *CONS_DISC_NACK* will be returned to indicate the success or failure of the command. The *CONS_DISC_CMD_S* structure, which resides within the *CONS_MSG_DATA_S msg_data* union, is given below:

```
typedef struct {
        DWORD                   disc_ctrl;
        SYS_LOG_DEV_ID          log_dev;
} CONS_DISC_CMD_S;
```

*Log_dev* contains the device to be removed from a connection, and *disc_cntrl* contains the disconnecting conference control. The disconnecting conference control specifies what to do when disconnecting a device that will leave a conference point with two parties connected to it. The disconnecting conference control options are given below:

- L_DCTRL_DESTORY_CONF (destroy conference) - destroys a conference if two parties remain in the conference after the disconnect and they are both connected to the conference in the same way. For example, if two parties are connected two-way to the conference then they will be reconnected with a simple two-way voice path. In cases where the two remaining parties are not connected in the same way, the conference will be preserved.
- L_DCTRL_PRESERVE_CONF (preserve conference) - preserves a conference if two parties remain in the conference after the disconnect. In this case, the conference will only be destroyed when the last party disconnects from it.

4.4.22 CONS_DISC_ACK

This primitive is returned to indicate the successful processing of a CONS_DISC_CMD. Its' structure, which resides within the *CONS_MSG_DATA_S msg_data* union, is given below:

```
typedef struct {
        CONS_DISC_CMD_S         cmd;
} CONS_DISC_ACK_S;
```

where the *cmd* field represents the *CONS_DISC_CMD_S* passed in the original CONS_DISC_CMD message.

4.4.23 CONS_DISC_NACK

This primitive is returned to indicate the unsuccessful processing of a CONS_DISC_CMD. Its' structure, which resides within the *CONS_MSG_DATA_S msg_data* union, is given below:

```
typedef struct {
        DWORD                   err_code;
        DWORD                   diag;
        CONS_DISC_CMD_S         cmd;
} CONS_DISC_NACK_S;
```

where *err_code* contains the reason for failure, *diag* contains a switch specific error code, and the *cmd* field contains the *CONS_DISC_CMD_S* passed in the original CONS_DISC_CMD message.

4.4.24 CONS_NAIL_UP_CMD

This primitive is used to construct a persistent two-way voice path between two devices. It is generally used when performing "drop and insert" of signalling related channels. The *CONS_NAIL_UP_CMD_S* structure, which resides within the *CONS_MSG_DATA_S msg_data* union, is given below:

```
typedef struct {
        SYS_LOG_DEV_ID          log_dev_a;
        SYS_LOG_DEV_ID          log_dev_b;
} CONS_NAIL_UP_CMD_S;
```

The two devices to be connected are specified in *log_dev_a* and *log_dev_b*.

4.4.25 CONS_NAIL_UP_ACK

This primitive is returned to indicate the successful processing of a CONS_NAIL_UP_CMD. Its' structure, which resides within the *CONS_MSG_DATA_S msg_data* union, is given below:

```
typedef struct {
        CONS_NAIL_UP_CMD_S  cmd;
} CONS_NAIL_UP_ACK_S;
```

where the *cmd* field represents the *CONS_NAIL_UP_CMD_S* passed in the original CONS_NAIL_UP_CMD message.

EXS Confidential

4.4.1 CONS_NAIL_UP_NACK

This primitive is returned to indicate the unsuccessful processing of a CONS_NAIL_UP_CMD. Its' structure, which resides within the *CONS_MSG_DATA_S msg_data* union, is given below:

```
typedef struct {
        DWORD                   err_code;
        DWORD                   diag;
        CONS_NAIL_UP_CMD_S      cmd;
} CONS_NAIL_UP_NACK_S;
```

where *err_code* contains the reason for failure, *diag* contains a switch specific error code, and the *cmd* field contains the *CONS_NAIL_UP_CMD_S* passed in the original CONS_NAIL_UP_CMD message.

4.4.2 CONS_NAIL_UP_DISC_CMD

This primitive is used to disconnect a persistent "nailed-up" two-way voice path between two devices. It is generally used when performing "drop and insert" of signalling related channels. This *CONS_NAIL_UP_DISC_CMD_S* structure, which resides within the *CONS_MSG_DATA_S msg_data* union, is given below:

```
typedef struct {
        SYS_LOG_DEV_ID          log_dev;
} CONS_NAIL_UP_DISC_CMD_S;
```

It is only necessary to specify one device, in *log_dev*, when disconnecting a nailed up connection.

4.4.3 CONS_NAIL_UP_DISC_ACK

This primitive is returned to indicate the successful processing of a CONS_NAIL_UP_DISC_CMD. Its' structure, which resides within the *CONS_MSG_DATA_S msg_data* union, is given below:

```
typedef struct {
        CONS_NAIL_UP_DISC_CMD_S cmd;
} CONS_NAIL_UP_DISC_ACK_S;
```

where the *cmd* field represents the *CONS_NAIL_UP_DISC_CMD_S* passed in the original CONS_NAIL_UP_DISC_CMD message.

4.4.4 CONS_NAIL_UP_DISC_NACK

This primitive is returned to indicate the unsuccessful processing of a CONS_NAIL_UP_DISC_CMD. Its' structure, which resides within the *CONS_MSG_DATA_S msg_data* union, is given below:

EFRAS Confidential

```
typedef struct {
        DWORD                  err_code;
        DWORD                  diag;
        CONS_NAIL_UP_CMD_S     cmd;
} CONS_NAIL_UP_DISC_NACK_S;
```

where *err_code* contains the reason for failure, *diag* contains a switch specific error code, and the *cmd* field contains the *CONS_NAIL_UP_DISC_CMD_S* passed in the original CONS_NAIL_UP_DISC_CMD message.

4.4.5 CONS_INS_STATE_IND

This primitive is an autonomous event which is used to indicate that a logical device is now "in-service" and is ready to accept call traffic.

```
typedef struct {
        SYS_LOG_DEV_ID         log_dev;
} CONS_INS_STATE_IND_S;
```

The device which is now "in-service" is specified in *log_dev.*

4.4.6 CONS_OOS_STATE_IND

This primitive is an autonomous event which is used to indicate that a logical device is now "out-of-service" and can no longer accept call traffic.

```
typedef struct {
        SYS_LOG_DEV_ID         log_dev;
} CONS_OOS_STATE_IND_S;
```

The device which is now "out-of-service" is specified in *log_dev.*

EBS Confidential

4.5 Call-Control Library

This section details the necessary library routines for communicating with the Connection Server portion of the Switching Engine.

EBS Confidential

4.5.7 f_CONS_init

NAME

| | |
|---|---|
| *f_CONS_init* | Initialize the Connection Server Library. |

SYNOPSIS

| | |
|---|---|
| *int* | ***f_CONS_init ( IPCaddr_t *my_addr, BYTE mode);*** |

DESCRIPTION

*f_CONS_init*

Initializes the CONS API library. *My_addr* must contain the IPCaddr_t that your process registered with. And mode can contains one of the following values:

*L_MODE_ASYNC_HUNT* - For asynchronous hunting operations using the 'asynchronous' library. In this case, the user sends a CONS_GET_DEV_CMD using f_CONS_sndCmdMsg and expects a CONS_GET_DEV_ACK (or CONS_GET_DEV_NACK) in reply. This off-loads hunting related blocking from the application.

*L_MODE_SYNC_HUNT* - For synchronous hunting operations using the 'synchronous' CONS library. In this case, hunting is performed by calling the *f_CONS_getdev* function which will synchronously return the hunted device.

RETURN VALUES

*f_CONS_init*() returns:

| | |
|---|---|
| 0 | on success. |
| -1 | on failure and set *errno* to indicate the error. |

ERRORS

| | |
|---|---|
| EINVALADDR | *My_addr* is invalid. |
| EADDRNULL | *My_addr* is NULL. |
| EINVALMODE | *Mode* is invalid. |
| EREINIT | *F_CONS_init* called more than once. |

EBS Confidential

4.5.8 f_CONS_sndCmdMsg

NAME

| | |
|---|---|
| *f_CONS_sndCmdMsg* | Send a message to the Connection Server. |

SYNOPSIS

| | |
|---|---|
| *int* | ***f_CONS_sndCmdMsg ( IPCmsg_t *msg);*** |

DESCRIPTION

| | |
|---|---|
| *f_CONS_sndCmdMsg* | Send an asynchronous CONS_CMD message to the Connection Server via the AccessMANAGER SPM IPC interface. The data portion of the *IPCmsg_t* should contain a valid *CONS_MSG_S*. The Connection Server will return with an ACK or NACK to the CMD. |

RETURN VALUES

*f_CONS_sndCmdMsg*() returns:

| | |
|---|---|
| 0 | on success. |
| -1 | on failure and set *errno* to indicate the error. |

ERRORS

| | |
|---|---|
| EINVALMSG | *Msg* is invalid. |
| ENOINIT | Library has not been initialized with *f_CONS_init*. |
| ENOCONS | Connection Server is not running. |

EBS Confidential

EBS Confidential

*Chapter 5:* Media Server Interface Specification

5.1 Chapter Overview

This chapter defines the interface between the AccessSERVICES Switching Engine and Call-Control Entity for Media-related functionality, using the Switching Engine Media Server Application Programmer's Interface. The API consists of a set of generic switch independent media capabilities including call-progress tones, digit collection, digit outpulsing, and recorded announcements.

This chapter is organized into the following topics:

- Functional Model
- Message Formats and Call-Control Structures
- Call-Control Primitives
- Call-Control Library

5.2 Functional Model

The AccessSERVICES Switching Engine Media Server (MEDS) Application Programmer's Interface (API) consists of AccessMANAGER SPM IPC messages passed between the Switching Engine and the Call-Control Entity (CCE) using four basic primitives. These include commands (CMD), acknowledgments (ACK), negative acknowledgments (NACK), and indications (IND). The use of these primitives is detailed in the following diagram:

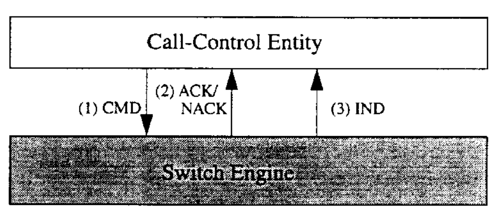

The individual primitives are defined as follows:

- Command (CMD) - primitive used by the CCE when it requires MEDS functions to be performed.
- Acknowledgment (ACK) - primitive used by the MEDS to notify the CCE that a command (CMD) has been successfully processed by the MEDS.
- Negative Acknowledgment (NACK) - primitive used by the MEDS to notify the CCE that a command (CMD) was unsuccessfully processed by the MEDS.
- Indication (IND) - primitive used by the MEDS to notify the CCE that an autonomous event relating to a previous command (CMD) has occurred.

All MEDS API operations are based upon this functional model and the use of these primitives although in some cases a particular operation utilizes only some of the primitives.

5.3 Message Formats and Call-Control Structures

MEDS messages are exchanged between the SWE (MEDS) and CCE via the AccessMANAGER SPM API in the data portion of an *IPCmsg_t* structure. Individual messages are sent to the MEDS using the library function *f_MEDS_sndCmdMsg* and received using the standard *spm_msgrcv*. Each message contains a structure in the form of a MEDS_MSG_S in which all necessary header and message specific data information is stored. This message specific data is accessed through a union of all possible data portions. The "C" structure of the MEDS_MSG_S including the message data union MEDS_MSG_DATA_U, is given below:

```
typedef struct {
        DWORD                   prim_id;
        SYS_LOG_DEV_ID          log_dev;
        DWORD                   pass_thru;
        WORD                    rep_cntrl;
        MEDS_MSG_DATA_U         msg_data;
} MEDS_MSG_S;
```

Figure 5 - 4 MEDS API Message where *prim_id* is the message primitive, *log_dev* is the logical device upon which the operation occurs, *pass_thru* is a pass through value sent in commands and returned in acks, nacks, and indications, *rep_cntrl* is the selective response message control, and *msg_data* is the message specific data portion. This message specific data portion is defined as follows:

```
typedef struct {
        MEDS_CONN_TONE_CMD_S    conn_tone_cmd;
        MEDS_NO_DATA_S          conn_tone_ack;
        MEDS_NACK_S             conn_tone_nack;
```

```
        MEDS_NO_DATA_S          disc_tone_cmd;
        MEDS_NO_DATA_S          disc_tone_ack;
        MEDS_NACK_S             disc_tone_nack;
        MEDS_COLL_DIG_CMD_S     coll_dig_cmd;
        MEDS_NO_DATA_S          coll_dig_ack;
        MEDS_NACK_S             coll_dig_nack;
        MEDS_COLL_DIG_IND       coll_dig_ind;
        MEDS_NO_DATA_S          stp_dig_coll_cmd;
        MEDS_NO_DATA_S          stp_dig_coll_ack;
        MEDS_NACK_S             stp_dig_coll_nack;
        MEDS_OUTP_DIG_CMD_S     outp_dig_cmd;
        MEDS_NO_DATA_S          outp_dig_ack;
        MEDS_NACK_S             outp_dig_nack;
        MEDS_NO_DATA_S          outp_cmplt_ind;
        MEDS_CONN_ANN_CMD_S     conn_ann_cmd;
        MEDS_NO_DATA_S          conn_ann_ack;
        MEDS_NACK_S             conn_ann_nack;
        MEDS_NO_DATA_S          ann_cmplt_ind;
        MEDS_NO_DATA_S          disc_ann_cmd;
        MEDS_NO_DATA_S          disc_ann_ack;
        MEDS_NACK_S             disc_ann_nack;
} MEDS_MSG_DATA_U;
```

Figure 5 - 5 MEDS Message Specific Data Union

The definition and use of these message specific data fields will be described in the following section.

5.4 Call-Control Primitives

This section provides a detailed description of the functionality behind the various primitives provided in the MEDS API, including per-primitive message contents.

5.4.9 MEDS_CONN_TONE_CMD

This primitive is used to play a tone on the specified logical device. The message specific data is contained within the *conn_tone_cmd* field of the MEDS_MSG_DATA_U and is defined as follows:

```
typedef struct {
```

MBS Confidential

```
        BYTE tone;
} MEDS_CONN_TONE_CMD_S;
```

where the tone field is one of the following:

L_TONE_DIALTONE
L_TONE_RINGBACK
L_TONE_LINE_BUSY
L_TONE_REORDER
L_TONE_INTERCEPT
L_TONE_BONG

Some tones are continuous, while others play only a single cycle and return a MEDS_TONE_CMPLT_IND. Continuous tones must be stopped with MEDS_DISC_TONES_CMD.

5.4.10 MEDS_CONN_TONE_ACK

This primitive is used to indicate the successful processing of a MEDS_CONN_TONE_CMD. No data is provided with this primitive.

5.4.11 MEDS_CONN_TONE_NACK

This primitive is used to indicate the unsuccessful processing of a MEDS_CONN_TONE_CMD. The message specific data is contained within the *conn_tone_nack* field of the MEDS_MSG_DATA_U and is defined as follows:

```
typedef struct {
        DWORD     err_code;
        DWORD     diag;
} MEDS_NACK_S;
```

where *err_code* is the error code and *diag* is a switch specific error code.

5.4.12 MEDS_TONE_CMPLT_IND

This primitive is used to indicate the completion of a tone connected by MEDS_CONN_TONE_CMD. No data is provided with this primitive.

5.4.13 MEDS_DISC_TONES_CMD

This primitive is used to disconnect all tones from the specified device. No data is provided with this primitive.

5.4.14 MEDS_DISC_TONES_ACK

This primitive is used to indicate the successful processing of a MEDS_DISC_TONES_CMD. No data is provided with this primitive.

5.4.15 MEDS_DISC_TONES_NACK

This primitive is used to indicate the unsuccessful processing of a MEDS_DISC_TONES_CMD. The message specific data is contained within the *disc_tones_nack* field of the MEDS_MSG_DATA_U and is defined as follows:

```
typedef struct {
        DWORD     err_code;
        DWORD     diag;
} MEDS_NACK_S;
```

where *err_code* is the error code and *diag* is a switch specific error code.

5.4.16 MEDS_COLL_DIG_CMD

This primitive is used to initiate collection of Multi-Frequency(MF) or Dual Tone Multi-Frequency(DTMF) digits. The message specific data is contained within the *coll_dig_cmd* field of the MEDS_MSG_DATA_U and is defined as follows:

```
typedef struct {
        BYTE tone_type;
        BYTE mode;
        BYTE dig_cnt;
        BYTE trm_char_cnt;
        BYTE trm_char_val[L_MAX_TERM_CHARS];
        BYTE first_dig_tmr;
        BYTE inter_dig_tmr;
        BYTE complete_tmr;
} MEDS_COLL_DIG_CMD_S;
```

where *tone_type* is defined as one of the following:

- L_TT_DTMF_TYPE - for DTMF digit collection.
- L_TT_MFR1_TYPE - for MF digit collection.

*mode* is defined to be one of the following:

- L_MODE_FIXED_DIGITS - for collecting a fixed number of digits.
- L_MODE_TERM_CHAR - for collecting all digits up to a terminating character.
- L_MODE_TERM_OR_FIXED - for collecting fixed or up to a terminating character which ever criteria is met first.
- L_MODE_KP_ST - for collecting MF digits.

*dig_cnt* is the number of digits to collect when *mode* is L_MODE_FIXED_DIGITS or L_MODE_TERM_OR_FIXED,

*trm_char_cnt* is the number of terminating characters to look for when *mode* is L_MODE_TERM or L_MODE_TERM_OR_FIXED,

*term_char_val* is an array of terminating characters up to *trm_char_cnt* in size,

*first_dig_tmr* is the first digit timer,

*inter_dig_tmr* is the inter digit timer,

*complete_tmr* is the digit collection completion timer.

5.4.17 MEDS_COLL_DIG_ACK

This primitive is used to indicate the successful processing of a MEDS_COLL_DIG_CMD. No data is provided with this primitive.

5.4.18 MEDS_COLL_DIG_NACK

This primitive is used to indicate the unsuccessful processing of a MEDS_COLL_DIG_CMD. The message specific data is contained within the *coll_dig_nack* field of the MEDS_MSG_DATA_U and is defined as follows:

```
typedef struct {
        DWORD       err_code;
        DWORD       diag;
} MEDS_NACK_S;
```

where *err_code* is the error code and *diag* is a switch specific error code.

5.4.19 MEDS_COLL_DIGITS_IND

This primitive indicates that digit collection has completed. The message specific data is contained within the *coll_dig_ind* field of the MEDS_MSG_DATA_U and is defined as follows:

```
typedef struct {
        BYTE        digits[L_MAX_DIG_CNT];
        BYTE        len;
} MEDS_COLL_DIG_IND_S;
```

where the *digits* field contains the collected digits and *len* contains the length of digits collected.

5.4.20 MEDS_COLL_ERR_IND

This primitive indicates an error occurred while collecting digits. The message specific data is contained within the *coll_dig_ind* field of the MEDS_MSG_DATA_U and is defined as follows:

```
typedef struct {
        BYTE        digits[L_MAX_DIG_CNT];
        BYTE        len;
        BYTE        err_code;
```

DSC Confidential

```
        BYTE        diag;
    } MEDS_COLL_TOUT_IND_S;
```

where the *digits* field contains the collected digits and *len* contains the length of digits collected digits, *err_code* contains the error code, and *diag* contains the switch specific diagnostic.

5.4.21 MEDS_STP_DIG_COLL_CMD

This primitive is used to stop digit collection previously started with a MEDS_COLL_DIG_CMD. No data is provided with this primitive.

5.4.22 MEDS_STP_DIG_COLL_ACK

This primitive is used to indicate the successful processing of a MEDS_STP_DIG_COLL_CMD. No data is provided with this primitive.

5.4.23 MEDS_STP_DIG_COLL_NACK

This primitive is used to indicate the unsuccessful processing of a MEDS_STP_DIG_COLL_CMD. The message specific data is contained within the stp_*dig_coll_nack* field of the MEDS_MSG_DATA_U and is defined as follows:

```
typedef struct {
        DWORD       err_code;
        DWORD       diag;
} MEDS_NACK_S;
```

where *err_code* is the error code and *diag* is a switch specific error code.

5.4.24 MEDS_OUTP_DIG_CMD

This primitive is used to initiate outpulsing of Multi-Frequency(MF) or Dual Tone Multi-Frequency(DTMF) digits. The message specific data is contained within the *outp_dig_cmd* field of the MEDS_MSG_DATA_U and is defined as follows:

```
typedef struct {
        BYTE                tone_type;
        BYTE                fld_cnt;
        MEDS_OUTP_DIG_S     flds[L_MAX_FLD_CNT];
} MEDS_OUTP_DIG_CMD_S;
```

where *tone_type* can be:

- L_TT_DTMF_TYPE - for DTMF digit collection.
- L_TT_MFR1_TYPE - for MF digit collection.

and *fld_cnt* can be 1 or 2 depending upon the number of digits strings that are to be outpulsed. The individual digit fields are contained within the *flds* field and are defined to be:

EBS Confidential

```
typedef struct {
        BYTE        digits[L_MAX_OUTP_DIG_CNT];
        BYTE        len;
} MEDS_OUTP_DIG_S;
```

5.4.25 MEDS_OUTP_DIG_ACK

This primitive is used to indicate the successful processing of a MEDS_STP_DIG_COLL_CMD. No data is provided with this primitive.

5.4.26 MEDS_OUTP_DIG_NACK

This primitive is used to indicate the unsuccessful processing of a MEDS_OUTP_DIG_COLL_CMD. The message specific data is contained within the stp_*dig_coll_nack* field of the MEDS_MSG_DATA_U and is defined as follows:

```
typedef struct {
        DWORD       err_code;
        DWORD       diag;
} MEDS_NACK_S;
```

where *err_code* is the error code and *diag* is a switch specific error code.

5.4.27 MEDS_OUTP_CMPLT_IND

This primitive is used to indicate that the outpulsing is complete for a previous MEDS_OUTP_DIG_CMD. No data is provided with this primitive.

5.4.28 MEDS_CONN_ANN_CMD

The primitive is used to connected a recorded announcement to the specified device. The message specific data is contained within the *conn_ann_cmd* field of the MEDS_MSG_DATA_U and is defined as follows:

```
typedef struct {
        WORD        ann_cnt;
        WORD        ann_ids[L_MAX_ANN];
} MEDS_CONN_ANN_CMD_S;
```

where *ann_cnt* contains the number of announcements to play successively, and *ann_ids* contains the list of announcement IDs, one ID per array element.

5.4.29 MEDS_CONN_ANN_ACK

This primitive is used to indicate the successful processing of a MEDS_CONN_ANN_CMD_S. No data is provided with this primitive.

EBS Confidential

5.4.30 MEDS_CONN_ANN_NACK

This primitive is used to indicate the unsuccessful processing of a MEDS_CONN_ANN_CMD. The message specific data is contained within the *conn_ann_nack* field of the MEDS_MSG_DATA_U and is defined as follows:

```
typedef struct {
        DWORD    err_code;
        DWORD    diag;
} MEDS_NACK_S;
```

where *err_code* is the error code and *diag* is a switch specific error code.

5.4.31 MEDS_ANN_CMPLT_IND

This primitive is used to indicate that an announcement or string of announcements have completed for a previous MEDS_CONN_ANN_CMD. No data is provided with this primitive.

5.4.32 MEDS_DISC_ANN_CMD

This primitive is used to disconnect a playing announcement from the specified device.No data is provided with this primitive.

5.4.33 MEDS_DISC_ANN_ACK

This primitive is used to indicate the successful processing of a MEDS_DISC_ANN_CMD_S. No data is provided with this primitive.

5.4.34 MEDS_DISC_ANN_NACK

This primitive is used to indicate the unsuccessful processing of a MEDS_DISC_ANN_CMD. The message specific data is contained within the *disc_ann_nack* field of the MEDS_MSG_DATA_U and is defined as follows:

```
typedef struct {
        DWORD    err_code;
        DWORD    diag;
} MEDS_NACK_S;
```

where *err_code* is the error code and *diag* is a switch specific error code.

EBS Confidential

5.5 Call-Control Library

This section details the necessary library routines for communicating with the Media Server portion of the Switching Engine.

EBS Confidential

5.5.35 f_MEDS_init

NAME

| | |
|---|---|
| ***f_MEDS_init*** | Initialize the Media Server Library. |

SYNOPSIS

| | |
|---|---|
| ***int*** | ***f_MEDS_init ( IPCaddr_t *my_addr );*** |

DESCRIPTION

| | |
|---|---|
| ***f_MEDS_init*** | Initializes the Media Server API library. *My_addr* must contain the IPCaddr_t that your process registered with. |

RETURN VALUES

*f_MEDS_init*() returns:

| | |
|---|---|
| 0 | on success. |
| -1 | on failure and set *errno* to indicate the error. |

ERRORS

| | |
|---|---|
| EINVALADDR | *My_addr* is invalid. |
| EADDRNULL | *My_addr* is NULL. |

EBS Confidential

5.5.36 f_MEDS_sndCmdMsg

NAME

| | |
|---|---|
| ***f_MEDS_sndCmdMsg*** | Send a command (CMD) message to the IBSS |

SYNOPSIS

| | |
|---|---|
| ***int*** | ***f_MEDS_sndCmdMsg ( IPCmsg_t *ipc_msg);*** |

DESCRIPTION

| | |
|---|---|
| ***f_MEDS_sndCmdMsg*** | sends a previously built *IPCmsg_t* pointed to by *ipc_msg* to the MEDS. |

RETURN VALUES

*f_MEDS_sndCmdMsg*() returns:

| | |
|---|---|
| 0 | on success. |
| -1 | on failure and set *errno* to indicate the error. |

ERRORS

| | |
|---|---|
| EIPCMSGNULL | *Ipc_msg* is NULL. |
| ENOTINIT | MEDS library not initialized. |

EBS Confidential

*Appendix A:* Summa Four Switching Engine Interface Specification

A.1 Chapter Overview

This chapter details the implementation of the various Switching Engine interfaces, including In-band Signalling, Connection, Media, and Object Servers (as described in the previous chapters) for the Summa Four family of Specialty Digital Switching (SDS) platforms. This chapter assumes that the reader is familiar with the SDS Host Command Interface and SDS System Administration procedures. This chapter is organized into the following sections:

- In-band Signalling Server Interface Implementation
- Connection Server Interface Implementation
- Media Server Interface Implementation
- Object Server Implementation
- Operating Commands

A.2 In-band Signalling Interface Implementation

The In-band Signalling Interface implementation relies heavily upon the SDS's programmable Inpulse/Outpulse Rules, and Answer Supervision Templates. In all cases the IBSS API message are a direct translation to and from SDS commands and reports which, by their very nature, are controlled through the programmed Rules and Templates. Thus the use of IBSS primitives is directly related to how the Rules and Templates are designed.

As described in the IBSS Interface Specification each IBSS API message contains a header in the form of an *IBSS_MSG_HDR_S* structure as given below:

```
typedef struct {
        DWORD               prim_id;
        SYS_LOG_DEV_ID      log_dev;
        DWORD               pass_thru;
        WORD                resp_cntrl;
} IBSS_MSG_HDR_S;
```

The *prim_id* is translated into an SDS command as described in the following sections, *log_dev* is passed through transparently as a port address, *pass_thru* is held internally when a REQ message is issued and returned in the corresponding CNF or IND, *resp_cntrl* provides selective response control. In addition, IBSS API messages contain a number of parameters which must be translated into their SDS equivalents. The details of these translations are described in the following sections.

A.2.1 IBSS_OUTSEIZE_REQ

This primitive is translated into an OUTGOING PORT CONTROL ($69) command in the following way (it is assumed that an Outpulse Rule has been pre-programmed into the switch):

- Network Control Byte - return all.
- Controlling Port Address - virtual port address.
- Outgoing Port Control - switching required, attaching, use outgoing port, two-way speech path.
- Outgoing Port Address - *log_dev* from *IBSS_MSG_HDR_S*.
- Rule Control - execute Outpulse Rule specified in L_PRM_OUT_SCEN_ID parameter.
- Disconnect Control - incoming or outgoing port returns to CP_SETUP.
- Outpulse Control Segments - populated with L_PRM_SUP_FLD_X_DIG parameters. The L_PRM_SUP_FLD_5_DIG parameter is equivalent to the ANI field.

When the OUTGOING PORT CONTROL command is successfully processed (return all) it is then passed back to the call-control entity as an IBSS_OUTSEIZE_CNF. If a failure occurs, an IBSS_ERROR_IND is returned with the appropriate error code.

EBSS Confidential

A.2.2 IBSS_RELEASE_REQ

This primitive is translated into an OUTGOING PORT CONTROL ($69) or INCOMING PORT CONTROL ($6A) command by the switching engine (depending upon call direction) in the following way:

- Controlling Port Address - switching engine maintains a table of linked resources. Port address is derived from this table.
- Outgoing/Incoming Port Control - switching required, detaching/forced disconnect, use outgoing port.
- Outgoing/Incoming Port Address - *log_dev* from *IBSS_MSG_HDR_S*.
- Disconnect Control - generate $DA report, force port to idle.

When the port goes on-hook, an OUTGOING PORT CHANGE OF STATE ($DA)/ INCOMING PORT CHANGE OF STATE ($DB) report is returned, which is in turn passed to the call-control entity as an IBSS_RELEASE_CNF primitive. If a failure occurs, an IBSS_ERROR_IND is returned with the appropriate error code.

EBS Confidential

A.2.3 IBSS_ANSWER_REQ

This primitive is translated into an INCOMING PORT CONTROL ($6A) which executes a pre-programmed Inpulse Rule containing a single ANSWER token. The INCOMING PORT CONTROL command will be coded as follows:

- Network Control Byte - return all.
- Controlling Port Address - *log_dev* from *IBSS_MSG_HDR_S*.
- Incoming Port Control Code - no switching
- Rule Control - Inpulse rule (ANSWER_IRULE)
- Segment Control Code - no segments If the INCOMING PORT CONTROL command returns an error (network status byte other than $01) it will be translated in an IBSS_ERROR_IND. When an INPULSE RULE COMPLETE (with Incoming Port Change of State ($DB) segment) report is received it will be translated into a IBSS_ANSWER_CNF.

EBS Confidential

A.2.4 IBSS_WINK_REQ

This primitive is translated into an INCOMING PORT CONTROL ($6A) which executes a pre-programmed Inpulse Rule containing a single WINK NOW token. The INCOMING PORT CONTROL command will be coded as follows:

- Network Control Byte - return error.
- Controlling Port Address - *log_dev* from *IBSS_MSG_HDR_S*.
- Incoming Port Control Code - no switching
- Rule Control - Inpulse rule (WINK_IRULE)
- Segment Control Code - no segments If the INCOMING PORT CONTROL command returns an error (network status byte other than $01) it will be translated in an IBSS_ERROR_IND. When an INPULSE RULE COMPLETE report is received it will be translated into a IBSS_WINK_CNF.

EBS Confidential

A.2.5 IBSS_FLASH_REQ

This primitive is translated into a PORT SUPERVISION CONTROL ($72) command. It is coded as follows:

Network Control Byte - return all.

Port Address - *log_dev* from IBSS_MSG_HDR_S.

Supervision Code - hook-flash port.

When the PORT SUPERVISION CONTROL command returns it will be translated into an IBSS_FLASH_CNF if the network status byte indicates success ($01) or IBSS_ERROR_IND otherwise.

EBS Confidential

A.2.6 IBSS_ERROR_IND

This primitive is returned when a message coming from the switch contains a network status byte other than $01. The Port Address is placed in the *log_dev* of the *IBSS_MSG_HDR_S*.

EBS Confidential

A.2.7 IBSS_DIGITS_IND

This primitive is returned whenever a MF Digit ($D0), DTMF Digit ($D1), or Inpulse Rule Complete ($DD) (with digit segments) report is received by the switch engine during incoming signalling. The Field Designator will determine which parameter the digits will be placed in (ANI goes into L_PRM_SUP_FLD_5_DIGS). If there are errors in any MF Digits or DTMF Digit reports (errors in the status field), and error indication will be returned. The Port Address is placed in the *log_dev* of the *IBSS_MSG_HDR_S*.

EBS Confidential

A.2.8 IBSS_RELEASE_IND

This primitive is returned whenever an OUTGOING PORT CHANGE OF STATE ($DA) / INCOMING PORT CHANGE OF STATE ($DB) is received with a *Change* of "port became inactive". The Port Address is placed in the *log_dev* of the *IBSS_MSG_HDR_S*.

EBS Confidential

A.2.9 IBSS_ANSWER_IND

This primitive is returned whenever an OUTGOING PORT CHANGE OF STATE ($DA) is received with a *Change* of "supervision detected during rule processing" and an *Answer Supervision Code* of "true answer detected". The Port Address is placed in the *log_dev* of the *IBSS_MSG_HDR_S*.

EBS Confidential

A.2.10 IBSS_INSEIZE_IND

This primitive is returned when an INCOMING PORT CHANGE OF STATE ($DB) report is received with a *Change* of "port became active", or when an INPULSE RULE COMPLETE report with is received. The parameter contents of this primitive depend upon how the underlying Inpulse Rule is programmed and the use of REP tokens. The Port Address is placed in the *log_dev* of the *IBSS_MSG_HDR_S*.

EBS Confidential

A.2.11 IBSS_WINK_IND

This primitive is returned when OUTGOING PORT CHANGE OF STATE ($DA) report is received with a *Change* of "supervision detected during rule processing", and an *Answer Supervision Code* of "wink detected". It is assumed that the outgoing port's Answer Supervision templates will be configured to include the REP token for the wink entry. The Port Address is placed in the *log_dev* of the *IBSS_MSG_HDR_S*.

EBS Confidential

A.2.12 IBSS_FLASH_IND

This primitive is returned when OUTGOING PORT CHANGE OF STATE ($DA) report is received with a *Change* of "supervision detected outside of a rule processing", and an *Answer Supervision Code* of "hook-flash detected". The Port Address is placed in the *log_dev* of the *IBSS_MSG_HDR_S*.

EBS Confidential

A.2.13 IBSS_CPA_IND

This primitive is returned when OUTGOING PORT CHANGE OF STATE ($DA) report is received with a *Change* of "supervision detected during rule processing", and an *Answer Supervision Code* containing detection of any tone or voice. It is assumed that Answer Supervision templates will be configured to include the REP token for entries pertaining to tone detection. The Port Address is placed in the *log_dev* of the *IBSS_MSG_HDR_S*.

EBS Confidential

A.2.14 IBSS_OUTSEIZE_CNF

As described in the IBSS_OUTSEIZE_REQ section, when the OUTGOING PORT CONTROL command is successfully processed (return all) it is then passed back to the call-control entity as an IBSS_OUTSEIZE_CNF. The Port Address is placed in the *log_dev* of the *IBSS_MSG_HDR_S*.

EBS Confidential

A.2.15 IBSS_RELEASE_CNF

As described in the IBSS_RELEASE_REQ section, an OUTGOING PORT CHANGE OF STATE ($DA)/INCOMING PORT CHANGE OF STATE ($DB) report is returned, which is in turn passed to the call-control entity as an IBSS_RELEASE_CNF primitive. The Port Address is placed in the *log_dev* field of the *IBSS_MSG_HDR_S*.

EBS Confidential

A.2.16 IBSS_ANSWER_CNF

As described in the IBSS_ANSWER_REQ section, when an INPULSE RULE COMPLETE (with Incoming Port Change of State ($DB) segment) report is received it will be translated into a IBSS_ANSWER_CNF. The Port Address is placed in the *log_dev* field of the *IBSS_MSG_HDR_S*.

EBS Confidential

A.2.17 IBSS_WINK_CNF

As described in the IBSS_WINK_REQ section, when the INPULSE RULE COMPLETE report is received it will be translated into a IBSS_WINK_CNF. The Port Address is placed in the *log_dev* field of the *IBSS_MSG_HDR_S*.

EBS Confidential

A.2.18 IBSS_FLASH_CNF

As described in the IBSS_FLASH_REQ section, when the PORT SUPERVISION CONTROL command returns it will be translated into an IBSS_FLASH_CNF. The Port Address is placed in the *log_dev* field of the *IBSS_MSG_HDR_S*.

EBS Confidential

A.2.19 IBSS_INSEIZE_RSP

This primitive is translated into an INCOMING PORT CONTROL ($6A) command which is coded as follows:

- Network Control Byte - return error.
- Controlling Port Address - *log_dev* from *IBSS_MSG_HDR_S*.
- Incoming Port Control Code - no switching.
- Rule Control - execute Inpulse Rule specified in L_PRM_IN_SCEN_ID parameter.
- Segment Control Code - no segments.

A.3 Connection Server Interface Implementation

The Connection Server Interface is implemented as a direct translation between CONS API primitives and SDS commands/reports. Additional logic must reside in the Switching Engine to maintain connection status per device so that conference points can be allocated when the need arises (1 and 2 way connects). Also a per-device transaction state is maintained so as to differentiate between reports that could have multiple meanings.

As described in the CONS Interface Specification each CONS API message contains a *CONS_MSG_S* in which all necessary header and message specific data is carried. The *CONS_MSG_S* is given below

```
typedef struct {
        DWORD           prim_id;
        DWORD           pass_thru;
        DWORD           rep_cntrl;
        CONS_MSG_DATA_Umsg_data;
} CONS_MSG_S;
```

The *prim_id* field is directly translated into one or more SDS commands, the *pass_thru* field is maintained and returned by the Switching Engine with successive messages, the *rep_cntrl* provides selective message reply control. The translation of message specific data between CONS API formats and SDS formats can found in the following sections.

A.3.1 CONS_2_WAY_CONN_CMD

This primitive is translated into a VOICE PATH CONTROL ($66) or CONFERENCE CONTROL $(6D) command depending upon connecting conference control and the connection status of the ports involved. As described in the CONS API specification, a CONS_2_WAY_CONN_CMD contains the following data:

```
typedef struct {
        SYS_LOG_DEV_ID          log_dev_a;
```

```
        SYS_LOG_DEV_ID      log_dev_b;
        DWORD               conn_cntrl;
        DWORD               disc_cntrl;
} CONS_2_WAY_CONN_CMD_S;
```

*Log_dev_a* and *log_dev_b* are utilized as the two ports to connect (the value in these fields is the actual port address). The procedures by which these devices are connected, and the SDS commands to do so, are dependent upon the *conn_cntrl* field and the current connection status of the *log_dev_a* and *log_dev_b*.

If the *conn_cntrl* field is specified as L_CCTRL_W_CONF (connect with conference) then create a conference and connect *log_dev_a*, *log_dev_b*, and any other device previously connected to *log_dev_a* and *log_dev_b* by issuing a CONFERENCE CONTROL ($6D) command, coded as follows:

- Network Control Byte - return all
- Conference Number - 0
- Conference Control Code - command not used to reserve, start a conference, command not used to tear down, command not used to add ports, command not used to delete ports, command not used for level adjustments.
- Port Count Code - 3
- Port Control Code sets - *Log_dev_a*, *log_dev_b*, and any other devices previously connected to *log_dev_a* and *log_dev_b*. The way (1-way or 2-way) in which the connected devices connect depends upon the way in which they were originally connected.

If the *conn_cntrl* field is specified as L_CCTRL_W_CONF_IF_REQ (connect with conference, if required) and *log_dev_a* or *log_dev_b* is already involved in a conference or a voice path created with VOICE PATH CONTROL ($66) then all devices are conferenced together using the CONFERENCE CONTROL ($6D) procedure described for L_CCTRL_W_CONF. If, however, neither device is involved in an existing connection, a VOICE PATH CONTROL ($66) command is issued, coded as follows:

- Network Control Byte - return all.
- Path Control Modifier - two-way connection.
- A Address - *log_dev_a* from IBSS_MSG_HDR_S.
- B Address - *log_dev_b* from IBSS_MSG_HDR_S.

If the *conn_cntrl* field is specified as L_CCTRL_WO_CONF (connect without conference) then *log_dev_a* and *log_dev_b* are connected using the VOICE PATH CONTROL ($66) command as described above.

Upon issuing a CONS_2_WAY_CONN_CMD, the message will be returned (return all) and the Network Status Byte will determine whether a CONS_2_WAY_CONN_ACK (Network Status Byte = $01) or CONS_2_WAY_CONN_NACK (Network Status Byte != $01) will be returned to the call-control entity.

A.3.2 CONS_2_WAY_CONN_ACK

This primitive is returned when the VOICE PATH CONTROL ($66) command or CONFERENCE CONTROL ($6D) command reply (return all) from a previous CONS_2_WAY_CONN_CMD contains a Network Status Byte of $01.

EBS Confidential

A.3.3 CONS_2_WAY_CONN_NACK

This primitive is returned for a semantic error or when the VOICE PATH CONTROL ($66) command or CONFERENCE CONTROL ($6D) command reply (return all) from a previous CONS_2_WAY_CONN_CMD contains a Network Status Byte other than $01.

EBS Confidential

A.3.4 CONS_1_WAY_CONN_CMD

This primitive is translated the same way as the CONS_2_WAY_CONN_CMD, except that all connections are made "one-way" instead of "two-way".

EBS Confidential

A.3.5 CONS_1_WAY_CONN_ACK

This primitive is returned the same way as the CONS_2_WAY_CONN_ACK.

EBS Confidential

A.3.6 CONS_1_WAY_CONN_NACK

This primitive is returned the same way as the CONS_2_WAY_CONN_NACK.

EBS Confidential

A.3.7 CONS_DISC_CMD

This primitive is translated into a VOICE PATH CONTROL ($66) and/or CONFERENCE CONTROL $(6D) commands depending upon disconnecting conference control and the connection status of the ports involved. As described in the CONS API specification, a CONS_DISC_CMD contains the following data:

```
typedef struct {
        DWORD              disc_cntrl;
        SYS_LOG_DEV_ID     log_dev;
} CONS_DISC_CMD_S;
```

*Log_dev* specifies the device to disconnect.

If *log_dev* is connected to a conference and the *disc_cntrl* field is specified as L_DCTRL_DESTORY_CONF and this CONS_DISC_CMD will leave a conference with two parties connected, then a CONFERENCE CONTROL ($6D) will be issued, coded as follows:

- Network Control Byte - return all
- Conference Number - conference number belong to the device
- Conference Control Code - command not used to reserve, command not used to start a conference, command used to tear down , command not used to add ports, command not used to delete ports, command not used for level adjustments.
- Port Count Code - 3
- Port Control Code sets - Any devices that were previously connected to the conference returned to CP_SETUP.

Immediately following this command, a VOICE PATH CONTROL ($66) command is issued to connect the two existing devices together. This VOICE PATH CONTROL commands is coded as follows:

- Network Control Byte - return all.
- Path Control Modifier - two-way connection.
- A Address - previously connected device from internal connection table.
- B Address - previously connected device from internal connection table.

If *log_dev* is not connected to a conference but connected with a previous VOICE PATH CONTROL ($66) command then a VOICE PATH CONTROL command will be issued, coded as follows:

- Network Control Byte - return all.
- Path Control Modifier - break path.
- A Address - previously connected device from internal connection table.
- B Address - previously connected device from internal connection table.

to break the voice path.

If *log_dev* is connected to a conference and the *disc_cntrl* field is specified as L_DCTRL_PRESERVE_CONF and this CONS_DISC_CMD will leave a conference with two parties connected, then a CONFERENCE CONTROL ($6D) will be issued, coded as follows:

- Network Control Byte - return all
- Conference Number - conference number belong to the device
- Conference Control Code - command not used to reserve, command not used to start a conference, command not used to tear down , command not used to add ports, command used to delete ports, command not used for level adjustments.
- Port Count Code - 3
- Port Control Code sets - *log_dev*, return to CP_SETUP.

If *log_dev* is not connected to a conference and the *disc_cntrl* field is specified as L_DCTRL_PRESERVE_CONF then a VOICE PATH CONTROL command will be issued, coded as follows:

- Network Control Byte - return all.
- Path Control Modifier - break path.
- A Address - previously connected device from internal connection table.
- B Address - previously connected device from internal connection table.

to break the voice path.

EBS Confidential

A.3.8 CONS_DISC_ACK

This primitive is returned when the VOICE PATH CONTROL ($66) command or CONFERENCE CONTROL ($6D) command reply (return all) from a previous CONS_DISC_CMD contains a Network Status Byte of $01.

EBS Confidential

A.3.9 CONS_DISC_NACK

This primitive is returned for a semantic error or when the VOICE PATH CONTROL ($66) command or CONFERENCE CONTROL ($6D) command reply (return all) from a previous CONS_DISC_CMD contains a Network Status Byte other than $01.

EBS Confidential

A.3.10 CONS_NAIL_UP_CMD

This primitive is translated into a VOICE PATH CONTROL ($66) command which is coded as follows:

- Network Control Byte - return all.
- Path Control Modifier - two-way connection.
- A Address - log_dev_a.
- B Address - log_dev_b.

It is assumed that the ports used in this commands will be in the CP_SETUP state.

EBS Confidential

A.3.11 CONS_NAIL_UP_ACK

This primitive is returned for a semantic error or when the VOICE PATH CONTROL ($66) command or CONFERENCE CONTROL ($6D) command reply (return all) from a previous CONS_NAIL_UP_CMD contains a Network Status Byte of $01.

A.3.1 CONS_NAIL_UP_NACK

This primitive is returned for a semantic error or when the VOICE PATH CONTROL ($66) command or CONFERENCE CONTROL ($6D) command reply (return all) from a previous CONS_NAIL_UP_CMD contains a Network Status Byte other than $01.

EBS Confidential

A.3.2 CONS_NAIL_UP_DISC_CMD

This primitive is translated the same as CONS_DISC_CMD.

EBS Confidential

A.3.3 CONS_NAIL_UP_DISC_ACK

This primitive is translated the same as CONS_DISC_ACK.

EBS Confidential

A.3.4 CONS_NAIL_UP_DISC_NACK

This primitive is translated the same as CONS_DISC_ACK.

EBS Confidential

A.3.5 CONS_INS_STATE_IND

This primitive is returned when a PORT STATUS ($D3) or CARD STATUS ($D9) report is received indicating that a port is available to accept traffic. The Port Address is placed in the *log_dev* field of the CONS_INS_STATE_IND_S. In the case of a CARD STATUS report, CONS_INS_STATE_IND messages will be sent for the full range to ports specified in the report.

EBS Confidential

A.3.6 CONS_OOS_STATE_IND

This primitive is returned when a PORT STATUS ($D3) or CARD STATUS ($D9) report is received indicating that a port is not available to accept traffic. The Port Address is placed in the *log_dev* field of the CONS_INS_STATE_IND_S. In the case of a CARD STATUS report, CONS_INS_STATE_IND messages will be sent for the full range to ports specified in the report.

A.4 Media Server Interface Implementation

A.4.1 MEDS_CONN_TONE_CMD

This primitive is translated into a VOICE PATH CONTROL ($66) command which is coded from the MEDS_CONN_TONE_CMD_S as follows:

- Network Control Byte - return all.
- Path Control Modifier - connect one-way
- A Address - *log_dev* from MEDS_MSG_S.
- B Address - *tone* port address EBS Confidential

A.4.2 MEDS_CONN_TONE_ACK

This primitive is returned when the VOICE PATH CONTROL ($66) command reply (return all) from a previous MEDS_CONN_TONE_CMD contains a Network Status Byte of $01.

EBS Confidential

A.4.3 MEDS_CONN_TONE_NACK

This primitive is returned for a semantic error or when the VOICE PATH CONTROL ($66) command reply (return all) from a previous MEDS_CONN_TONE_CMD contains a Network Status Byte other than $01. The Network Status Byte is stored in the *diag* parameter.

EBS Confidential

A.4.4 MEDS_TONE_CMPLT_IND

This primitive will be returned when a tone plays to completion. Since the S4 does not utilize this concept, a timer will be started for certain tones when the MEDS_CONN_TONE_ACK is returned. When the timer expires, this primitive will be returned.

EBS Confidential

A.4.5 MEDS_DISC_TONES_CMD

This primitive is translated into a VOICE PATH CONTROL ($66) command which is coded as follows:

- Network Control Byte - return all.
- Path Control Modifier - break path
- A Address - *log_dev* from MEDS_MSG_S.
- B Address - *$0000*

EBS Confidential

A.4.6 MEDS_DISC_TONES_ACK

This primitive is returned when the VOICE PATH CONTROL ($66) command reply (return all) from a previous MEDS_DISC_TONE_CMD contains a Network Status Byte of $01.

EBS Confidential

A.4.7 MEDS_DISC_TONES_NACK

This primitive is returned for a semantic error or when the VOICE PATH CONTROL ($66) command reply (return all) from a previous MEDS_DISC_TONE_CMD contains a Network Status Byte other than $01. The Network Status Byte is stored in the *diag* parameter.:

EBS Confidential

A.4.8 MEDS_COLL_DIG_CMD

This primitive is translated into a DTMF COLLECTION CONTROL ($67) or MF COLLECTION CONTROL ($68) command. This is determined by the *tone_type* field in the MEDS_COLL_DIG_CMD_S structure.

For DTMF digit collection (tone_type == L_TT_DTMF_TYPE), the DTMF COLLECTION CONTROL command is populated as follows:

- Network Status Byte - return all.
- Controlling Port Address - *log_dev* from MEDS_MSG_S.
- Receiver Port Control Code - switching required, attach receiver, hunt receiver circuit, release DTMF receiver after report.
- Enable/Options - enable DTMF receiver, use enhanced structure, Collection Timers segment attached.
- Number of Digits - determined by the *mode* and *dig_cnt* fields in the MEDS_COLL_DIG_CMD_S structure.
- Digits Storage - do not store digits, do not append digits.
- Collection Timers - from the *first_dig_tmr*, *inter_dig_tmr*, and *complete_tmr* fields of the MEDS_COLL_DIG_CMD_S.
- Reenter/End of String Segment - one digit end of string code if *mode* is L_MODE_TERM_CHAR or L_MODE_TERM_OR_FIXED.
- First Digit Conditions - no first digit reporting, no tone on first digit, no wink on first digit, etc.

For MF digit collection (tone_type == L_TT_MF_TYPE), the MF COLLECTION CONTROL command is populated as follows:

- Network Status Byte - return all.
- Controlling Port Address - log_dev from MEDS_MSG_S.
- Receiver Port Control Code - switching required, attach receiver, hunt receiver circuit, release MF receiver after report.
- Digit Collection Control - enable receiver, MF processing.

All timers are default and the *mode* must be L_MODE_KP_ST.

A.4.9 MEDS_COLL_DIG_ACK

This primitive is returned when the DTMF COLLECTION CONTROL ($67)/MF COLLECTION CONTROL ($68) command reply (return all) from a previous MEDS_COLL_DIG_CMD contains a Network Status Byte of $01.

EBS Confidential

A.4.10 MEDS_COLL_DIG_NACK

This primitive is returned for a semantic error or when the DTMF COLLECTION CONTROL ($67)/MF COLLECTION CONTROL ($68) command reply (return all) from a previous MEDS_COLL_DIG_CMD contains a Network Status Byte other than $01. The Network Status Byte is stored in the *diag* parameter.

EBS Confidential

A.4.11 MEDS_COLL_DIGITS_IND

This primitive is returned when a DTMF DIGIT ($D1) or an MF DIGIT ($D0) report is received. The MEDS_COLL_DIG_IND_S *digits* field is populated from the Digit String field of the DTMF or MF DIGIT report and the *len* field is populated with the length of the collected string.

EBS Confidential

A.4.12 MEDS_COLL_ERR_IND

This primitive is returned when a DTMF DIGIT ($D1) or an MF DIGIT ($D0) report is received and the Status field indicates an error has occurred. The MEDS_COLL_DIG_IND_S *digits* field is populated from the Digit String field of the DTMF or MF DIGIT report, the *len* field is populated with the length of the collected string, the *diag* field is populated with the Status field and *err_code* is populated with the applicable error code.

EBS Confidential

A.4.13 MEDS_STP_DIG_COLL_CMD

This primitive is translated into a DTMF COLLECTION CONTROL ($67) or MF COLLECTION CONTROL ($68) command the same as with the MEDS_COLL_DIG_CMD, except the Receiver Port Control Code is specified as "detach receiver".

EBS Confidential

A.4.14 MEDS_STP_DIG_COLL_ACK

This primitive is returned when the DTMF COLLECTION CONTROL ($67)/MF COLLECTION CONTROL ($68) command reply (return all) from a previous MEDS_STP_DIG_COLL_CMD contains a Network Status Byte of $01.

EBS Confidential

A.4.15 MEDS_STP_DIG_COLL_NACK

This primitive is returned for a semantic error or when the DTMF COLLECTION CONTROL ($67)/MF COLLECTION CONTROL ($68) command reply (return all) from a previous MEDS_STP_DIG_COLL_CMD contains a Network Status Byte other than $01. The Network Status Byte is stored in the *diag* parameter.

EBS Confidential

A.4.16 MEDS_OUTP_DIG_CMD

This primitive is translated into an OUTGOING PORT CONTROL ($69) command. This command causes execution of a pre-programmed rule that outpulses either DTMF or MF digits. The OUTGOING PORT CONTROL command is populated from fields in the MEDS_OUTP_DIG_CMD_S. Depending upon *tone_type*, a "tone-specific" rule will be executed within the switch. The *digits* field will be copied to an Outpulse Control Segment. NOTE: The Outpulse Rule will not execute any out-of-band signalling (A/B bit state changes), it will only outpulse digits.

A.4.1 MEDS_OUTP_DIG_ACK

This primitive is returned when the OUTGOING PORT CONTROL command reply (return all) from a previous MEDS_OUTP_DIG_CMD contains a Network Status Byte of $01.

EBS Confidential

A.4.2 MEDS_OUTP_DIG_NACK

This primitive is returned for a semantic error or when the OUTGOING PORT CONTROL command reply (return all) from a previous MEDS_OUTP_DIG_CMD contains a Network Status Byte other than $01. The Network Status Byte is stored in the *diag* parameter.

EBS Confidential

A.4.3 MEDS_OUTP_CMPLT_IND

This primitive will be returned when an OUTGOING PORT CHANGE OF STATE ($DA) (Outpulse Rule Complete) is returned for a port issued a previous MEDS_OUTP_DIG_CMD.

EBS Confidential

A.4.4 MEDS_CONN_ANN_CMD

The primitive is translated into a VOICE PORT CONTROL ($6C) command which is coded from the MEDS_CONN_ANN_CMD_S as follows:

- Network Control Byte - return all.
- Control Port Address - *log_dev* from MEDS_MSG_S.
- Control Port Control Code - switching action required, attach, hunt, release port after played.
- Voice Port Address - voice port hunt group
- Prompt Control - play number of prompts specified in *ann_cnt* field, generate $DE.
- Phrases - populated from *ann_ids* array.

EBS Confidential

A.4.5 MEDS_CONN_ANN_ACK

This primitive is returned when the VOICE PORT CONTROL command reply (return all) from a previous MEDS_CONN_ANN_CMD contains a Network Status Byte of $01.

EBS Confidential

A.4.6 MEDS_CONN_ANN_NACK

This primitive is returned for a semantic error or when the VOICE PORT CONTROL command reply (return all) from a previous MEDS_CONN_ANN_CMD contains a Network Status Byte other than $01. The Network Status Byte is stored in the *diag* parameter.

EBS Confidential

A.4.7 MEDS_ANN_CMPLT_IND

This primitive is returned when a VOICE PORT STATUS ($DE) report is received on a port previous sent a MEDS_CONN_ANN_CMD.

EBS Confidential

A.4.8 MEDS_DISC_ANN_CMD

The primitive is translated into a VOICE PORT CONTROL ($6C) command which is coded as follows:

- Network Control Byte - return all.
- Control Port Address - *log_dev* from MEDS_MSG_S.
- Control Port Control Code - switching action required, detach, hunt, release port after played.

EBS Confidential

A.4.9 MEDS_DISC_ANN_ACK

This primitive is returned when the VOICE PORT CONTROL command reply (return all) from a previous MEDS_DISC_ANN_CMD contains a Network Status Byte of $01.

EBS Confidential

A.4.10 MEDS_DISC_ANN_NACK

This primitive is returned for a semantic error or when the VOICE PORT CONTROL command reply (return all) from a previous MEDS_DISC_ANN_CMD contains a Network Status Byte other than $01. The Network Status Byte is stored in the *diag* parameter.

A.5 Object Server Implementation

This section describes the implementation of the Managed Object Server functionality within the Summa Four Switching Engine. The Managed Object Server or Object Server for short, provides all necessary logic for configuration, initialization, and maintenance of the Summa Four switching matrix (SDS). In this particular implementation, the Summa Four SNMP interface is used to communicate with the SDS for OA&M purposes. In general each Object Server managed object is equivalent to an individual table in the SDS's management information base (MIB).

A.5.1 General Functionality

Figure 1.5.1-1 shows the message flows between various AccessSERVICES entities participating in the configuration of a Summa Four switch. When a configuration command is typed into the MML command interpreter it parses the string, encodes it into an Object Server Request PDU, and passes it down to an appropriate managed object server (in this case the Summa Four switching engine) for processing. The Summa Four switch engine maintains a mapping between the command parameters and the MIB table attributes. Based on that mapping, it builds variable binding lists for SNMP get-set PDUs. Then a dialog is initiated between the SWE and the Summa Four SNMP agent. After the dialog is completed, its' results (indication of success/failure or requested data) are returned to an MML interpreter.

Figure 1.5.1-1 MML command processing

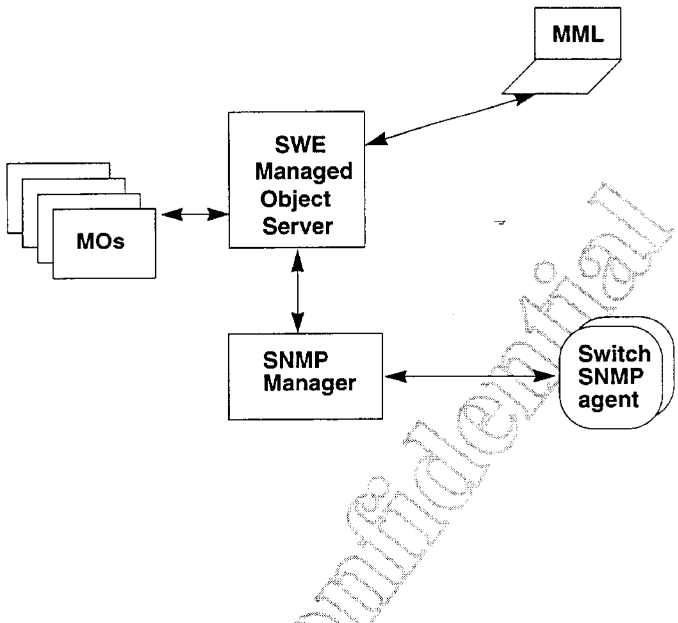
EBS Confidential

A.5.2 MML Command Processing Scenarios
A.5.2.1 *ADD* Scenario
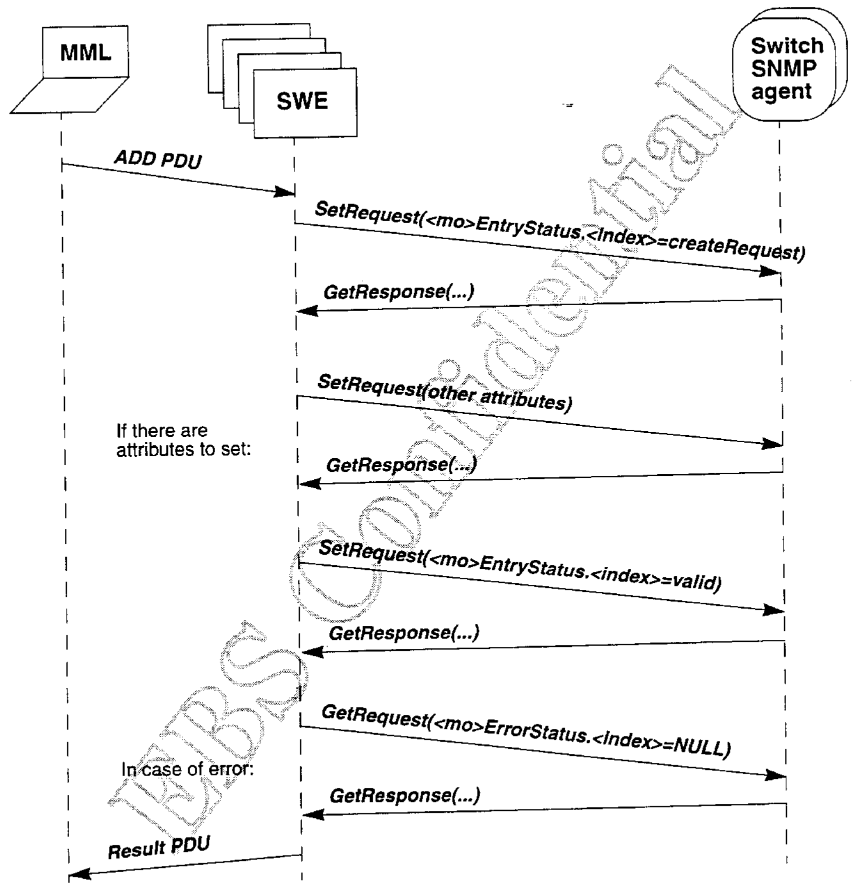
EBS Confidential

A.5.2.2 *MODIFY* Scenario
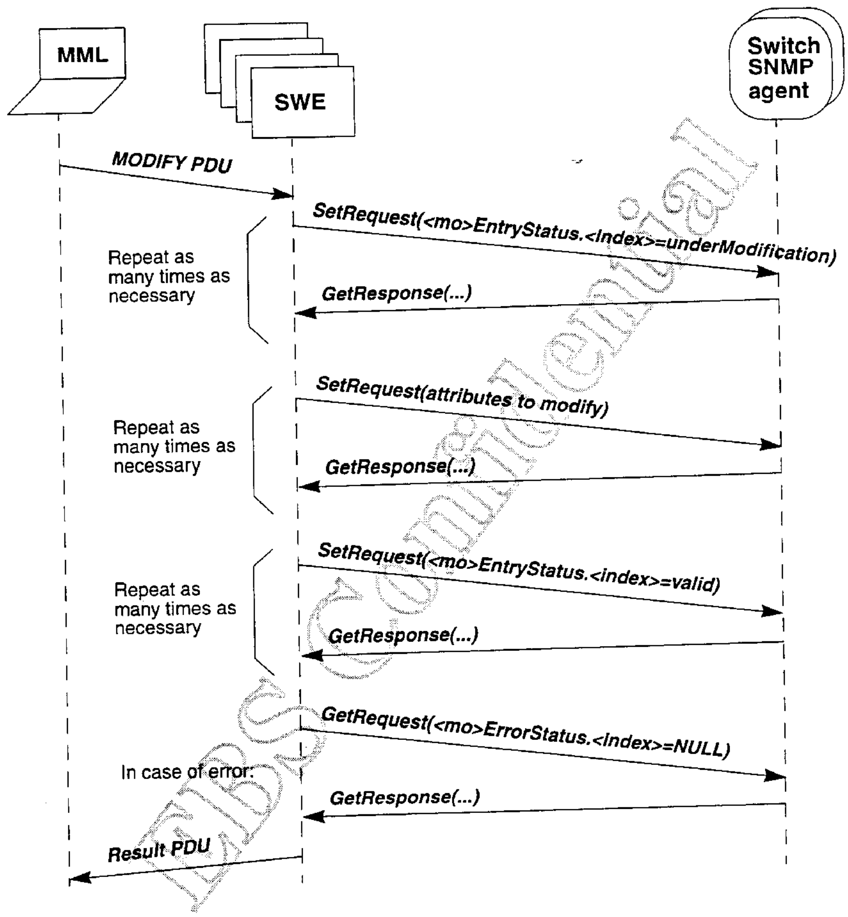
EBS Confidential

A.5.2.3 *DELETE* Scenario
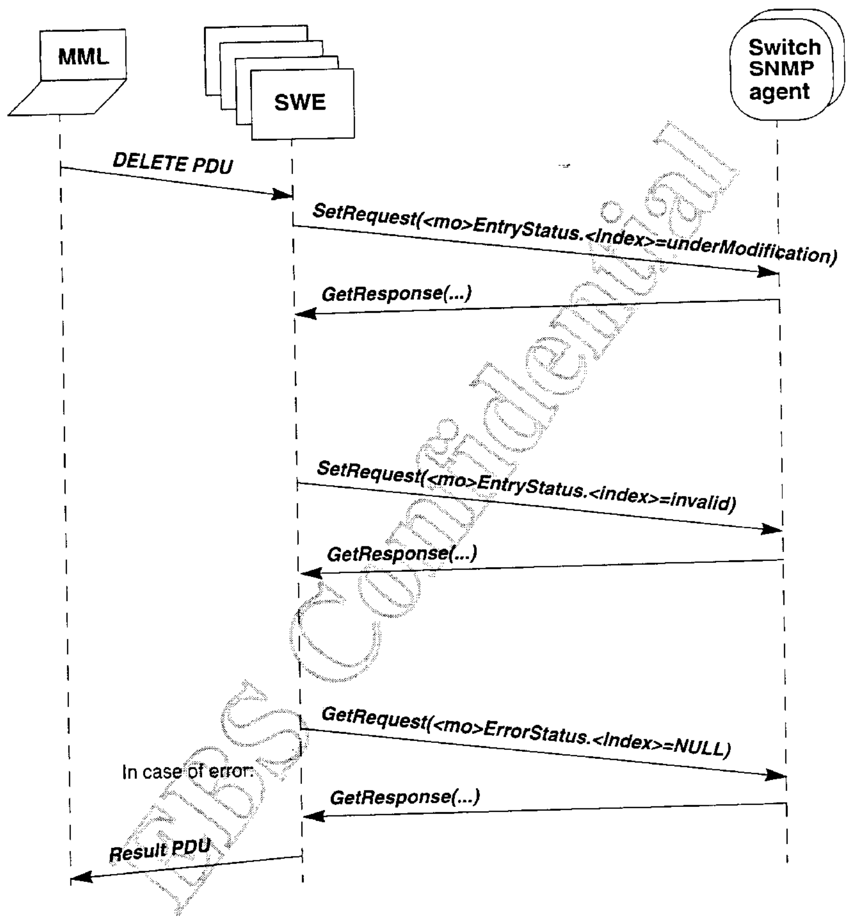
EBS Confidential

A.5.2.4 *DISPLAY* Scenario
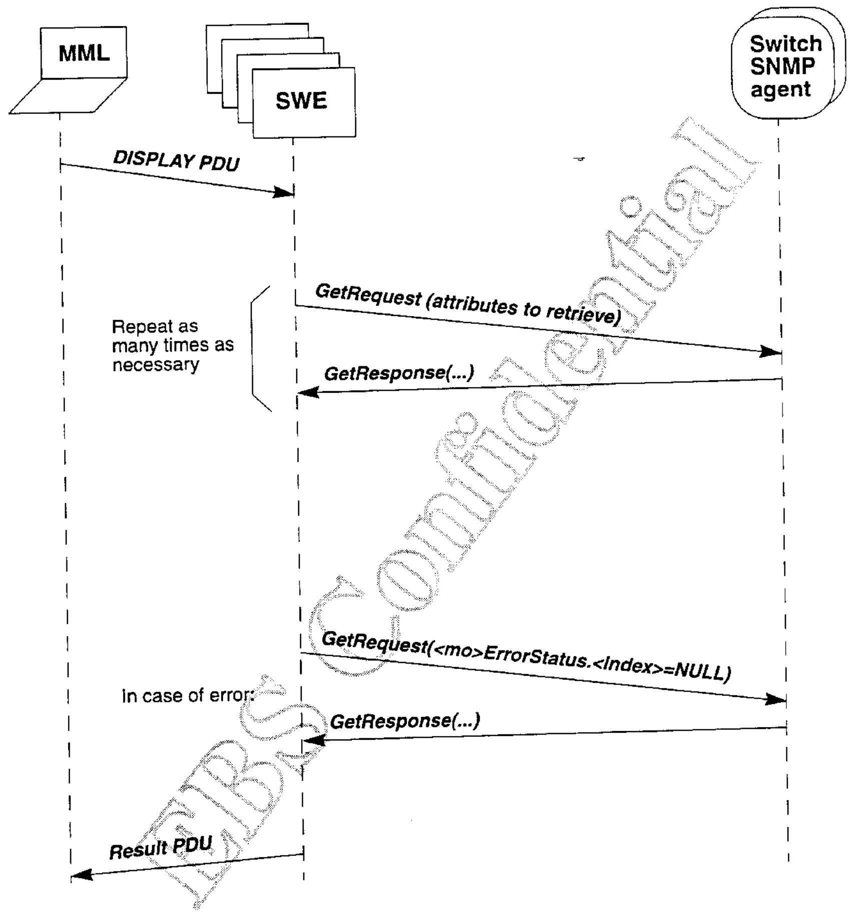
EBS Confidential

A.5.2.5 Subscriber Line Interface Card (SLIC) Set-up Example

Let us assume that a new line card is installed in the Expansion rack (rack 2), level 1, slot 10 (R-L-S address is 2-1-10). To introduce this card to the system, the following steps are performed:

*1.* From the command line a user types ......*ADD-LC:RACK=2,LEVEL=1,SLOT=10;*

2. MML interpreter identifies an MO for the command (LC managed object).

*3.* MML interpreter retrieves information from CNFG database regarding parameters required by the LC for *ADD* operation.

*4.* MML interpreter parses the command and passes it to the LC managed object.

*5.* LC managed object is responsible for the lcTable object in the MIB. It maps R-L-S address into the lcIndex value as defined in the MIB (in our case, the lcIndex value would be 94).

*6.* LC managed object initiates the *ADD* dialog, which is described below:

*a.* Send: SetRequest (lcEntryStatus.94 = createRequest)

*b.* **Receive: GetResponse message. If error-status = error then go to *(f)*.**

*c.* Send: SetRequest (lcEntryStatus.94 = valid)

*d.* **Receive: GetResponse message. If error-status = error then go to *(f)*.**

*e.* Finish the dialog.

*f.* Send: GetRequest (lcErrorStatus.94 = NULL)

*g.* Receive: GetResponse message with error number.

*h.* Finish the dialog.

*7.* LC managed object returns success/failure indication to the MML interpreter. In case of error, its code and text message are returned.

*8.* In case of success the user types ........................................................... *MODIFY-LC:RACK=2,LEVEL=1,SLOT=10,STATUS=A;*

*9.* MML interpreter does the necessary work and send a message to the LC.

*10.* LC managed object initiates the *MODIFY* dialog:

*a.* Send: SetRequest (lcEntryStatus.94 = underModification)

*b.* **Receive: GetResponse message. If error-status = error then go to *(h)*.**

*c.* Send: SetRequest (lcStatus = active)

*d.* **Receive: GetResponse message. If error-status = error then go to *(h)*.**

*e.* Send: SetRequest (lcEntryStatus.94 = valid)

*f.* **Receive: GetResponse message. If error-status = error then go to *(h)*.**

*g.* Finish the dialog.

*h.* Send: GetRequest (lcErrorStatus.94 = NULL)

*i.* Receive: GetResponse message with error number.

*j.* Finish the dialog.

*11.* LC managed object returns success/failure indication to the MML interpreter. In case of error, its code and text message are returned.

A.6 Operating Commands

This section contains the Summa Four Switching Engine specific MML commands.

EBS Confidential

A.6.1 ADD-LC

NAME

*ADD-LC* Add a line card to the system

DESCRIPTION

Introduces a new Subscriber Line Interface Card (SLIC) to the system. Card location is specified by its R-L-S (rack-level-slot) address.

When a card is added, its initial status is Out-Of-Service. Use *MODIFY-LC* command to bring the card on line and make it available for the system to use.

SYNOPSIS

*ADD-LC:RACK*=rack#,*LEVEL*=level#,*SLOT*=slot#;

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |

EXAMPLES

MML_TH>ADD-LC:RACK=1,LEVEL=2,SLOT=15;

ERROR MESSAGES

*Incomplete R-L-S hardware address*

*R-L-S address does not exist*

*Card <R-L-S address>: already exists*

*Only NBC card is allowed in the slot <slot#>*

*Only BRC in slot one of expansion rack*

EBS Confidential

A.6.2 DELETE-LC

NAME

*DELETE-LC* Delete a line card from the system

DESCRIPTION

Removes a Subscriber Line Interface Card from the system. Card location is specified by its R-L-S (rack-level-slot) address. A card must be Out-Of-Service to be deleted. Prior to deletion all ports on the card must be removed from any resource group that they belong to.

SYNOPSIS

*DELETE-LC:RACK*=rack#,*LEVEL*=level#,*SLOT*=slot#;

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |

EXAMPLES

MML_TH>DELETE-LC:RACK=1,LEVEL=2,SLOT=15;

ERROR MESSAGES

*Incomplete R-L-S hardware address*

*R-L-S address does not exist*

*Card <R-L-S address>: is not OUT OF SERVICE*

*Card <R-L-S address>: ports still in resource group*

*Invalid card location <R-L-S address>*

EBS Confidential

A.6.3 MODIFY-LC

NAME

*MODIFY-LC* Modify a line card status

DESCRIPTION

Modifies a Subscriber Line Interface Card status. Card location is specified by its R-L-S (rack-level-slot) address. The card should be physically installed in order to be put in *ACTIVE* or *MAINTENANCE* status.

SYNOPSIS

*MODIFY-LC:RACK*=rack#,*LEVEL*=level#,*SLOT*=slot#,*STATUS*=newstatus;

*rack#* Rack number where the card is situated (1 or 2).

*level#* Level number within the rack (rack1 - 1,2,3; rack2 - 0,1,2,3).

*slot#* Slot number on the level (1 to 21).

*newstatus* New card status. Can be one of the following list:

*A (ACTIVE)* - ports on this card can be involved in active calls and can be allocated for new calls.

*M (MAINTENANCE)* - One or more ports on this card may be involved in active calls. No ports are allocated to new calls.

*D (DIAGNOSTICS)* - No ports are involved in calls or allocated to new calls. The card should already be in *active* or *maintenance* status.

*O (OUTOFSERVICE)* - No ports on this card can be involved in active calls or allocated to new calls. Any active calls into ports on this card are torn down.

*P (PAYLOADLOOPBACK)* - diagnostic state

*R (REMOTELOOPBACK)* - diagnostic state

*C (CAMPEDON) (cannot be used as new status)* - status change to *diagnostics* mode was attempted while ports on this card were still involved in calls; no ports are allocated for new calls and the card remains in this mode until further administrator action.

EXAMPLES

MML_TH>MODIFY-LC:RACK=1, LEVEL=2, SLOT=15, STATUS=ACTIVE;

ERROR MESSAGES

*Incomplete R-L-S hardware address*

EBS Confidential

*R-L-S address does not exist*

*Card <R-L-S address>: cannot be put into DIAGNOSTIC*

*Card <R-L-S address>: does not support remote loopback*

*Card <R-L-S address>: cannot be put into MAINTENANCE*

*Card <R-L-S address>: invalid status change request*

*Card <R-L-S address>: already active*

*Card <R-L-S address>: download is in progress*

*Card <R-L-S address>: alarm exists*

*Card <R-L-S address>: ports still active - status changed to CAMPEDON*

*Card <R-L-S address>: ports still active - status left in CAMPEDON*

*Card <R-L-S address>: does not support PAYLOAD LOOPBACK*

*Card <R-L-S address>: exceeded time-slot capacity*

*Invalid card location <R-L-S address>*

*Card <R-L-S address>: must be in ACTIVE or MAINTENANCE status*

EBS Confidential

A.6.4 DISPLAY-LC

NAME

*DISPLAY-LC* Display current line card information

DESCRIPTION

Displays a Subscriber Line Interface Card information. Card location is specified by its R-L-S (rack-level-slot) address. See *MODIFY-LC* command for the full status list.

SYNOPSIS

*DISPLAY-LC:RACK*=rack#,*LEVEL*=level#,*SLOT*=slot#;

| | |
|---|---|
| *rack#* | Rack number where the card is situated (1 or 2). |
| *level#* | Level number within the rack (rack1 - 1,2,3; rack2 - 0,1,2,3). |
| *slot#* | Slot number on the level (1 to 21). |

Configuration is displayed in the following format:

Card <card type>, Location <R-L-S address>:
STATUS = <current card status>
UNUSED PORTS = <number of ports not currently active on this card>
FIRMWARE VERSION = <version and revision level of the firmware installed on the card>
ALARM = <which alarms are active on this card; one of the following list:
CARDFAILUREMINOR
PORTFAILUREMINOR
CARD&PORTFAILUREMINOR>
OWNER = <configuration entity name>

EXAMPLES

MML_TH>DISPLAY-LC:RACK=1,LEVEL=2,SLOT=15;

ERROR MESSAGES

*Incomplete R-L-S hardware address*

*R-L-S address does not exist*

*Invalid card location <R-L-S address>*

A.6.5 MODIFY-LCPORT

NAME

*MODIFY-LCPORT* Modify a line card port configuration

DESCRIPTION

Modifies a Subscriber Line Interface Card port attributes. Card location is specified by its R-L-S (rack-level-slot) address. When the card is introduced to the system using *ADD-LC* command, its 8 ports are automatically added to the port table. They have to be activated in order to be available to the system.

To reset the port, first make it *INACTIVE*, then set it back to *ACTIVE.*

At least one attribute has to be present in the command.

SYNOPSIS

*MODIFY-LCPORT: RACK*=rack#, *LEVEL*=level#, *SLOT*=slot#, *PORT=port#,*
*[PORTNAME=**name,* *PORTSTATE*=newstate, *PORTCOS*=class,
*INPRULE*=rule#, *RESGROUP*=group#*];*

*rack#* Rack number where the card is situated (1 or 2).

*level#* Level number within the rack (rack1 - 1,2,3; rack2 - 0,1,2,3).

*slot#* Slot number on the level (1 to 21).

*port#* Port number (1 to 8). Wildcard "*" can be used to specify all ports on the card.

*name* Optional entry used to identify individual circuits. A port name describes what this port is used for (up to 8 characters).

*newstate* New port state. Can be one of the following:

*ACTIVE* - the port can be involved in active calls and can be allocated for new calls.

*INACTIVE* - the port cannot be allocated to a call.

If any of the ports are involved in active calls, these calls are torn down and the ports are deactivated. Call processing will no longer try to assign any calls to the ports. It is not necessary to remove the deactivated ports from their resource group.

*class* Class of Service for the port. Determines the operating characteristics for this port. Ports on the same card can belong to different classes. Class can be one of the following:

*O* - Originating: for calls originating from the system (outgoing calls).

EBS Confidential

*T* - Terminating: for calls terminating at the system (incoming calls).

*2W* - Two-Way: for both incoming and outgoing calls.

*AO* - AlwaysOffHook and Originating: for outgoing calls. Port goes off-hook at the system reset and remains off-hook.

*AT* - AlwaysOffHook and Terminating: for incoming calls. Port goes off-hook at the system reset and remains off-hook.

*A2* - AlwaysOffHook and Two-Way: for both incoming and outgoing calls. Port goes off-hook at the system reset and remains off-hook.

| | |
|---|---|
| *rule#* | Inpulse Rule number (0 to 30). Determines the default Inpulse Rule processed when this port goes off-hook. 0 means no default Inpulse Rule. |
| *group#* | Number of the resource group to which this port should belong (1 to 63). |

EXAMPLES

MML_TH>MODIFY-LCPORT:RACK=1, LEVEL=2, SLOT=15, PORT=1, PORTSTATE=ACTIVE, PORTCOS=T, INPRULE=3, RESGROUP=23;

ERROR MESSAGES

*Incomplete R-L-S hardware address*

*R-L-S address does not exist*

*Invalid card location <R-L-S address>*

*No attributes specified*

*Card <R-L-S address>: invalid port <port#>*

*Card <R-L-S address>: download is in progress*

*Card <R-L-S address>: alarm exists*

*Invalid attribute <attribute name> specified*

*Invalid attribute <attribute name> value <value> specified*

*Card <R-L-S address>: no available port memory*

A.6.6 DISPLAY-LCPORT

NAME

*DISPLAY-LCPORT* Display a line card port configuration

DESCRIPTION

Displays Subscriber Line Interface Card port attributes. Card location is specified by its R-L-S (rack-level-slot) address.

SYNOPSIS

*DISPLAY-LCPORT: RACK*=rack#, *LEVEL*=level#, *SLOT*=slot#, *PORT=port#;*

| | |
|---|---|
| *rack#* | Rack number where the card is situated (1 or 2). |
| *level#* | Level number within the rack (rack1 - 1,2,3; rack2 - 0,1,2,3). |
| *slot#* | Slot number on the level (1 to 21). |
| *port#* | Port number (1 to 8). Wildcard "*" can be used to specify all ports on the card. |

Configuration is displayed in the following format:

Card <card type>, Location <R-L-S address>:
Port <port#>
**PORTSTATE = <current port state; for possible values see *MODIFY-LCPORT*>**
PORTNAME = <name>
**PORTCOS = <class of service; for possible values see *MODIFY-LCPORT*>**
PORTMAJORSTATE = <major port state (listed in Section A.7.1 on page 129)>
PORTSUPPSTATE = <supplementary port state (listed in Section A.7.1 on page 129)>
PORTADDRESS = <logical device identifier>
INPULSE RULE = <rule #>
RESOURCE GROUP = <group #>
OWNER = <configuration entity name>

ERROR MESSAGES

*Incomplete R-L-S hardware address*

*R-L-S address does not exist*

*Invalid card location <R-L-S address>*

*Card <R-L-S address>: invalid port <port#>*

A.6.7 ADD-PTC

NAME

*ADD-PTC* Add a programmable trunk card to the system

DESCRIPTION

Introduces a new Programmable Trunk Card (PTC) to the system. Card location is specified by its R-L-S (rack-level-slot) address.

When a card is added, its initial status is Out-Of-Service. Use *MODIFY-PTCSPAN* command to bring the card spans on line and make it available for the system to use.

SYNOPSIS

*ADD-PTC:RACK*=rack#, *LEVEL*=level#, *SLOT*=slot#, *TYPE*=cardtype;

*rack#* Rack number where the card is situated (1 or 2).

*level#* Level number within the rack (rack1 - 1,2,3; rack2 - 0,1,2,3).

*slot#* Slot number on the level (1 to 21).

*cardtype* Programmable trunk card type. Can be one of

4T1 - 4 span T1 card

4E1 - 4 span E1 card

MVDCT1 - Multi-purpose Voice/Data Card (1 T1 span)

EXAMPLES

```
MML_TH>ADD-PTC: RACK=1,LEVEL=2,SLOT=15, TYPE=4T1;
```

ERROR MESSAGES

*Incomplete R-L-S hardware address*

*R-L-S address does not exist*

*Card <R-L-S address>: already exists*

*Only NBC card is allowed in the slot <slot#>*

*Only BRC in slot one of expansion rack*

A.6.8 DELETE-PTC

NAME

*DELETE-PTC* Delete a programmable trunk card from the system

DESCRIPTION

Removes a Programmable Trunk Card from the system. Card location is specified by its R-L-S (rack-level-slot) address. A card must be Out-Of-Service to be deleted. Prior to deletion all the ports on the card must be removed from any resource group they belong to .

SYNOPSIS

*DELETE-PTC:RACK*=rack#, *LEVEL*=level#, *SLOT*=slot#, *TYPE*=cardtype;

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |
| ***cardtype*** | Programmable trunk card type. Can be one of<br>4T1 - 4 span T1 card<br>4E1 - 4 span E1 card<br>MVDCT1 - Multi-purpose Voice/Data Card (1 T1 span) |

EXAMPLES

MML_TH>DELETE-PTC: RACK=1, LEVEL=2, SLOT=15, TYPE=4T1;

ERROR MESSAGES

*Incomplete R-L-S hardware address*

*R-L-S address does not exist*

*Card <R-L-S address>: is not OUT OF SERVICE*

*Card <R-L-S address>: ports still in resource group*

*Invalid card location <R-L-S address>*

A.6.9 MODIFY-PTCSPAN

NAME

*MODIFY-PTCSPAN* Modify a programmable trunk card span configuration

DESCRIPTION

Modifies a Programmable Trunk Card span configuration. Card location is specified by its R-L-S (rack-level-slot) address. The card should be physically installed in order to be put in *ACTIVE* or *MAINTENANCE* status.

When the card is first

SYNOPSIS

*MODIFY-PTCSPAN:* *RACK*=rack#, *LEVEL*=level#, *SLOT*=slot#, *TYPE*=cardtype, *SPAN*=span#,
[*STATUS*=newstatus, *TXGAIN*=transmit_gain, *RXGAIN*=ref_gain, *TXCLCK*=transmit_clock, *RFCLCK*=ref_clock, *SPANTYPE*=stream_fmt, *SLIP*=slip#, *OUTOFFRAME*=frame#, *LAW*=voice_coding, *CODE*=code, *LENG*=line_eq, *CRC*=check_crc, *TS0*=ts0_type, *TS16*=ts16_extrabits];

*rack#* Rack number where the card is situated (1 or 2).

*level#* Level number within the rack (rack1 - 1,2,3; rack2 - 0,1,2,3).

*slot#* Slot number on the level (1 to 21).

*cardtype* Programmable trunk card type. Can be one of
- 4T1 - 4 span T1 card
- 4E1 - 4 span E1 card
- MVDCT1- Multi-purpose Voice/Data Card (1 T1 span)

*span* Span number on the card (1 to 4).

*newstatus* New card status. Can be one of the following list:

*A* *(ACTIVE)* - ports on this card can be involved in active calls and can be allocated for new calls.

*M* *(MAINTENANCE)* - One or more ports on this card may be involved in active calls. No ports are allocated to new calls.

*D* *(DIAGNOSTICS)* - No ports are involved in calls or allocated to new calls. The card should already be in *active* or *maintenance* status.

*O* *(OUTOFSERVICE)* - No ports on this card can be involved in active calls or allocated to new calls. Any active calls into ports on this card are torn down.

*P* *(PAYLOADLOOPBACK)* - diagnostic state

*R* *(REMOTELOOPBACK)* - diagnostic state

*C (CAMPEDON) (cannot be used as new status)* - status change to *diagnostics* mode was attempted while ports on this card were still involved in calls; no ports are allocated for new calls and the card remains in this mode until further administrator action.

*transmit_gain* "Indicates the transmit gain control. Possible values include -6db, -3db, 0db, +3db, +6db. The default value is 0db."

*ref_gain* "Indicates the reference gain control. Possible values include -6db, -3db, 0db, +3db, +6db. The default value is 0db."

*transmit_clock* "T1: Indicates the transmit clock (timing source) for this span. Possible values include SCLK, LOOP, and 1544; SCLK = SDS system clock, LOOP = incoming line, and 1544 = board crystal.

E1: Indicates the transmit clock (timing source) for this span. Possible values include SCLK, LOOP, and 2048; SCLK = SDS system clock, LOOP = incoming line, and 2048 = board crystal."

*ref_clock* "T1/MVDCT1: Indicates the reference clock (timing source) for this span. Applies only if this span is specified as the current timing source. Possible values include LOOP or 1544; LOOP = incoming line, 1544 = board crystal. NOTE: When you choose a span as the master timing source, the reference clock for the span creates the SDS system clock.

E1: Indicates the reference clock (timing source) for this span. Applies only if this span is specified as the current timing source. Possible values include LOOP or 2048; LOOP = incoming line, 2048 = board crystal. NOTE: When you choose a span as the master timing source, the reference clock for the span creates the SDS system clock."

*stream_fmt* "T1/MVDCT1: Indicates the format of the T1 stream. You can only change this value when the span status is Out of Service. Possible values include SF, ESF, SF_NR, and ESF_NR. SF = Superframe, ESF = Extended superframe, SF_NR = Superframe without robbed bit signaling, and ESF_NR = Extended superframe without robbed bit signaling. NOTE: If you select an SF_NR or ESF_NR span type, the per port SIG TYPE field is ignored.

E1: Indicates the format of the E1 stream. You can only change this value when the span status is Out of Service. Possible values include CAS/R2, CAS/MC, and CCS/31B. CAS/R2 = Channel Associated signaling/R2 mode, CAS/MC = Channel Associated signaling/Mercury Mode, CCS 31B = Common Channel signaling/31 Bearer channels. NOTE: If you specify the CCS/31 format, the TS16 field is not accessible."

*slip#* "Determines the number of transmit or receive Slips that can be detected for this span, in a 24 hour period, before threshold processing occurs. Control this processing with the SLIP/OOF feature flag. Separate Slip maintenance counts are maintained for receive and transmit Slips. When either of these counters reaches the limit, threshold processing occurs. The current Slip count appears on the Diagnostics Card Display screen.

Slip counters are reset at midnight and when this object is changed. Possible values are between 0 (Slip maintenance processing is inhibited _ recommended when TRX Clock = LOOP) and 255. The default value is 255."

| | |
|---|---|
| *frame#* | "Determines the number of Out of Frames (OOFs) detected for this span, in a 24 hour period, before threshold processing occurs. Control this processing with the SLIP/OOF feature flag. The OOF counter is reset at midnight and when this object is changed. Possible values are between 0 (OOF maintenance processing inhibited _ not recommended) and 255. The default value is 17." |
| *voice_coding* | "Indicates the voice coding on the T1 or E1 stream. The system automatically turns off translation when calls specify unrestricted digital information bearer capability. Possible values include ***A*** and ***MU*** law encoding." |
| *code* | "T1/MVDCT1: Indicates the code on the T1 span. Possible values include AMI, B7ZS, and B8ZS.<br>E1: Indicates the code on the span. Possible values include AMI and HDB3. The return value (2) should be interpreted depending on the card type." |
| *line_eq* | "Indicates the line equalization used for the T1/MVDCT1 stream. Possible values include the line length between 0 to 133 feet, 134 to 266 feet, 266 to 399 feet, 399 to 533feet, and 533 to 655 feet." |
| *check_crc* | "Indicates if CRC checking is enabled. Possible values include ON or OFF." |
| *ts0_type* | "Specifies international or national bits of Time Slot 0 as an 8-bit value with the format 'i1Annnnn' where i = International bits, n = National bits, and A = a remote alarm indicator (CCITT default)." |
| *ts16_extrabits* | "Specifies extra bits and the C and D bits of Time Slot 16 as an 8-bit value with the format '0000xyxx' where x = extra bits, and y = a remote alarm indicator (CCITT default). Use bits 3 and 4 to specify the C and D bits. NOTE: For systems in China, the C and D bits must be set to 1." |

EXAMPLES

MML_TH>MODIFY-PTCSPAN: RACK=1, LEVEL=2, SLOT=19, TYPE=4T1, SPAN=1, STATUS=ACTIVE;

MML_TH>MODIFY-PTCSPAN: RACK=1, LEVEL=2, SLOT=8, TYPE=4E1, SPAN=2, LENG=130, CRC=OFF;

ERROR MESSAGES

*Incomplete R-L-S hardware address*

*R-L-S address does not exist*

*Card <R-L-S address>: cannot be put into DIAGNOSTIC*

*Card <R-L-S address>: does not support remote loopback*

*Card <R-L-S address>: cannot be put into MAINTENANCE*

*Card <R-L-S address>: invalid status change request*

*Card <R-L-S address>: already active*

*Card <R-L-S address>: download is in progress*

*Card <R-L-S address>: alarm exists*

*Card <R-L-S address>: ports still active - status changed to CAMPEDON*

*Card <R-L-S address>: ports still active - status left in CAMPEDON*

*Card <R-L-S address>: does not support PAYLOAD LOOPBACK*

*Card <R-L-S address>: exceeded time-slot capacity*

*Invalid card location <R-L-S address>*

*Card <R-L-S address>: must be in ACTIVE or MAINTENANCE status*

EBS Confidential

A.6.10 DISPLAY-PTCSPAN

NAME

*DISPLAY-PTCSPAN* Display current programmable trunk card span configuration

DESCRIPTION

Displays a Programmable Trunk Card Span configuration. Card location is specified by its R-L-S (rack-level-slot) address. See *MODIFY-PTCSPAN* command for the full list of span configuration parameters.

SYNOPSIS

*DISPLAY-PTCSPAN: RACK*=rack#, *LEVEL*=level#, *SLOT*=slot#, *TYPE*=cardtype, *SPAN*=span#;

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |
| ***cardtype*** | Programmable trunk card type. Can be one of<br>4T1- 4 span T1 card<br>4E1- 4 span E1 card<br>MVDCT1-Multi-purpose Voice/Data Card (1 T1 span) |
| span | Span number on the card (1 to 4). |

Configuration is displayed in the following format:

Card <card type>, Location<R-L-S address>, Span <span#>:

STATUS = <current card status>
TXGAIN =
RXGAIN =
TXCLCK =
RFCLCK =
SPANTYPE =
SLIP =
OUTOFFRAME =
LAW =
CODE =
LENG =
CRC =
TS0 =

TS16 =

UNUSED PORTS = <number of ports not currently active on this card>

FIRMWARE VERSION = <version and revision level of the firmware installed on the card>

ALARM = <which alarms are active on this card; one of the following list:

CARD FAILURE MINOR
PORT FAILURE MINOR
T1/PRI CARRIER FAILURE MAJOR
T1/PRI REMOTE FAILURE MAJOR
T1/PRI CARD FAILURE MAJOR
T1 SIGNALLING BIT MINOR
PRI BIPOLAR VIOLATIONS MLIMIT REACHED
T1/PRI OUT OF FRAME MLIMIT REACHED MINOR
T1 SLIP MAINT LIMIT REACHED MINOR
T1/PRI OOF CONDITION MINOR
PRI D-CHANNEL FAILURE MAJOR

OWNER = <configuration entity name>

EXAMPLES

MML_TH>DISPLAY-PTCSPAN: RACK=1, LEVEL=2, SLOT=15, TYPE=4E1, SPAN=3;

ERROR MESSAGES

*Incomplete R-L-S hardware address*

*R-L-S address does not exist*

*Invalid card location <R-L-S address>*

EBS Confidential

A.6.11 MODIFY-PTCPORT

NAME

*MODIFY-PTCPORT* Modify a programmable trunk card port configuration

DESCRIPTION

Modifies a Programmable Trunk Card port configuration. Card location is specified by its R-L-S (rack-level-slot) address. When the card is introduced to the system using *ADD-PTC* command, its ports are automatically added to the port table.

At least one attribute has to be present in the command.

SYNOPSIS

*MODIFY-PTCPORT:* *RACK*=rack#, *LEVEL*=level#, *SLOT*=slot#, *TYPE*=cardtype,
*SPAN*=span#, *PORT*=port#,
[*PORTNAME*=name, *SIGTYPE*=sig_type, *PORTCOS*=class,
*WINKMIN*=wink_min,*WINKMAX*=wink_max,*WINKSEND*=wink_send,
*FLASHMIN*=flash_min, *FLASHMAX*=flash_max,
*FLASHSEND*=flash_send, *OFFHK*=off_hook, *GUARD*=guard,
*INPRULE*=rule#, *RESGROUP*=group#];

*rack#* Rack number where the card is situated (1 or 2).

*level#* Level number within the rack (rack1 - 1,2,3; rack2 - 0,1,2,3).

*slot#* Slot number on the level (1 to 21).

*cardtype* Programmable trunk card type. Can be one of

- 4T1 - 4 span T1 card
- 4E1 - 4 span E1 card
- MVDCT1- Multi-purpose Voice/Data Card (1 T1 span)

*span* Span number on the card (1 to 4).

*port#* Port number (T1:1 to 24, E1:1 to 32, MVDCT1:1 to 96). Wildcard "*" can be used to specify all ports on the span.

*name* Optional entry used to identify individual circuits. A port name describes what this port is used for (up to 8 characters).

*sig_type* "Determines the signaling type. Possible values include E&M, FXO-LS, FXO-GS, FXS-LS, FXS-GS, NONE.

Abbreviations stand for: FXO = Foreign Exchange Office, FXS = Foreign Exchange Subscriber, LS=LoopStart, GS=Ground Start.
NOTE: If you selected an SF_NR or ESF_NR span type, the per port SIGTYPE field is ignored."

ERSO Confidential

*class* Class of Service for the port used for resource grouping and B-channel allocation. Determines the operating characteristics for this port. Different spans on the same card can belong to different classes. Class can be one of the following:

*O* - Originating: for calls originating from the system (outgoing calls).

*T* - Terminating: for calls terminating at the system (incoming calls).

*2W* - Two-Way: for both incoming and outgoing calls.

*AO* - AlwaysOffHook and Originating: for outgoing calls. Port goes off-hook at the system reset and remains off-hook.

*AT* - AlwaysOffHook and Terminating: for incoming calls. Port goes off-hook at the system reset and remains off-hook.

*A2* - AlwaysOffHook and Two-Way: for both incoming and outgoing calls. Port goes off-hook at the system reset and remains offhook.

The following fields are used to specify the timing for each port on a card.

NOTE: For an E1 card, timing is provisioned per span. To modify the timing, you only need to modify port 1 and the other ports adopt the same value.

*wink_min* "Indicates the minimum Wink detect time. For E1, this is the time to wait for the delayed dial signal. (0 to 255)"

*wink_max* "Indicates the maximum Wink detect time. Not used for E1. (0 to 255)"

*wink_send* "Indicates the Wink send time. For E1, this is the time period of the delayed dial signal. (0 to 255)"

*flash_min* "Indicates the minimum Flash detect time. (0 to 255) "

*flash_max* "Indicates the maximum Flash detect time. (0 to 255)"

*flash_send* "Indicates the Flash send time. (0 to 255)"

*off_hook* "Indicates the minimum Off hook time. (0 to 255)"

*guard* "Indicates the Guard time. (0 to 255)"

*rule#* Inpulse Rule number (0 to 30). Determines the default Inpulse Rule processed when this port goes off-hook. 0 means no default Inpulse Rule.

*group#* Number of the resource group to which this port should belong (1 to 63).

EXAMPLES

MML_TH>MODIFY-PTCPORT: RACK=1, LEVEL=2, SLOT=15, TYPE=4E1, SPAN=1, PORT=1, WINKMIN=30;

MML_TH>MODIFY-LCPORT:RACK=1, LEVEL=2, SLOT=15, TYPE=4E1, SPAN=1, PORT=*, PORTCOS=2W, INPRULE=3, RESGROUP=23;

ERROR MESSAGES

*Incomplete R-L-S hardware address*

*R-L-S address does not exist*

*Invalid card location <R-L-S address>*

*No attributes specified*

*Card <R-L-S address>: invalid port <port#>*

*Card <R-L-S address>: download is in progress*

*Card <R-L-S address>: alarm exists*

*Invalid attribute <attribute name> specified*

*Invalid attribute <attribute name> value <value> specified*

*Card <R-L-S address>: no available port memory*

EBS Confidential

A.6.12 DISPLAY-PTCPORT

NAME

*DISPLAY-PTCPORT* Display a programmable trunk card port configuration

DESCRIPTION

Displays Programmable Trunk Card port attributes. Card location is specified by its R-L-S (rack-level-slot) address. See *MODIFY-PTCPORT* command for the full list of port configuration parameters.

SYNOPSIS

*DISPLAY-PTCPORT:* *RACK*=rack#, *LEVEL*=level#, *SLOT*=slot#, *TYPE*=cardtype, *SPAN*=span#, *PORT=port#;*

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |
| ***cardtype*** | Programmable trunk card type. Can be one of<br>4T1- 4 span T1 card<br>4E1- 4 span E1 card<br>MVDCT1-Multi-purpose Voice/Data Card (1 T1 span) |
| ***span*** | Span number on the card (1 to 4). |
| ***port#*** | Port number (T1:1 to 24, E1:1 to 32, MVDCT1:1 to 96).<br>Wildcard "*" can be used to specify all ports on the span. |

Configuration is displayed in the following format:

Card <card type>, Location<R-L-S address>, Span <span#>:

Port <port #>

PORTNAME = <name>

SIGTYPE = <signalling type>

**PORTCOS = <class of service; for possible values see *MODIFY-LCPORT*>**

WINKMIN = <min wink detect time>

WINKMAX = <max wink detect time>

WINKSEND = <wink send time>

FLASHMIN = <min flash detect time>

FLASHMAX = <max flash detect time>

FLASHSEND = <flash send time>

OFFHK = <min off-hook time>
GUARD = <guard time>
PORTMAJORSTATE = <major port state (listed in Section A.7.1 on page 129)>
PORTSUPPSTATE = <supplementary port state (listed in Section A.7.1 on page 129)>
PORTADDRESS = <logical device identifier>
INPULSE RULE = <rule #>
RESOURCE GROUP = <group #>
OWNER = <configuration entity name>

ERROR MESSAGES

*Incomplete R-L-S hardware address*

*R-L-S address does not exist*

*Invalid card location <R-L-S address>*

*Card <R-L-S address>: invalid port <port#>*

EBS Confidential

A.6.13 ADD-BRC

NAME

*ADD-BRC* Add a bus repeater card to the system

DESCRIPTION

Introduces a new Bus Repeater Card (BRC) to the system. Card location is specified by its R-L-S (rack-level-slot) address. A BRC can reside in Slots 2 to 21 of the Master Port Subrack (1) or Slot 1 or 2 of an Expansion Port Subrack (2).

When a card is added, its initial status is Out-Of-Service. Use *MODIFY-BRC* command to bring the card on line and make it available for the system to use.

SYNOPSIS

*ADD-BRC: RACK*=rack#, *LEVEL*=level#, *SLOT*=slot#;

| | |
|---|---|
| *rack#* | Rack number where the card is situated (1 or 2). |
| *level#* | Level number within the rack (rack1 - 1,2,3; rack2 - 0,1,2,3). |
| *slot#* | Slot number on the level (1 to 21). |

EXAMPLES

MML_TH>ADD-BRC: RACK=1,LEVEL=2,SLOT=3;

ERROR MESSAGES

*Incomplete R-L-S hardware address*

*R-L-S address does not exist*

*Card <R-L-S address>: already exists*

*Only NBC card is allowed in the slot <slot#>*

*Only BRC in slot one of expansion rack*

*BRC cannot be added to 1-1-1*

*Invalid BRC R-L-S position*

A.6.14 DELETE-BRC

NAME

*DELETE-BRC* Delete a bus repeater card from the system

DESCRIPTION

Removes a Bus Repeater Card from the system. Card location is specified by its R-L-S (rack-level-slot) address. A card must be Out-Of-Service to be deleted. Prior to deletion all the ports on the card must be removed from any resource group they belong to .

SYNOPSIS

*DELETE-BRC:RACK*=rack#, *LEVEL*=level#, *SLOT*=slot#;

| | |
|---|---|
| *rack#* | Rack number where the card is situated (1 or 2). |
| *level#* | Level number within the rack (rack1 - 1,2,3; rack2 - 0,1,2,3). |
| *slot#* | Slot number on the level (1 to 21). |

EXAMPLES

MML_TH>DELETE-BRC: RACK=2, LEVEL=0, SLOT=2;

ERROR MESSAGES

*Incomplete R-L-S hardware address*

*R-L-S address does not exist*

*Card <R-L-S address>: is not OUT OF SERVICE*

*Invalid card location <R-L-S address>*

EIBS Confidential

A.6.15 MODIFY-BRC

NAME

*MODIFY-BRC* Modify a bus repeater card status

DESCRIPTION

Modifies a Bus Repeater Card status. Card location is specified by its R-L-S (rack-level-slot) address. The card should be physically installed in order to be put in *ACTIVE* status.

SYNOPSIS

*MODIFY-BRC:RACK*=rack#, *LEVEL*=level#, *SLOT*=slot#, *STATUS*=newstatus, *CONN=#, DISCONN=#;*

*rack#* Rack number where the card is situated (1 or 2).

*level#* Level number within the rack (rack1 - 1,2,3; rack2 - 0,1,2,3).

*slot#* Slot number on the level (1 to 21).

*newstatus* New card status. Can be one of the following list:

*A (ACTIVE)* - normal working mode.

*O (OUTOFSERVICE)* - the card is going to be physically removed from the rack. In a system with non-redundant BRCs this causes immediate loss of service to the port subrack.

*S (STANDBY)* - When one of the BRCs in pair goes OUTOFSERVICE, the redundant BRC automatically changes to this mode.

*conn* Connect two BRCs in the master/slave mode. If the either of the two cards are already connected, the connect BRC operation fails. In that case you ought to disconnect the already existing connections using the DISCONN attribute.

*disconn* Disconnect two already existing BRC pairs.

EXAMPLES

MML_TH>MODIFY-BRC:RACK=1, LEVEL=2, SLOT=1, STATUS=ACTIVE;

ERROR MESSAGES

*Incomplete R-L-S hardware address*

*R-L-S address does not exist*

*Card <R-L-S address>: invalid status change request*

EBS Confidential

*Card <R-L-S address>: already active*

*Card <R-L-S address>: download is in progress*

*Card <R-L-S address>: alarm exists*

*Invalid card location <R-L-S address>*

*Card <R-L-S address>: no STANDBY BRC pair, cannot change state*

*Cannot connect BRCs on same subrack*

*One BRC must be in Master Subrack*

*BRC not defined in this slot*

*Master BRC is already connected*

*Destination BRC is already connected*

EBS Confidential

A.6.16 DISPLAY-BRC

NAME

*DISPLAY-BRC* Display current bus repeater card information

DESCRIPTION

Displays a Bus Repeater Card information. Card location is specified by its R-L-S (rack-level-slot) address. See also *MODIFY-BRC* command for the full status list.

SYNOPSIS

*DISPLAY-LC:RACK*=rack#,*LEVEL*=level#,*SLOT*=slot#;

| | |
|---|---|
| *rack#* | Rack number where the card is situated (1 or 2). |
| *level#* | Level number within the rack (rack1 - 1,2,3; rack2 - 0,1,2,3). |
| *slot#* | Slot number on the level (1 to 21). |

Configuration is displayed in the following format:

Card <card type>, Location<R-L-S address>:

STATUS = <current card status>

FIRMWARE VERSION = <version and revision level of the firmware installed on the card>

CONN = < >

MODE = <MASTER or SLAVE>

REDUNDANT MASTER INDEX = <location of the Master BRC associated with the same expansion port subrack as the Master BRC for this BRC pair; 0 if no redundant BRC>

ALARM = <which alarms are active on this card; one of the following list:
CARDFAILUREMINOR
PORTFAILUREMINOR
CARD&PORTFAILUREMINOR>

OWNER = <configuration entity name>

EXAMPLES

```
MML_TH>DISPLAY-BRC:RACK=2,LEVEL=2,SLOT=2;
```

ERROR MESSAGES

*Incomplete R-L-S hardware address*

*R-L-S address does not exist*

*Invalid card location <R-L-S address>*

EBS Confidential

A.6.17 ADD-NBC

NAME

*ADD-NBC* Add a network bus controller card to the system

DESCRIPTION

Introduces a new Network Bus Controller Card (NBC) to the system. Card location is specified by its R-L-S (rack-level-slot) address. An NBC can only reside in Slots 1 and 2 of the Master Port Subrack (1).

When a card is added, its initial status is Out-Of-Service. Use *MODIFY-NBC* command to bring the card on line and make it available for the system to use.

SYNOPSIS

*ADD-BRC: RACK*=rack#, *LEVEL*=level#, *SLOT*=slot#;

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |

EXAMPLES

MML_TH>ADD-NBC: RACK=1, LEVEL=1, SLOT=1;

ERROR MESSAGES

*Incomplete R-L-S hardware address*

*R-L-S address does not exist*

*Card <R-L-S address>: already exists*

EBS Confidential

A.6.18 DELETE-NBC

NAME

*DELETE-NBC* Delete a network bus controller card from the system

DESCRIPTION

Removes a Network Bus Controller Card from the system. Card location is specified by its R-L-S (rack-level-slot) address. An NBC can only reside in Slots 1 and 2 of the Master Port Subrack (1). A card must be Out-Of-Service to be deleted.

SYNOPSIS

*DELETE-NBC:RACK*=rack#, *LEVEL*=level#, *SLOT*=slot#;

*rack#* Rack number where the card is situated (1 or 2).
*level#* Level number within the rack (rack1 - 1,2,3; rack2 - 0,1,2,3).
*slot#* Slot number on the level (1 to 21).

EXAMPLES

MML_TH>DELETE-NBC: RACK=1, LEVEL=1, SLOT=2;

ERROR MESSAGES

*Incomplete R-L-S hardware address*

*R-L-S address does not exist*

*Card <R-L-S address>: is not OUT OF SERVICE*

*Invalid card location <R-L-S address>*

EBS Confidential

A.6.19 MODIFY-NBC

NAME

*MODIFY-NBC* Modify a network bus controller card status

DESCRIPTION

Modifies a Network Bus Controller Card status. Card location is specified by its R-L-S (rack-level-slot) address. An NBC can only reside in Slots 1 and 2 of the Master Port Subrack (1). The card should be physically installed in order to be put in *ACTIVE* status.

SYNOPSIS

*MODIFY-NBC:RACK*=rack#,*LEVEL*=level#,*SLOT*=slot#,*STATUS*=newstatus;

*rack#* Rack number where the card is situated (1 or 2).

*level#* Level number within the rack (rack1 - 1,2,3; rack2 - 0,1,2,3).

*slot#* Slot number on the level (1 to 21).

*newstatus* New card status. Can be one of the following list:

*A (ACTIVE)* - normal working mode.

*O (OUTOFSERVICE)* - the card is going to be physically removed from the rack.

EXAMPLES

```
MML_TH>MODIFY-NBC:RACK=1, LEVEL=1, SLOT=2, STATUS=ACTIVE;
```

ERROR MESSAGES

*Incomplete R-L-S hardware address*

*R-L-S address does not exist*

*Card <R-L-S address>: invalid status change request*

*Card <R-L-S address>: already active*

*Card <R-L-S address>: download is in progress*

*Card <R-L-S address>: alarm exists*

*Invalid card location <R-L-S address>*

A.6.20 DISPLAY-NBC

NAME

*DISPLAY-NBC* Display current network bus controller card information

DESCRIPTION

Displays a Network Bus Controller Card information. Card location is specified by its R-L-S (rack-level-slot) address. See *MODIFY-NBC* command for the full status list.

SYNOPSIS

*DISPLAY-NBC:RACK*=rack#,*LEVEL*=level#,*SLOT*=slot#;

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |

Configuration is displayed in the following format:

Card <card type>, Location<R-L-S address>:

STATUS = <current card status>

FIRMWARE VERSION = <version and revision level of the firmware installed on the card>

ALARM = <which alarms are active on this card; one of the following list:

CARDFAILUREMINOR

PORTFAILUREMINOR

CARD&PORTFAILUREMINOR>

OWNER = <configuration entity name>

EXAMPLES

MML_TH>DISPLAY-NBC:RACK=1,LEVEL=1,SLOT=1;

ERROR MESSAGES

*Incomplete R-L-S hardware address*

*R-L-S address does not exist*

*Invalid card location <R-L-S address>*

MBS Confidential

A.6.21 ADD-DTG

NAME

*ADD-DTG* Add a digital tone generator card to the system

DESCRIPTION

Introduces a new Digital Tone Generator Card (DTG) to the system. Card location is specified by its R-L-S (rack-level-slot) address. Slots 3 and 4 on the Master Port Subrack (rack=1, level=1) are reserved for DTGs. Slot 3 is always populated with a DTG in all configurations. Slot 4 is reserved for a second DTG in configurations with redundant control.

DTGs can be placed in any Port Subrack or card slot in the systems equipped with more than two DTGs.

When a card is added, its initial status is Out-Of-Service. Use *MODIFY-DTG* command to bring the card on line and make it available for the system to use.

SYNOPSIS

*ADD-DTG: RACK*=rack#, *LEVEL*=level#, *SLOT*=slot#;

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |

EXAMPLES

MML_TH>ADD-DTG: RACK=1, LEVEL=1, SLOT=3;

ERROR MESSAGES

*Incomplete R-L-S hardware address*

*R-L-S address does not exist*

*Card <R-L-S address>: already exists*

*Only NBC card is allowed in the slot <slot#>*

*Only BRC in slot one of expansion rack*

A.6.22 DELETE-DTG

NAME

*DELETE-DTG* Delete a line card from the system

DESCRIPTION

Removes a Subscriber Line Interface Card from the system. Card location is specified by its R-L-S (rack-level-slot) address. A card must be Out-Of-Service to be deleted. Prior to deletion all the ports on the card must be removed from any resource group they belong to.

SYNOPSIS

*DELETE-DTG:RACK*=rack#,*LEVEL*=level#,*SLOT*=slot#;

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |

EXAMPLES

MML_TH>DELETE-DTG: RACK=1,LEVEL=1,SLOT=4;

ERROR MESSAGES

*Incomplete R-L-S hardware address*

*R-L-S address does not exist*

*Card <R-L-S address>: is not OUT OF SERVICE*

*Card <R-L-S address>: ports still in resource group*

*Invalid card location <R-L-S address>*

EBS Confidential

A.6.23 MODIFY-DTG

NAME

*MODIFY-DTG* Modify a digital tone generator card status

DESCRIPTION

Modifies a Digital Tone Generator Card status. Card location is specified by its R-L-S (rack-level-slot) address. The card should be physically installed in order to be put in *ACTIVE* or *MAINTENANCE* status.

SYNOPSIS

*MODIFY-DTG:RACK*=rack#,*LEVEL*=level#,*SLOT*=slot#,*STATUS*=newstatus;

*rack#* Rack number where the card is situated (1 or 2).

*level#* Level number within the rack (rack1 - 1,2,3; rack2 - 0,1,2,3).

*slot#* Slot number on the level (1 to 21).

*newstatus* New card status. Can be one of the following list:

*A (ACTIVE)* - ports on this card can be involved in active calls and can be allocated for new calls.

*M (MAINTENANCE)* - One or more ports on this card may be involved in active calls. No ports are allocated to new calls.

*D (DIAGNOSTICS)* - No ports are involved in calls or allocated to new calls. The card should already be in *active* or *maintenance* status.

*O (OUTOFSERVICE)* - DTG can be taken out of service only if another DTG in STANDBY mode exists in the subrack.

*P (PAYLOADLOOPBACK)* - diagnostic state

*R (REMOTELOOPBACK)* - diagnostic state

*C (CAMPEDON) (cannot be used as new status)* - status change to *diagnostics* mode was attempted while ports on this card were still involved in calls; no ports are allocated for new calls and the card remains in this mode until further administrator action.

EBS Confidential

EXAMPLES

MML_TH>MODIFY-DTG:RACK=1, LEVEL=1, SLOT=1, STATUS=ACTIVE;

ERROR MESSAGES

*Incomplete R-L-S hardware address*

*R-L-S address does not exist*

*Card <R-L-S address>: cannot be put into DIAGNOSTIC*

*Card <R-L-S address>: does not support remote loopback*

*Card <R-L-S address>: cannot be put into MAINTENANCE*

*Card <R-L-S address>: invalid status change request*

*Card <R-L-S address>: already active*

*Card <R-L-S address>: download is in progress*

*Card <R-L-S address>: alarm exists*

*Card <R-L-S address>: ports still active - status changed to CAMPEDON*

*Card <R-L-S address>: ports still active - status left in CAMPEDON*

*Card <R-L-S address>: does not support PAYLOAD LOOPBACK*

*Card <R-L-S address>: exceeded time-slot capacity*

*Invalid card location <R-L-S address>*

*Card <R-L-S address>: must be in ACTIVE or MAINTENANCE status*

EBS Confidential

A.6.24 DISPLAY-DTG

NAME

*DISPLAY-DTG* Display current digital tone generator card information

DESCRIPTION

Displays a Digital Tone Generator Card information. Card location is specified by its R-L-S (rack-level-slot) address. See *MODIFY-DTG* command for the full status list.

SYNOPSIS

*DISPLAY-DTG:RACK*=rack#,*LEVEL*=level#,*SLOT*=slot#;

*rack#* Rack number where the card is situated (1 or 2).

*level#* Level number within the rack (rack1 - 1,2,3; rack2 - 0,1,2,3).

*slot#* Slot number on the level (1 to 21).

Configuration is displayed in the following format:

Card <card type>, Location<R-L-S address>:

STATUS = <current card status>

UNUSED PORTS = <number of ports not currently active on this card>

FIRMWARE VERSION = <version and revision level of the firmware installed on the card>

ALARM = <which alarms are active on this card; one of the following list:

CARDFAILUREMINOR

PORTFAILUREMINOR

CARD&PORTFAILUREMINOR>

OWNER = <configuration entity name>

EXAMPLES

MML_TH>DISPLAY-DTG: RACK=1,LEVEL=1,SLOT=1;

ERROR MESSAGES

*Incomplete R-L-S hardware address*

*R-L-S address does not exist*

*Invalid card location <R-L-S address>*

A.6.25 MODIFY-DTGPORT

NAME

*MODIFY-DTGPORT* Modify a digital tone generator card port configuration

DESCRIPTION

Modifies a Digital Tone Generator Card port attributes. Card location is specified by its R-L-S (rack-level-slot) address. When the card is introduced to the system using *ADD-LC* command, its 63 ports are automatically added to the port table. They have to be activated in order to be available to the system.

To reset the port, first make it *INACTIVE*, then set it back to *ACTIVE*.

At least one attribute has to be present in the command.

SYNOPSIS

*MODIFY-LCPORT: RACK*=rack#, *LEVEL*=level#, *SLOT*=slot#, *PORT=port#*,
*[PORTSTATE*=newstate*];*

*rack#* Rack number where the card is situated (1 or 2).

*level#* Level number within the rack (rack1 - 1,2,3; rack2 - 0,1,2,3).

*slot#* Slot number on the level (1 to 21).

*port#* Port number (1 to 63). Wildcard "*" can be used to specify all ports on the card.

*newstate* New port state. Can be one of the following:

*ACTIVE* - the port can be involved in active calls and can be allocated for new calls.

*INACTIVE* - the port cannot be allocated to a call.

If any of the ports are involved in active calls, these calls are torn down and the ports are deactivated. Call processing will no longer try to assign any calls to the ports. It is not necessary to remove the deactivated ports from their resource group.

EXAMPLES

MML_TH>MODIFY-DTGPORT: RACK=1, LEVEL=1, SLOT=1, PORT=*, PORTSTATE=ACTIVE;

ERROR MESSAGES

*Incomplete R-L-S hardware address*

*R-L-S address does not exist*

EBS Confidential

*Invalid card location <R-L-S address>*

*No attributes specified*

*Card <R-L-S address>: invalid port <port#>*

*Card <R-L-S address>: download is in progress*

*Card <R-L-S address>: alarm exists*

*Invalid attribute <attribute name> specified*

*Invalid attribute <attribute name> value <value> specified*

EBS Confidential

A.6.26 DISPLAY-DTGPORT

NAME

*DISPLAY-DTGPORT* Display a digital tone generator card port configuration

DESCRIPTION

Displays Digital Tone Generator Card port attributes. Card location is specified by its R-L-S (rack-level-slot) address.

SYNOPSIS

*DISPLAY-DTGPORT: RACK*=rack#, *LEVEL*=level#, *SLOT*=slot#, *PORT=port#;*

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |
| ***port#*** | Port number (1 to 63). Wildcard "*" can be used to specify all ports on the card. |

Configuration is displayed in the following format:

Card <card type>, Location<R-L-S address>:

Port <port #>

**PORTSTATE = <current port state; for possible values see *MODIFY-LCPORT*>**

PORTMAJORSTATE = <major port state (listed in Section A.7.1 on page 129)>

PORTSUPPSTATE = <supplementary port state (listed in Section A.7.1 on page 129)>

PORTADDRESS = <logical device identifier>

OWNER = <configuration entity name>

ERROR MESSAGES

*Incomplete R-L-S hardware address*

*R-L-S address does not exist*

*Invalid card location <R-L-S address>*

*Card <R-L-S address>: invalid port <port#>*

A.6.27 ADD-RC

NAME

*ADD-RC* Add a resourcible card to the system

DESCRIPTION

Introduces a new Resourcible Card (RC) to the system. Card location is specified by its R-L-S (rack-level-slot) address.

When a card is added, its initial status is Out-Of-Service. Use *MODIFY-RC* command to bring the card spans on line and make it available for the system to use.

SYNOPSIS

*ADD-RC:RACK*=rack#, *LEVEL*=level#, *SLOT*=slot#, *TYPE*=cardtype;

| | |
|---|---|
| *rack#* | Rack number where the card is situated (1 or 2). |
| *level#* | Level number within the rack (rack1 - 1,2,3; rack2 - 0,1,2,3). |
| *slot#* | Slot number on the level (1 to 21). |
| *cardtype* | Resourcible card type. Can be one of |

| | | |
|---|---|---|
| IPRC | - | Integrated Prompt/Record Card |
| IPRC8 | - | Integrated Prompt/Record Card (8 playback/ 4 record ports) |
| IPRC128 | - | Integrated Prompt/Record Card (128 playback/ 32 record ports) |
| CNF | - | Digital Conference Card |
| SRC | - | Speech Recognition Card |
| CPA | - | Call Progress Analyzer Card |
| DTMF | - | DTMF Receiver Card |
| DTMF24 | - | DTMF Receiver Card (24 ports) |
| DTMF48 | - | DTMF Receiver Card (48 ports) |
| MFRC | - | MF Receiver Card |
| MFRC2 | - | MF Receiver Card |
| ANNC | - | Digitized Voice Card |

EXAMPLES

MML_TH>ADD-PTC: RACK=1,LEVEL=2,SLOT=15, TYPE=4T1;

EBS Confidential

ERROR MESSAGES

*Incomplete R-L-S hardware address*

*R-L-S address does not exist*

*Card <R-L-S address>: already exists*

*Only NBC card is allowed in the slot <slot#>*

*Only BRC in slot one of expansion rack*

EBS Confidential

A.6.28 DELETE-RC

NAME

*DELETE-RC* Delete a resourcible card from the system

DESCRIPTION

Removes a Resourcible Card from the system. Card location is specified by its R-L-S (rack-level-slot) address. A card must be Out-Of-Service to be deleted. Prior to deletion all the ports on the card must be removed from any resource group they belong to .

SYNOPSIS

*DELETE-RC:RACK*=rack#, *LEVEL*=level#, *SLOT*=slot#, *TYPE*=cardtype;

| | |
|---|---|
| ***rack#*** | Rack number where the card is situated (1 or 2). |
| ***level#*** | Level number within the rack (rack1 - 1,2,3; rack2 - 0,1,2,3). |
| ***slot#*** | Slot number on the level (1 to 21). |
| ***cardtype*** | Resourcible card type. Can be one of |

| | | |
|---|---|---|
| IPRC | - | Integrated Prompt/Record Card |
| IPRC8 | - | Integrated Prompt/Record Card (8 playback/ 4 record ports) |
| IPRC128 | - | Integrated Prompt/Record Card (128 playback/ 32 record ports) |
| CNF | - | Digital Conference Card |
| SRC | - | Speech Recognition Card |
| CPA | - | Call Progress Analyzer Card |
| DTMF | - | DTMF Receiver Card |
| DTMF24 | - | DTMF Receiver Card (24 ports) |
| DTMF48 | - | DTMF Receiver Card (48 ports) |
| MFRC | - | MF Receiver Card |
| MFRC2 | - | MF Receiver Card |
| ANNC | - | Digitized Voice Card |

EXAMPLES

MML_TH>DELETE-PTC: RACK=1, LEVEL=2, SLOT=15, TYPE=4T1;

EBS Confidential

ERROR MESSAGES

*Incomplete R-L-S hardware address*

*R-L-S address does not exist*

*Card <R-L-S address>: is not OUT OF SERVICE*

*Card <R-L-S address>: ports still in resource group*

*Invalid card location <R-L-S address>*

EBS Confidential

A.6.29 MODIFY-RC

NAME

*MODIFY-RC* Modify a resourcible card status

DESCRIPTION

Modifies a Resourcible Card status. Card location is specified by its R-L-S (rack-level-slot) address. The card should be physically installed in order to be put in *ACTIVE* or *MAINTENANCE* status.

SYNOPSIS

*MODIFY-RC: RACK*=rack#, *LEVEL*=level#, *SLOT*=slot#, *TYPE*=cardtype, *STATUS*=newstatus;

*rack#* Rack number where the card is situated (1 or 2).

*level#* Level number within the rack (rack1 - 1,2,3; rack2 - 0,1,2,3).

*slot#* Slot number on the level (1 to 21).

*cardtype* Resourcible card type. Can be one of

| | | |
|---|---|---|
| IPRC | - | Integrated Prompt/Record Card |
| IPRC8 | - | Integrated Prompt/Record Card (8 playback/ 4 record ports) |
| IPRC128 | - | Integrated Prompt/Record Card (128 playback/ 32 record ports) |
| CNF | - | Digital Conference Card |
| SRC | - | Speech Recognition Card |
| CPA | - | Call Progress Analyzer Card |
| DTMF | - | DTMF Receiver Card |
| DTMF24 | - | DTMF Receiver Card (24 ports) |
| DTMF48 | - | DTMF Receiver Card (48 ports) |
| MFRC | - | MF Receiver Card |
| MFRC2 | - | MF Receiver Card |
| ANNC | - | Digitized Voice Card |

*newstatus* New card status. Can be one of the following list:

*A (ACTIVE)* - ports on this card can be involved in active calls and can be allocated for new calls.

*M (MAINTENANCE)* - One or more ports on this card may be involved in active calls. No ports are allocated to new calls.

EBS Confidential

*D* *(DIAGNOSTICS)* - No ports are involved in calls or allocated to new calls. The card should already be in *active* or *maintenance* status.

*O* *(OUTOFSERVICE)* - DTG can be taken out of service only if another DTG in STANDBY mode exists in the subrack.

*P* *(PAYLOADLOOPBACK)* - diagnostic state

*R* *(REMOTELOOPBACK)* - diagnostic state

*C* *(CAMPEDON) (cannot be used as new status)* - status change to *diagnostics* mode was attempted while ports on this card were still involved in calls; no ports are allocated for new calls and the card remains in this mode until further administrator action.

EXAMPLES

MML_TH>MODIFY-RC: RACK=1, LEVEL=1, SLOT=1, STATUS=ACTIVE;

ERROR MESSAGES

*Incomplete R-L-S hardware address*

*R-L-S address does not exist*

*Card <R-L-S address>: cannot be put into DIAGNOSTIC*

*Card <R-L-S address>: does not support remote loopback*

*Card <R-L-S address>: cannot be put into MAINTENANCE*

*Card <R-L-S address>: invalid status change request*

*Card <R-L-S address>: already active*

*Card <R-L-S address>: download is in progress*

*Card <R-L-S address>: alarm exists*

*Card <R-L-S address>: ports still active - status changed to CAMPEDON*

*Card <R-L-S address>: ports still active - status left in CAMPEDON*

*Card <R-L-S address>: does not support PAYLOAD LOOPBACK*

*Card <R-L-S address>: exceeded time-slot capacity*

*Invalid card location <R-L-S address>*

*Card <R-L-S address>: must be in ACTIVE or MAINTENANCE status*

Confidential

A.6.30 DISPLAY-RC

NAME

*DISPLAY-RC* Display current resourcible card information

DESCRIPTION

Displays Resourcible Card information. Card location is specified by its R-L-S (rack-level-slot) address. See *MODIFY-RC* command for the full status list.

SYNOPSIS

*DISPLAY-RC: RACK*=rack#, *LEVEL*=level#, *SLOT*=slot#, *TYPE*=cardtype;

| | |
|---|---|
| *rack#* | Rack number where the card is situated (1 or 2). |
| *level#* | Level number within the rack (rack1 - 1,2,3; rack2 - 0,1,2,3). |
| *slot#* | Slot number on the level (1 to 21). |
| *cardtype* | Resourcible card type. Can be one of |

| | | |
|---|---|---|
| IPRC | - | Integrated Prompt/Record Card |
| IPRC8 | - | Integrated Prompt/Record Card (8 playback/ 4 record ports) |
| IPRC128 | - | Integrated Prompt/Record Card (128 playback/ 32 record ports) |
| CNF | - | Digital Conference Card |
| SRC | - | Speech Recognition Card |
| CPA | - | Call Progress Analyzer Card |
| DTMF | - | DTMF Receiver Card |
| DTMF24 | - | DTMF Receiver Card (24 ports) |
| DTMF48 | - | DTMF Receiver Card (48 ports) |
| MFRC | - | MF Receiver Card |
| MFRC2 | - | MF Receiver Card |
| ANNC | - | Digitized Voice Card |

EBS Confidential

Configuration is displayed in the following format:

Card <card type>, Location<R-L-S address>:

STATUS = <current card status>

UNUSED PORTS = <number of ports not currently active on this card>

FIRMWARE VERSION = <version and revision level of the firmware installed on the card>

ALARM = <which alarms are active on this card; one of the following list:

CARDFAILUREMINOR
PORTFAILUREMINOR
CARD&PORTFAILUREMINOR>

OWNER = <configuration entity name>

EXAMPLES

MML_TH>DISPLAY-DTG: RACK=1,LEVEL=1,SLOT=1;

ERROR MESSAGES

*Incomplete R-L-S hardware address*

*R-L-S address does not exist*

*Invalid card location <R-L-S address>*

EBS Confidential

A.6.31 MODIFY-RCPORT

NAME

*MODIFY-RCPORT* Modify a resourcible card port configuration

DESCRIPTION

Modifies a Resourcible Card port attributes. Card location is specified by its R-L-S (rack-level-slot) address. When the card is introduced to the system using *ADD-RC* command, its ports are automatically added to the port table. They have to be activated in order to be available to the system.

To reset the port, first make it *INACTIVE*, then set it back to *ACTIVE*.

At least one attribute has to be present in the command.

SYNOPSIS

*MODIFY-RCPORT: RACK*=rack#, *LEVEL*=level#, *SLOT*=slot#, *PORT=port#,*
*[PORTSTATE*=newstate, *RESGROUP*=group#*];*

*rack#* Rack number where the card is situated (1 or 2).

*level#* Level number within the rack (rack1 - 1,2,3; rack2 - 0,1,2,3).

*slot#* Slot number on the level (1 to 21).

*port#* Port number (depends on card type; see ADD-RC, section A.6.27). Wildcard "*" can be used to specify all ports on the card.

*newstate* New port state. Can be one of the following:

*ACTIVE* - the port can be involved in active calls and can be allocated for new calls.

*INACTIVE* - the port cannot be allocated to a call.

Call processing will no longer try to assign any calls to the ports. It is not necessary to remove the deactivated ports from their resource group.

*group#* Number of the resource group to which this port should belong (1 to 63).

EXAMPLES

MML_TH>MODIFY-RCPORT: RACK=1, LEVEL=2, SLOT=15, PORT=*, PORTSTATE=ACTIVE. RESGROUP=23;

ERROR MESSAGES

*Incomplete R-L-S hardware address*

*R-L-S address does not exist*

EBS Confidential

*Invalid card location <R-L-S address>*

*No attributes specified*

*Card <R-L-S address>: invalid port <port#>*

*Card <R-L-S address>: download is in progress*

*Card <R-L-S address>: alarm exists*

*Invalid attribute <attribute name> specified*

*Invalid attribute <attribute name> value <value> specified*

*Card <R-L-S address>: no available port memory*

EBS Confidential

A.6.32 DISPLAY-RCPORT

NAME

*DISPLAY-RCPORT* Display a resourcible card port configuration

DESCRIPTION

Displays Resourcible Card port attributes. Card location is specified by its R-L-S (rack-level-slot) address.

SYNOPSIS

*DISPLAY-RCPORT: RACK*=rack#, *LEVEL*=level#, *SLOT*=slot#, *PORT=port#;*

| | |
|---|---|
| *rack#* | Rack number where the card is situated (1 or 2). |
| *level#* | Level number within the rack (rack1 - 1,2,3; rack2 - 0,1,2,3). |
| *slot#* | Slot number on the level (1 to 21). |
| *port#* | Port number (depends on card type; see ADD-RC, section A.6.27). Wildcard "*" can be used to specify all ports on the card. |

Configuration is displayed in the following format:

Card <card type>, Location<R-L-S address>:

Port <port #>

**PORTSTATE = <current port state; for possible values see *MODIFY-RCPORT*>**

**PORTCOS = <class of service; for possible values see *MODIFY-LCPORT*>**

PORTMAJORSTATE = <major port state (listed in Section A.7.1 on page 129)>

PORTSUPPSTATE = <supplementary port state (listed in Section A.7.1 on page 129)>

PORTADDRESS = <logical device identifier>

RESOURCE GROUP = <group #>

OWNER = <configuration entity name>

ERROR MESSAGES

*Incomplete R-L-S hardware address*

*R-L-S address does not exist*

*Invalid card location <R-L-S address>*

*Card <R-L-S address>: invalid port <port#>*

A.6.33 ADD-IRULE, ADD-ORULE

NAME

| | |
|---|---|
| *ADD-IRULE* | Add an inpulse rule to the system |
| *ADD-ORULE* | Add an outpulse rule to the system |

DESCRIPTION

Introduces a new Inpulse or Outpulse Rule to the system.

SYNOPSIS

*ADD-IRULE: RULE*=rule#, *TOKEN1*=token, *TOKEN2*=token, ..., *TOKEN16*=token;
*ADD-ORULE: RULE*=rule#, *TOKEN1*=token, *TOKEN2*=token, ..., *TOKEN16*=token;

| | |
|---|---|
| *rule#* | Inpulse or Outpulse Rule number (1 to 30) |
| *token* | A single inpulse rule instruction, which consists of an operator token and an argument. For the list of instructions Section A.7.2 on page 131 and Section A.7.3 on page 136. |

EXAMPLES

MML_TH>ADD-IRULE: RULE=3, TOKEN1=DTMF, TOKEN2=TONE ENAB 3, TOKEN3=TONE FDIG 1, TOKEN4=DIGITS 10, TOKEN5=IP FIELD 1;

MML_TH>ADD-ORULE: RULE=2, TOKEN1=SEIZE, TOKEN2=TIME SUP 5, TOKEN3=WAIT SUP 1, TOKEN4=OP DTMF, TOKEN5=OP FIELD 1;

ERROR MESSAGES

*Inpulse rule already exists*

*Outpulse rule already exists*

*Inpulse rule is empty*

*Outpulse rule is empty*

*Invalid position*

*Exceeded maximum number of instructions*

*Illegal token value*

EBS Confidential

A.6.34 DELETE-IRULE, DELETE-ORULE

NAME

*DELETE-IRULE* Delete an inpulse rule from the system
*DELETE-ORULE* Delete an outpulse rule from the system

DESCRIPTION

Removes an Inpulse or Outpulse Rule from the system.

SYNOPSIS

*DELETE-IRULE: RULE*=rule#;
*DELETE-ORULE: RULE*=rule#;

*rule#* Inpulse or Outpulse Rule number (1 to 30)

EXAMPLES

MML_TH>DELETE-IRULE: RULE=3;
MML_TH>DELETE-ORULE: RULE=5;

ERROR MESSAGES

*Inpulse rule is empty*

*Invalid position*

EBS Confidential

A.6.35 MODIFY-IRULE, MODIFY-ORULE

NAME

*MODIFY-IRULE* Modify an inpulse rule contents

*MODIFY-ORULE* Modify an outpulse rule contents

DESCRIPTION

Modifies an Inpulse or Outpulse Rule contents. Each token mentioned in the command replaces the corresponding instruction in the rule. Other instructions in the rule remain intact.

SYNOPSIS

*MODIFY-IRULE: RULE*=rule#, *TOKEN1*=token, *TOKEN2*=token, ..., *TOKEN16*=token*;*

*MODIFY-ORULE: RULE*=rule#, *TOKEN1*=token, *TOKEN2*=token, ..., *TOKEN16*=token*;*

*rule#* Inpulse or Outpulse Rule number (1 to 30)

*token* A single inpulse rule instruction, which consists of an operator token and an argument. For the list of instructions Section A.7.2 on page 131 and Section A.7.3 on page 136. Use NULL token to delete an individual instruction.

EXAMPLES

MML_TH>MODIFY-IRULE: RULE=3, TOKEN5=IP FIELD 2; -- tokens other than 5 remain unchanged MML_TH>MODIFY-ORULE: RULE=2, TOKEN3=WAIT SUP W, TOKEN6=TIME SUP 30, TOKEN7= FINAL SUP A; -- tokens 1, 2, 4, and 5 are not changed

ERROR MESSAGES

*Inpulse rule already exists*

*Outpulse rule already exists*

*Inpulse rule is empty*

*Outpulse rule is empty*

*Invalid position*

*Exceeded maximum number of instructions*

*Illegal token value*

A.6.36 DISPLAY-IRULE, DISPLAY-ORULE

NAME

| | |
|---|---|
| *DISPLAY-IRULE* | Display an inpulse rule |
| *DISPLAY-ORULE* | Display an outpulse rule |

DESCRIPTION

Shows contents of an Inpulse or Outpulse Rule.

SYNOPSIS

*DISPLAY-IRULE: RULE*=rule#;
*DISPLAY-ORULE: RULE*=rule#;

| | |
|---|---|
| *rule#* | Inpulse or Outpulse Rule number (1 to 30) |

Rule is displayed in the following format (empty instructions are represented by NULL) :

<rule type> rule <rule#>:
TOKEN1 = <rule instruction>
TOKEN2 = <rule instruction>
...
TOKEN16 = <rule instruction>
OWNER = <configuration entity name>

EXAMPLES

MML_TH>DISPLAY-IRULE: RULE=3;
MML_TH>DISPLAY-ORULE: RULE=5;

ERROR MESSAGES

*Inpulse rule is empty*

*Outpulse rule is empty*

*Invalid position*

DSC Confidential

A.6.37 ADD-SUP

NAME

*ADD-SUP* Add an answer supervision template to the system

DESCRIPTION

Introduces a new Answer Supervision Template to the system. Templates are used by WAIT SUP [xx] and FINAL SUP [xx] Outpulse Rule tokens. Each template is a set of the switch responses to the detection of specific signaling events.

SYNOPSIS

*ADD-SUP:* *TEMPLATE*=template# *[,* *DIALTONE*=token, *RINGBACK*=token, *BUSY*=token, *REORDER*=token, *SITTONES*=token, *RINGCESS*=token, *VOICEDET*=token, *VOICECESS*=token, *WINK*=token, *ANSWER*=token, *TIME*=token, *HOOKFLASH*=token, *PAGERCUE*=token, *ISUPTONE*=token, *ISUPCESS*=token*];*

*template#* Answer supervision template number (1 to 24)

*token* A single condition token specifying switch response For the list of tokens Section A.7.5 on page 141. For the list of signaling events, Section A.7.4 on page 139.

EXAMPLES

MML_TH>ADD-SUP: TEMPLATE=3, RINGBACK=REP, BUSY=FAIL, REORDER=ERROR, SITTONES=FAIL, ANSWER=ANSREP, TIME=FAIL;

ERROR MESSAGES

*Invalid Answer Supervision Template Id*

*Template already exists*

*Invalid action*

*Template is not empty*

*Pager detect selected with ISUP tone*

*Hookflash selected with ISUP cessation*

A.6.38 DELETE-SUP

NAME

*DELETE-SUP* Delete an answer supervision template from the system

DESCRIPTION

Removes an Answer Supervision Template from the system.

SYNOPSIS

*DELETE-SUP: TEMPLATE*=template#;

*template#* Answer supervision template number (1 to 24)

EXAMPLES

MML_TH>DELETE-SUP: TEMPLATE=3;

ERROR MESSAGES

*Invalid Answer Supervision Template Id*

EBS Confidential

A.6.39 MODIFY-SUP

NAME

*MODIFY-SUP* Modify answer supervision template entries

DESCRIPTION

Modifies Answer Supervision Template entries. Templates are used by WAIT SUP [xx] and FINAL SUP [xx] Outpulse Rule tokens. Each template is a set of the switch responses to the detection of specific signaling events.

SYNOPSIS

*MODIFY-SUP: TEMPLATE*=template# *[, DIALTONE*=token, *RINGBACK*=token, *BUSY*=token, *REORDER*=token, *SITTONES*=token, *RINGCESS*=token, *VOICEDET*=token, *VOICECESS*=token, *WINK*=token, *ANSWER*=token, *TIME*=token, *HOOKFLASH*=token, *PAGERCUE*=token, *ISUPTONE*=token, *ISUPCESS*=token*];*

*template#* Answer supervision template number (1 to 24)

*token* A single condition token specifying switch response For the list of tokens Section A.7.5 on page 141. For the list of signaling events, Section A.7.4 on page 139. Use NULL token to delete a response for an individual signaling event.

EXAMPLES

```
MML_TH>MODIFY-SUP: TEMPLATE=3, RINGBACK=REP, BUSY=FAIL, REORDER=ERROR,
SITTONES=FAIL, ANSWER=ANSREP, TIME=FAIL;
```

ERROR MESSAGES

*Invalid Answer Supervision Template Id*

*Template already exists*

*Invalid action*

*Template is not empty*

*Pager detect selected with ISUP tone*

*Hookflash selected with ISUP cessation*

A.6.40 DISPLAY-SUP

NAME

*DISPLAY-SUP* Display an answer supervision template

DESCRIPTION

Shows contents of an Answer Supervision Template. Section A.7.4 on page 139 and Section A.7.5 on page 141 for more details.

SYNOPSIS

*DISPLAY-SUP: TEMPLATE*=template#;

*template#* Answer supervision template number (1 to 24)

Template is displayed in the following format (empty entries are represented by NULL) :

Answer Supervision Template <template#>:

DIALTONE = <condition token>
RINGBACK = <condition token>
BUSY= <condition token>
REORDER=<condition token>
SITTONES=<condition token>
RINGCESS=<condition token>
VOICEDET=<condition token>
VOICECESS=<condition token>
WINK=<condition token>
ANSWER=<condition token>
TIME=<condition token>
HOOKFLASH=<condition token>
PAGERCUE=<condition token>
ISUPTONE=<condition token>
ISUPCESS=<condition token>
OWNER = <configuration entity name>

EXAMPLES

MML_TH>DISPLAY-SUP: TEMPLATE=3;

ERROR MESSAGES

*Invalid Answer Supervision Template Id*

EBS Confidential

A.7 Appendix

EBS Confidential

A.7.1 Port States[1]

**Table 1.7.1-1 *PORTMAJORSTATE* values**

| Value | Meaning |
|---|---|
| *cp-idle* | Idle line or trunk |
| *cp-wait* | Waiting for an answer within an outpulse rule |
| *cp-wwink* | Waiting for a wink within an outpulse rule |
| *cp-dial* | Dialing state uses substate. An Fdig was received |
| *cp-stab* | Stable State |
| *cp-wans* | Call Routed waiting for answer |
| *cp-dcon* | Call disconnect state |
| *cp-gard* | Trunk in guard timing |
| *cp-fexc* | Call was passed to Final Exception Handling |
| *cp-wtim* | Waiting for unspecified period of time |
| *cp-mbusy* | Port is in maintenance busy state |
| *cp-mfwt* | Waiting for MF digits |

**Table 1.7.1-2 *PORTSUPPSTATE* values**

| Value | Meaning |
|---|---|
| *none* | |
| *cp-setup* | Waiting for SETUP mode |
| *cp-primary* | Waiting for primary ringback completion |
| *cp-rdr* | Waiting for reorder completion |
| *cp-mf* | Waiting for MF receiver to be available |
| *cp-att* | Resource is attached to a TNK |
| *cp-diag* | Port is in diagnostic state |
| *cp-disc* | Port is PSC timing |
| *cp-host* | Port is under direct host control for impulsing and awaiting host response |

1. *Source:* Summa Four VCO V4.0 Management Information Base

**Table 1.7.1-2 *PORTSUPPSTATE* values**

| Value | Meaning |
|---|---|
| ***none*** | |
| ***cp-fdig*** | DFR circuit waiting for first digit |
| ***cp-dig*** | DFR circuit for field digit report |
| ***cp-inpulse*** | Port is in inpulse rule processing |
| ***cp-dtmf*** | Port is collecting DTMF digits |
| ***cp-talk*** | Port is speaking announcement |
| ***cp-tone*** | OPC is outpulsing |
| ***cp-conf*** | Port is active in a conference |
| ***cp-mon*** | Port is active in a monitor |
| ***cp-outpulse*** | Port is processing outpulse rule |
| ***cp-wtone*** | Port is waiting for a tone |
| ***cp-speech*** | Port is collecting spoken digit information |
| ***cp-selftest*** | Port is performing its diagnostic selftest |
| ***cp-wtfsup*** | OGT is waiting for final supervision |
| ***cp-analyze*** | CPA port is analyzing |
| ***cp-record*** | IPRC port is recording |
| ***cp-cpamon*** | CPA port monitoring for end of call tone |

EBS Confidential

A.7.2 Inpulse Rule Tokens[1]

1.7.2.1 REP END Token Type: Reporting Control. The REP END token is used to specify that reports to the host are made only at the end of the Inpulse Rule execution. The report contains all the received DTMF and MF digits, the incoming port change of state, and any errors detected during digit collection. This token cuts down on communication link and host processing overhead. REP END is the default reporting token.

1.7.2.2 REP EACH Token Type: Reporting Control. REP EACH is used to specify that reports to the host are sent as events happen, as if the host were sending commands for every action in the Inpulse Rule(s). On/off hook and digit reports are sent to the host as the events occur, allowing the host to make routing or other application decisions before the end of rule processing. Communication link and host processing overhead can be high when using this token.

1.7.2.3 REP NEXT Token Type: Reporting Control. REP NEXT is used to specify that the event that immediately follows it is reported to the host when it happens; the reporting control mode then reverts to the one specified by the previous Reporting Control token. The on/off hook or digit report is sent to the host when the event occurs, allowing the host to make routing or other application decisions before the end of rule processing. Communication link and host processing overhead is not as high as with REP EACH. In MFCR2 processing, REP NEXT is also used as an outpulse token. For more information, refer to 1.2.2.2.

1.7.2.4 NO REP Token Type: Reporting Control. The NO REP token is used when multiple successive Inpulse/Outpulse Rules are to be processed using the 'DO' tokens, which would generate multiple Inpulse Rule Complete ($DD) reports. NO\x11REP suppresses reporting that normally occurs at the end of a rule. If digit collection is to be performed or there are other supervision events for which reports to the host are desired, the REP NEXT token should precede those events. Any digits collected in a rule that are not reported because of a NO REP token are reported in any subsequent $DD report for the call. Multiple collections from several rules can be reported using a single $DD report. This token reduces communication link and host processing overhead.

1.7.2.5 DTMF Token Type: Signaling Mode. Must precede Digit Collection Set Up or Digit Collection Token in the rule. DTMF indicates that a DTMF receiver port is required for digit collection. When this token is encountered, the SDS hunts the DTMF receiver resource group, links a port into the resource chain, but does not enable the port until a Digit Collection Token is encountered. The DTMF receiver remains in the resource chain until a Digit Collection Token, MF or MFCR2 token is encountered, or until the end of rule processing. This token must be used for all DTMF digit collection, even when SLIC, DID or UTC ports with onboard receivers are used.

1.7.2.6 MF Token Type: Signaling Mode. Must precede Digit Collection Set Up or Digit Collection Token in the rule. MF indicates that an MF receiver port is required for digit collection. When this token is encountered, the SDS hunts the MF receiver resource group, links a port into the resource chain, but does not enable the port until a Digit Collection Token is encountered. The MF receiver remains in the resource chain until a DTMF or MFCR2 token is encountered, or until the end of rule processing.

1.7.2.7 MFCR2 Token Type: Signaling Mode. Must precede Digit Collection Set Up or Digit Collection Token in the rule. MFCR2 indicates that an MFCR2 transceiver port is required for digit collection When this token is encountered, the SDS hunts the MFCR2 transceiver resource group, links a port into the resource chain, but does not enable the port until a Digit Collection Token is encountered. The MFCR2 transceiver remains in the resource chain until a DTMF or MF token is encountered, or until the end of rule processing.

1.7.2.8 DTMF4 Token Type: Signaling Mode. Must precede Digit Collection Set Up or Digit Collection Token in the rule. A new inpulse rule token, DTMF4, is created for utilizing fourth column DTMF digits. This token does affect rule data fields in some cases as described below. Selecting DTMF4 as an inpulse rule token allows the dependent END and CLR character token data fields to accept fourth column DTMF digits. Using the DTMF4 token ensures that a receiver resource which supports fourth column DTMF digits is linked into a given call. The DTMF token offers no such guarantee. Note that the system feature, `Enable 4th Column DTMF', must be enabled to use the DTMF4 inpulse rule token.

1.7.2.9 IP ANI [xx] Token Type: Digit Collection. IP ANI [xx] enables an attached DTMF receiver, MF receiver, or MFCR2 transceiver to collect digits. Digits are stored in the originating number field of the call record. Previous set up tokens determine how the inpulse action occurs. Valid values for IP ANI's additional data field are 1 through 40. If the signaling Mode token preceding this token is MF, no entry is required for the additional data field. All digits detected between a single KP and ST pair within a 30-second period are collected, but only the first 12 are reported and stored for later outpulsing. If the signaling Mode token preceding this token is DTMF, a value between 1 and 40 determines the number of digits that are collected, stored, and reported. If the IP ANI is used more than once within the same call, the digits previously contained in the field are overwritten when the second digit string is collected. If the signaling Mode token preceding this token is MFCR2, rule processing is suspended until MFCR2 collection is complete. End-of-digit tones (I-15) are not reported as part of the collection. If the IP ANI is used more than once within the same call, the digits previously contained in the field are overwritten when the second digit string is collected. NOTE: Signal designation I-10 digits are automatically translated to '0' digits by the SDS when collected 1. *Source:* Summa Four VCO V4.0 Management Information Base and stored in a digit field.

1.7.2.10 IP FIELD [xx] Token Type: Digit Collection. IP FIELD [xx] token enables an attached DTMF receiver, MF receiver, or MFCR2 transceiver to collect digits. Digits are stored in the call record digit field specified by the value in the additional data field. Up to 40 digits can be collected, reported, and stored for later outpulsing. The value in the additional data field can be 1, 2, 3, or 4. Previous set up tokens determine how the inpulse action occurs, but for DTMF collection this token must be preceded by a DIGITS [xx] token. If the same digit field is used more than once within the same call, the digits previously contained in the field are overwritten when the second digit string is collected. In MFCR2 processing, rule processing is suspended until the MFCR2 collection is complete. End-of-digit tones (I-15) are not reported as part of the collection. If the IP ANI is used more than once within the same call, the digits previously contained in the field are overwritten when the second digit string is collected. NOTE: MFCR2 signal designation I-10 digits are automatically translated to '0' digits by the SDS when collected and stored in a digit field.

1.7.2.11 DIGITS [xx] Token Type: Collection Set Up. DIGITS [xx] applies to DTMF and MFCR2 digit collection, and is used preceding IP FIELD [xx] and IP ANI [xx]. The DIGITS token specifies the number of digits to collect. The value for the additional data field (xx) can be between 1 and 40; if no value is entered, the system defaults to 0. When the data field is 0 in MFCR2 processing, digits are collected until the end-of-digit (I-15) tone is received. (Note that the I-15 tone is not reported in the digit report.)

1.7.2.12 **END CHAR* [xx]** Token Type: Collection Set Up. END CHAR* [xx] applies to DTMF and MFCR2 applications. In DTMF processing, this token specifies that a one- or two-character DTMF digit string can be used to signal that all digits are entered. END CHAR* [xx] is used when the phone user can enter a varying number of digits (such as an account number), and the end of this digit string must be marked. The DTMF receiver stops digit collection when the specified character string is received. If this token is not used, the rule does not support a special end of string character. The one- or two-character DTMF string entered in the additional data field specifies the digit string; valid characters are 0 to 9, A-D, * and #, and are represented in the MIB via either a single nibble (for END CHAR1), or a 2-nibble INTEGER value (for END CHAR2), the high nibble encoding the first digit, the low nibble encoding the second digit, with values 0 to 9, 10 to 13, 14 and 15, respectively. In MFCR2 processing, END CHAR sets the backward supervision tone to SEND after the digit collection is complete. The completion of the digit collection is signified by a Group I-15 tone. Valid values for the END CHAR additional data field are hex values 1 through F. If a valid digit is not entered, a default of 4 is sent. (4 corresponds to A-4, network congestion.) The backward tone specified is transmitted back to the forward register. NOTE: The MFCR2 tones generated by END CHAR [xx] tokens may be either Group A or Group B R2 signaling tones. While Group A and B tones of the same designation (e.g., A-1 and B-1) are made up of the same frequencies, the tone meanings vary between the two groups. The forward register must interpret the meaning of the tone based on the call model used.

1.7.2.13 **CLR CHAR* [xx]** Token Type: Collection Set Up. CLR CHAR* [xx] applies to DTMF and MFCR2 applications. In DTMF processing, this token specifies that a one- or two-character DTMF digit string can be used to signal that all digits entered for the current collection field should be discarded and collection should begin again. CLR CHAR* [xx] is used to allow the user to begin again if a mistake is made. When the specified character string is detected, the digit buffer for the current field is cleared and digit collection is restarted. If this token is not used, the rule does not support a special clear character. The one- or two-character DTMF string entered in the additional data field specifies the digit string; valid characters are 0 to 9, A-D, * and #, with the same encoding as END CHAR*. In MFCR2 processing, CLR CHAR sets the backward supervision tone to SEND during the digit collection sequence. Valid values for CLR CHAR's additional data field are hex values 1 through F. If a valid digit is not entered, a default of 4 is sent. (4 corresponds to A-4, network congestion.) The backward tone specified in transmitted back to the forward register. NOTE: The MFCR2 tones generated by CLR CHAR [xx] tokens may be either Group A or Group B R2 signaling tones. While Group A and B tones of the same designation (e.g., A-1 and B-1) are made up of the same frequencies, the tone meanings vary between the two groups. The forward register must interpret the meaning of the tone based on the call model used.

1.7.2.14 WINK ENAB Token Type: Collection Set Up. WINK ENAB causes a wink signal to be sent to the distant end when the DTMF receiver, MF receiver, or MFCR2 transceiver in the call's resource chain is enabled. A receiver is enabled when rule processing encounters an IP ANI or IP FIELD [xx] token. Wink signals can be sent by DID, T1, and E+M circuits. This token is typically used to signal a Central Office or other switch that the SDS is ready to accept digits. The WINK ENAB token can also be used to generate a hookflash on DID, T1, E + M and UTC circuits. Refer to Appendix B for information about Network Interface Port Capabilities.

1.7.2.15 TONE ENAB [xx] Token Type: Collection Set Up. TONE ENAB [xx] presents one of the standard SDS system tones to the port when the DTMF receiver, MF receiver, or MFCR2 transceiver in the call's resource chain is enabled. A receiver is enabled when rule processing encounters an IP ANI or IP FIELD [xx] token. This token is typically used to signal a user to begin entering digits. Up to two digits can be entered in the additional data field to specify the tone to present. Available tones and their values are listed in Table.

1.7.2.16 TONE CLR [xx] Token Type: Collection Set Up. TONE CLR [xx] applies to DTMF applications only. The token presents a standard SDS tone to the port when the DTMF receiver encounters the clear character string specified by the CLR CHAR [xx] token in this rule. Up to two digits can be entered in the additional data field to specify the tone to present. Available tones and their values are listed in Table\x112.2.

1.7.2.17 TONE END [xx] Token Type: Collection Set Up. TONE END [xx] applies to DTMF applications only. The token presents a standard SDS tone to the port when the DTMF receiver encounters the end character string specified by the END CHAR token in this rule. Up to two digits can be entered in the additional data field to specify the tone to present. Available tones and their values are listed in Table.

1.7.2.18 TONE FDIG [xx] Token Type: Collection Set Up. TONE FDIG [xx] applies to DTMF applications only. The token presents a standard SDS tone to the port when the first digit is detected by a DTMF receiver. This feature is useful for going from dial tone to quiet when the user starts dialing. Up to two digits can be entered in the additional data field to specify the tone to present. Available tones and their values are listed in Table.

1.7.2.19 TIM FIELD [xx] Token Type: Collection Set Up. TIM FIELD [xx] applies to DTMF applications only. The token specifies the number of seconds rule processing waits for all expected digits to be received before timing out. Timing starts when the first digit is received. If the TIM FIELD [xx] token is not used in an Inpulse Rule, field timing defaults to 20 seconds. Digits collected before timeout are returned to the host in an Inpulse Rule Complete or DTMF Digit report (depending upon the Reporting Control token used), making this token useful for collecting a variable number of digits. The timeout ends Inpulse Rule execution and releases any DRC port, but leaves all links and paths intact. The length of the timer in seconds is specified in the additional data field by a value between 1 and 60.

1.7.2.20 TIM FDIG [xx] Token Type: Collection Set Up. TIM FDIG [xx] applies to DTMF applications only. The token specifies the number of seconds rule processing waits for the first digit after the receiver is enabled before timing out (first digit timeout). Timing starts when the receiver is enabled. If the TIM FDIG [xx] token is not used in an Inpulse Rule, no first digit timing is performed. If no digits are entered, the Inpulse Rule waits indefinitely, or until a port disconnect or host-forced disconnect is detected. The timeout ends Inpulse Rule execution and releases any DRC port, but leaves all links and paths intact. The length of the timer in seconds is specified in the additional data field by a value between 1 and 30.

1.7.2.21 TIM INTER [xx] Token Type: Collection Set Up. TIM INTER [xx] applies to DTMF applications only. The token specifies the number of seconds rule processing waits for a digit after a digit is received before timing out (inter-digit timeout). Timing starts when a digit is received. If the TIM INTER [xx] token is not used in an Inpulse Rule, inter-digit timing defaults to 6 seconds. Digits collected before timeout are returned to the host in an Inpulse Rule Complete or DTMF Digit report. The timeout ends Inpulse Rule execution and releases any DRC port, but leaves all links and paths intact. The length of the timer in seconds is specified in the additional data field by a value between 1 and 10.

1.7.2.22 ROUTE [Tx] Token Type: Processing Control. ROUTE [Tx] provides call routing based on the digits stored in the specified digit field. When the token is used, digits collected and stored in digit field 'x' are matched against the patterns established in routing table 'T' and routed accordingly. Route table values range from 1 (table A) to 10 (table J). Digit field values range from 1 to 5, with 1 to 4 corresponding to the numbered digit fields and 5 indicating the Originating Number (ANI) field. If a value of 0 is entered for 'x', direct routing is performed. It is recommended that a CONT NREP token be used in rules containing a ROUTE [Tx] token. The CONT NREP token continues rule processing in the event of a first digit, inter digit, or field collection timeout. This token prevents rule processing from ending before the ROUTE [Tx] token is processed. The ROUTE [Tx] token must be the last token defined in an Inpulse Rule. Inpulse Rule processing ceases after a routing action is performed. Any tokens after ROUTE [Tx] in an Inpulse Rule will not be executed.

1.7.2.23 WINK NOW Token Type: Supervision Control. WINK NOW provides a wink signal on the incoming port. T1, E+M and DID circuits can generate a wink. Refer to Appendix B for the wink effect on each card. The WINK NOW token can also be used to generate a hookflash on DID, T1, E+M and UTC circuits.

1.7.2.24 ANSWER Token Type: Supervision Control. ANSWER provides answer supervision on the incoming port. This token can be used for all network interface circuit types except SLIC. Refer to Appendix B for information about the answer effect on each card. This token is ignored if the port executing the rule has an outgoing class of service.

1.7.2.25 TONE NOW [xx] Token Type: Supervision Control. TONE NOW [xx] presents one of the standard SDS system tones to the port when rule processing encounters this token. Up to two digits can be entered in the additional data field to specify the tone to present. Available tones and their values are listed in Table.

1.7.2.26 SPEAK [xx] Token Type: Prompt/Record Control. SPEAK [xx] presents one of the library of SDS voice prompts stored on the Digitized Voice Card (DVC) or Integrated Prompt/Record Card (IPRC) when rule processing encounters this token. Any number of SPEAK [xx] tokens can be used in a rule. This token is most commonly used to prompt a user to enter digits or wait while a call is processed. Up to three digits can be entered in the additional data field to specify the prompt to present. For IPRCs, the valid range is 1 to 255, corresponding to each prompt in a library. Available prompts can vary depending on the version in use. When specifying a prompt number, verify that there is indeed a prompt associated with that number. No error message is generated during runtime for non-existent prompts. Non-existent prompts do not cause any disruption in the call. Refer to the SDS Programming Reference for more information. If an IPRC port has already been allocated to the call and does not support the specified library, the IPRC port is released and a new port is allocated. When the SPEAK token is encountered, a DVC or IPRC resource is allocated to the call from the announcement resource group. For IPRC operations, a resource that supports the specified prompt library is allocated. Multiple consecutive speak tokens are treated as one announcement. Refer also to the LIBRARY token.

1.7.2.27 RECORD Token Type: Prompt/Record Control. RECORD [xx] is used to initiate an IPRC record operation. Valid range for [xx] is 1 to 255.This token hunts for an IPRC containing the default or previously defined prompt library, erase the prompt specified (xx), and begin recording a new prompt from the line/trunk port executing the inpulse rule. The record operation terminates when the maximum record time is reached, if subsequent tokens in the inpulse rule terminate the recording (DTMF digit received), or when the IPRC port is released from the call. Refer also to the MAX REC token. Refer also to the LIBRARY token.

1.7.2.28 LIBRARY [xx] Token Type: Prompt/Record Control. The LIBRARY token is used to define the voice prompt library to use for both prompt playback and record operations for IPRCs. (NOTE: DVCs only support Library 1. Do not use this token with DVCs.) Valid input range is 1 to 16, since sixteen prompt libraries are supported by the SDS, or 'TMP'. The LIBRARY token is used by the SDS system controller software to hunt an IPRC port from the Announcement resource group that supports the specified prompt library. The default library id is 1 if none is specified. The LIBRARY token must be specified before the RECORD or SPEAK token for proper operation. The 'TMP' library identifier specifies that the play/record operation access the IPRC port's temporary array of prompts. Each IPRC port has access to 255 temporary prompts. The temporary prompts are maintained as long as the IPRC port is involved in the call. All temporary prompts are erased when the IPRC port is released. Temporary prompts are used in applications where prompt data is needed and is valid on a per call basis. One such application is automated operator services. In this application, the SDS records the caller's name, places an outbound call to the destination, and then plays back the caller's name to the called party so they can determine whether to accept the call.

1.7.2.29 MAX REC [time] Token Type: Prompt Record Control. The MAX REC token is used to define an upper limit in seconds for recording a particular prompt. The default value for the recording limit is 0 seconds, meaning no limit. The maximum limit, measured in seconds, is 255. This token is used in applications that need to provide a fixed time limit for recording prompt information. It also prevents one or a few prompts from consuming all memory capacity on a particular IPRC. The MAX REC token must be specified before the RECORD token for proper operation.

1.7.2.30 STOP VOIC Token Type: Prompt/Record Control. The STOP VOIC token is used to explicitly terminate any voice prompt operation in progress. This token is used to terminate playback or record operations. No additional input data is required for this token. One application for this token is to terminate a prompt operation when a DTMF digit is detected within the rule. The STOP VOIC token in this case, is defined immediately after the tokens used to detect the digit.

1.7.2.31 LOOP LAST Token Type: Prompt/Record Control. The LOOP LAST token is used for prompt playback operations to instruct the IPRC to continually loop the last prompt in a list of prompts being played. The playback will continue until a subsequent inpulse rule or host command terminates the operation, or the IPRC port playing the prompt list is removed from the call. No additional input data is required for this token. The LOOP LAST token must be specified before any SPEAK token for proper operation. The LOOP LAST token will not suspend inpulse rule execution to allow other processing, such as digit collection.

1.7.2.32 LOOP ALL Token Type: Prompt/Record Control. The LOOP ALL token is used for prompt playback operations to instruct the IPRC to continually loop the list of prompts being played. The playback continues until a subsequent inpulse rule or host command terminates the operation, or the IPRC port playing the prompt list is removed from the call. No additional input data is required for this token. The LOOP ALL token must be specified before the SPEAK token for proper operation.

1.7.2.33 RELEASE [resource type] Token Type: Resource Control. The valid resource types are: IPR, MRC, DRC, DTG, and CPA, represented in the MIB by the INTEGER values 16, 5, 4, 7, 22, respectively. The RELEASE token is used to remove the specified resource type from the call. Token processing releases the specified resource immediately if one exists in the call chain. This token is used to free up resources normally retained until the end of the rule processing.

1.7.2.34 RETAIN [resource type] Token Type: Resource Control. The valid resource type is IPR, represented in the MIB by the INTEGER value 16. The RETAIN token is used to hold onto an IPRC resource following the execution of an inpulse rule. Existing rule processing releases all resources at rule end. This token only supports retaining IPRC ports. This token is used in applications when a temporary prompt has been recorded and will need to be played at a later stage in the call.

1.7.2.35 WAIT TIME [xx] Token Type: Supervision Control. WAIT TIME [xx] causes rule processing to pause for up to 10 seconds. This token is commonly used to allow time for the person on the phone to take some action (think time). The value (1 to 10) in the additional data field corresponds to the number of seconds to wait.

1.7.2.36 ISDN RX [xx] Token Type: Supervision Control. ISDN RX [xx] specifies to use an ISDN Message Template during rule processing. You can use this token in either Inpulse or Outpulse Rules. The value in the data entry field specifies the number of the ISDN Message to be processed. Template number range from 1 to 96. The template you specify must be configured as a receive template and cannot have a message type of CHAINED. At the time of data entry, if the template number corresponds to a template that has been configured as a transmit template, an error message is displayed on the screen. In an Inpulse Rule, ISDN RX [xx] specifies which ISDN Message Template processes am incoming D-channel message. When an ISDN RX [xx] token is encountered, processing continues with the template specified in the additional data field. Template processing is not completed until the message specified in the template is received. When template processing ends, rule processing continues with the token following ISDN TX [xx]. The receive template is used to store received D-channel message data in that call record and/or condition reporting of the received D-channel message to the host.

1.7.2.37 ISDN TX [xx] Token Type: Supervision Control. ISDN RX [xx] specifies which ISDN Message Template is used to construct an outgoing D-channel message. This token can be used in either Inpulse or Outpulse Rules. A transmitted D-channel message can be constructed by any combination of data from three sources: IEs specified in the message template Data stored in SDS fields (ANI, 1-4) IEs specified in an ISDN Port Control ($49) command When an ISDN TX [xx] is encountered, processing continues with the template specified in the additional data field. When template processing ends, rule processing continues with the token following ISDN TX [xx]. The value in the additional data entry field specifies the number of the ISDN Message Template to be processed. Template numbers range from 1 to 96, inclusive. The template specified must be configured as a transmit template and cannot have a message type of CHAINED. At the time of data entry, if the template number corresponds to a template that has been configured as a receive template, an error message is displayed on the screen.

1.7.2.38 GOTO RULE [xx] Token Type: Processing Control. GOTO RULE [xx] allows the construction of rules with more than 16 steps. When rule processing encounters a GOTO RULE [xx] token, it continues processing with the first token of the Inpulse Rule specified in the additional data field. Rule processing does not return to the original rule unless directed by a subsequent GOTO RULE [xx] token. This token can be used to create an endless loop by specifying the original rule number in the additional data field. This feature can be used to present a repeating tone or voice card prompt to the incoming port, but should be used with caution. The value in the additional data field (1 to 30) corresponds to the rule number with which processing continues.

1.7.2.39 DO IRULE [xx] Token Type: Processing Control. DO IRULE [xx] instructs the SDS to perform processing for the Inpulse Rule specified, then return to this rule. In an Inpulse Rule, this token allows the construction of rules with more than 16 steps. DO IRULE [xx] works in much the same way as a subroutine call within a program. When rule processing encounters this token, processing continues with the first token of the Inpulse Rule specified in the additional data field. At the end of the specified rule, processing continues with the token following the DO\x11IRULE [xx] token in the original rule. The 'subroutine' rule must not call another rule containing a GOTO RULE [xx], DO IRULE [xx], or DO ORULE [xx] token. If it does, the call is processed as if the original DO IRULE token were a GOTO RULE.

1.7.2.40 DO ORULE [xx] Token Type: Processing Control. DO ORULE [xx] instructs the SDS to perform processing for the Outpulse Rule specified, then return to this rule. It allows Outpulse Rule functions (outpulsing digits) during an Inpulse Rule, working in much the same was as a subroutine call within a program. When rule processing encounters this token, processing continues with the first token of the Outpulse Rule specified in the additional data field. At the end of the specified rule, processing continues with the token following the DO ORULE [xx] token in the original rule. The 'subroutine' rule must not call another rule containing a GOTO RULE [xx], DO IRULE [xx], or DO ORULE [xx] token. If it does, the call is processed as if the original DO ORULE token were a GOTO RULE.

1.7.2.41 CONT REP Token Type: Collection Set Up. CONT REP specifies to continue rule processing in the event a DTMF/DP first digit, inter-digit, or field collection timeout occurs and report the timeout and any digits to the host. This token should appear immediately preceding the Digit Collection token. If a timeout occurs, rule processing continues with the token following the Digit Collection token. A $D1 report is generated (or a segment is included in the $DD report) specifying a first digit, inter-digit, or field timeout. In the case of inter-digit and field time-outs, all digits collected to that point are reported. This token allows for continued rule processing even following a digit collection timeout.

1.7.2.42 CONT NREP Token Type: Collection Set Up. CONT NREP specifies to continue rule processing in the event a first digit, inter-digit, or field collection timeout occurs. The CONT NREP suppress a $D1 or corresponding $DD segment reporting a first digit timeout, otherwise performing exactly as the CONT REP token. This token should appear immediately preceding the Digit Collection token. If a timeout occurs, rule processing continues with the token following the Digit Collection token. Any digits collected are reported at the end of the rule unless they are overwritten by a subsequent collection.

1.7.2.43 NOHOST [xx] Token Type: Processing Control. NOHOST [xx] executes a specified Inpulse Rule following the expiration of the host setup timer. The SDS expects a response to an initial call report (incoming/outgoing Port Change of State or Inpulse Rule Complete report) within six seconds. If no host command is received in that time (setup timer expires), the SDS executes the Inpulse Rule indicated in the NOHOST [xx] token additional data field (rule number 1 - 30). If this token is not used, the SDS begins Reorder and Permanent Signal processing for the port involved when the host setup timer expires. NOTE: If the 'Disable Host Setup Timing' system feature flag is set to Y, NOHOST [xx] tokens are ignored during Inpulse Rule processing. This feature setting prevents the host setup timer from even being started. The Inpulse Rule specified in the NOHOST [xx] token can contain voice prompts directing the caller to go on hook or an alternate method of completing the call. If this 'backup' rule does not include a NOHOST [xx] token, the port is subject to the six-second setup timer once a $DA, $DB, or $DD report is sent to the host.

A.7.3 Outpulse Rule Tokens[1]

1.7.3.1 REP END Token Type: Reporting Control. REP END indicates when Outpulse Rule processing completes. Individual supervision events are reported to the host via Incoming Port Change of State ($DB) and Outgoing Port Change of State ($DA) reports, based on the Answer Supervision Template condition tokens.

1.7.3.2 REP NEXT Token Type: Reporting Control. Used in an outpulse rule for MFCR2 processing only. REP NEXT causes the final backward supervision to be reported to the host in the Outgoing Port Change of State ($DA) report. The report is generated immediately after the detection of a final backward supervision event. If REP NEXT precedes an OP MFCR2 token in a rule, the detection of a Group-B, A-4, A-6 tone aborts the rule and generates a $DA report to the host that indicates the final backward supervision event was received.

1.7.3.3 OP DTMF Token Type: signaling Mode. OP DTMF indicates outpulsing is done in DTMF mode. Digits are sent using DTMF until an OP MF or OP TONE token is encountered, or until the end of the rule. If no signaling Mode is specified in a rule, all outpulsing defaults to DTMF mode.

1.7.3.4 OP MF Token Type: signaling Mode. OP MF indicates outpulsing is done in MF mode. Digits are sent using MF until an OP DTMF or OP TONE token is encountered, or until the end of the rule. MF digit strings must contain KP and ST start and end designators. (Note, if a signaling Mode is not specified, the output mode defaults to DTMF.)

1.7.3.5 OP MFCR2 Token Type: signaling Mode. OP MFCR2 sets the outpulse mode to MFCR2 and allocates an MFCR2 transceiver to the call chain. The outpulse mode remains in MFCR2 mode until the rule ends or an OP DTMF, OP TONE, or OP MF token is encountered. (Note, if a signaling Mode is not specified, the output mode defaults to DTMF.)

1.7.3.6 OP ANI Token Type: Digit Field. In DTMF and MF processing, OP ANI is used to outpulse the string stored in the originating number field of the SDS call record. Digits are sent in the outpulsing mode currently in force. The digit string was placed in this field using either an Outgoing Port Control command, an Incoming Port Control command, or an IP ANI [xx] token in an Inpulse Rule. In MFCR2 processing, OP ANI is used to outpulse the A-Number (Calling Party Number), which is stored in the originating number field of the SDS call record. The host can populate the ANI field using an Outgoing Port Control command or the field can be populated by a previous collection. End-of-digits tones (I-15) are appended to the digit string by the SDS if required. NOTE: MFCR2 digits stored as '0's are automatically converted to I-10 digits by the SDS during outpulsing. End-of-digits tones (I-15) are appended to the digit string by the SDS if required.

1.7.3.7 OP FIELD [xx] Token Type: Digit Field. In DTMF and MF processing, OP FIELD [xx] is used to outpulse the digit string stored in one of the call record fields. Digits are sent in the outpulsing mode currently in force. The value (1\x11to\x114) in the additional data field corresponds to the field in which the digits are stored. The digit string was placed in this field using either an Outgoing Port Control command, an Incoming Port Control command, or an IP FIELD [xx] token in an Inpulse Rule. In MFCR2 processing, OP FIELD is used to outpulse the B-Number (Called Party Number), which is stored in the digit field specified. The valid values for the digit field are 1 through 4. The host can populate the field using an Outgoing Port Control command or the field can be populated by a previous collection. End-of-digits tones (I-15) are appended to the digit string by the SDS if required. NOTES: MFCR2 digits stored as '0' are automatically converted to I-10 digits by the SDS during outpulsing, End-of-digits tones (I-15) are appended to the digit string by the SDS if required. Execution of the OP FIELD token initiates the MFCR2 outdialing process. The calling party category and A-Number should be populated prior to executing this token if these fields are required by the MFCR2 transaction dialog.

1.7.3.8 OP DIGIT [xx] Token Type: Digit Field. OP DIGIT [xx] causes a specific digit to be outpulsed; only one digit can be specified using this token. Digits are sent in the outpulsing mode currently in force. The digit to be sent is specified in the additional data field. In DTMF signaling mode, valid digits are 0 to 9, *, #, represented in the MIB by INTEGER values 0 to 9, 14, 15, respectively. In MF signaling mode, valid digits are 0-9, KP, ST, S1 (STP), S2 (ST2P),and S3 (ST3P), represented in the MIB by INTEGER values 0 to 9, 10, 11, 15, 14 and 13, respectively. In tone signaling mode, the valid digits are 0 to 8 and correspond to the tones listed in Table.

1.7.3.9 OP TONE Token Type: signaling Mode. OP TONE indicates outpulsing is done with in-band tones corresponding to digits from 0 to 8. Tones are presented for 60ms. Refer to Table\x112.3 for a listing of valid digits and their corresponding tones. Tone mode sending can be used to alert an attendant that a particular call type is being attached. (Note, if a signaling Mode is not specified, the output mode defaults to DTMF.)

1.7.3.10 OP CAT [xx] Token Type: Digit Field. The OP CAT token is used in MFCR2 processing to outpulse the Calling Party Category. The additional data field indicates the Calling Party Category, which applies to all signaling in the outpulse rule. Valid values for the data fields are 0 through 13 and 15. OP CAT should precede OP ANI and OP FIELD tokens in a rule.

NOTE: The Calling Party Category cannot be modified using an Outgoing Port Control ($69) command. Users must select another outpulse 1. *Source:* Summa Four VCO V4.0 Management Information Base rule to specify a different calling party service class.

1.7.3.11 WAIT SUP [xx] Token Type: Supervision Control. WAIT SUP [xx] token defines intermediate supervision during Outpulse Rule processing. When this token is executed, Outpulse Rule processing pauses while Answer Supervision Template processing begins for the specified template. If a supervision event is detected that successfully ends template processing, the WAIT SUP [xx] token is 'satisfied' and Outpulse Rule processing resumes. If a supervision event is detected that indicates a supervision error or call failure, rule processing is aborted. The additional data entry field specifies the supervision template; this value can be a number between 1 and 26 (answer = 25, wink = 26).

1.7.3.12 FINAL SUP [xx] Token Type: Supervision Control. The FINAL SUP [xx] token defines final supervision after Outpulse Rule processing ends. FINAL SUP [xx] tokens function as set-up tokens and can be defined anywhere within a rule. When this token is encountered, call processing stores the number of the Answer Supervision Template for later processing. Once Outpulse Rule processing ends, final supervision processing begins and continues until a supervision event is detected that ends template processing. Resources attached to the call, such as receivers, are released once Outpulse Rule processing ends; however, if the FINAL SUP [xx] template requires call progress tone detection, a CPA port remains allocated to the call. The additional data entry field specifies the supervision template; this value can be a number between 1 and 25 (answer = 25). NOTE: If no FINAL SUP [xx] token is defined in the rule, the system automatically uses the FINAL SUP A preconfigured template for final supervision processing. This template is described in Section.

1.7.3.13 TIME SUP [xx] Token Type: Supervision Control. TIME SUP [xx] works in conjunction with WAIT SUP [xx] and FINAL SUP [xx] tokens to perform grace or supervision timing. This token should immediately precede a WAIT SUP [xx] or FINAL SUP [xx] token in an Outpulse Rule. The additional data entry field of the TIME SUP [xx] token specifies the timer's duration (1 to 60) in seconds. The SDS response to the timer's expiration is indicated by the Answer Supervision Template identified by the accompanying WAIT SUP [xx] or FINAL SUP [xx] token. If the timer expires during template processing, the SDS performs the action specified by the condition token in the template's Time event field.

1.7.3.14 SEIZE Token Type: Supervision Control. SEIZE performs an outward seizure on an outgoing trunk. No seizure is performed during Outpulse Rule processing unless a SEIZE token is specified in a rule. A SEIZE token should precede any supervision tokens in an Outpulse Rule when an outward seizure is required. If the outgoing port is already seized, the token is ignored. Additional SEIZE tokens are ignored after the initial seizure. Seize effects for each card type are discussed in Appendix B.

1.7.3.15 WAIT TIME [xx] Token Type: Supervision Control. WAIT TIME [xx] causes rule processing to pause for up to 2.5 seconds. The value (1 to 10) in the additional data field corresponds to the number of 250ms intervals to wait; the valid range is 1 (250ms) to 10 (2.5 seconds).

1.7.3.16 RELEASE [resource type] Token Type: Resource Control. The valid resource types are: IPR, MRC, DRC, DTG, and CPA, represented in the MIB by the INTEGER values 16, 5, 4, 7, 22, respectively. The RELEASE token is used to remove the specified resource type from the call. Token processing releases the specified resource immediately if one exists in the call chain. This token is used to free up resources normally retained until the end of the rule processing.

1.7.3.17 ISDN RX [xx] Token Type: Supervision Control. ISDN RX [xx] specifies to use an ISDN Message Template during rule processing. You can use this token in either Inpulse or Outpulse Rules. The value in the data entry field specifies the number of the ISDN Message to be processed. Template number range from 1 to 96. The template you specify must be configured as a receive template and cannot have a message type of CHAINED. At the time of data entry, if the template number corresponds to a template that has been configured as a transmit template, an error message is displayed on the screen. In an Outpulse Rule, ISDN RX [xx] functions as a setup token for an ISDN SUP [xx]. Rule processing does not wait for the messages specified in the ISDN Message Template to be received; instead they determine the reporting of the messages and storage of IEs and data if that message is received over the D-channel. The receive template is used to store received D-channel message data in that call record and/or condition reporting of the received D-channel message to the host.

1.7.3.18 ISDN TX [xx] Token Type: Supervision Control. ISDN RX [xx] specifies which ISDN Message Template is used to construct an outgoing D-channel message. This token can be used in either Inpulse or Outpulse Rules. A transmitted D-channel message can be constructed by any combination of data from three sources: IEs specified in the message template Data stored in SDS fields (ANI, 1-4) IEs specified in an ISDN Port Control ($49) command When an ISDN TX [xx] is encountered, processing continues with the template specified in the additional data field. When template processing ends, rule processing continues with the token following ISDN TX [xx]. The value in the additional data entry field specifies the number of the ISDN Message Template to be processed. Template numbers range from 1 to 96, inclusive. The template specified must be configured as a transmit template and cannot have a message type of CHAINED. At the time of data entry, if the template number corresponds to a template that has been configured as a receive template, an error message is displayed on the screen.

1.7.3.19 ISDN SUP Token Type: Supervision Control. ISDN SUP [xx] specifies which ISDN Supervision Template is used during Outpulse Rule processing. Outpulse Rule processing waits for an event to occur when this token is processed. When an event or events are detected that satisfy the specified ISDN Supervision Template, Outpulse Rule processing continues with the token following the ISDN SUP [xx]. The additional data field specifies the number of the ISDN Supervision Template to use. Template numbers range from 1 to 24, inclusive.

1.7.3.20 GOTO RULE [xx] Token Type: Processing Control. GOTO RULE [xx] allows the construction of rules with more than 16 steps. When rule processing encounters a GOTO RULE [xx] token, it continues processing with the first token of the rule specified in the additional data field. Rule processing does not return to the original rule unless directed by a subsequent GOTO RULE [xx] token. This token can be used to create an endless loop by specifying the original rule number in the additional data field. The looping rule must specify one of the following tokens: WAIT SUP [xx], FINAL SUP [xx], WAIT TIME, OP DIGIT, OP ANI or OP FIELD. This feature should be used with caution. The value in the additional data field (1 to 30) corresponds to the rule number with which processing continues.

1.7.3.21 DO IRULE [xx] Token Type: Processing Control. DO IRULE [xx] instructs the SDS to perform processing for the Inpulse Rule specified, then return to this rule. In an Outpulse Rule, it allows Inpulse Rule processing functions such as digit collection and the presentation of voice prompts during an Outpulse Rule. This token works in much the same way as a subroutine call within a program. When rule processing encounters this token, processing continues with the first token of the Inpulse Rule specified in the additional data field. At the end of the specified rule, processing continues with the token following the DO\x11IRULE [xx] token in the original rule. The 'subroutine' rule must not call another rule containing a GOTO RULE [xx], DO IRULE [xx], or DO ORULE [xx] token. If it does, the call is processed as if the original DO IRULE token were a GOTO RULE.

1.7.3.22 DO ORULE [xx] Token Type: Processing Control. DO ORULE [xx] instructs the SDS to perform processing for the Outpulse Rule specified, then return to this rule. It allows the construction of Outpulse Rules with more than 16 steps (tokens). This token works in much the same was as a subroutine call within a program. When rule processing encounters this token, it continues processing with the first token of the Outpulse Rule specified in the additional data field. At the end of the specified rule, processing continues with the token following the DO\x11ORULE [xx] token in the original rule. The 'subroutine' rule must not call another rule containing a GOTO RULE [xx], DO IRULE [xx], or DO ORULE [xx] token. If it does, the call is processed as if the original DO ORULE token were a GOTO RULE.

1.7.3.23 NOHOST [xx] Token Type: Processing Control. NOHOST [xx] executes a specified Inpulse Rule following the expiration of the host setup timer. The SDS expects a response to an initial call report (incoming/outgoing Port Change of State or Inpulse Rule Complete report) within six seconds. If no host command is received in that time (setup timer expires), the SDS executes the Inpulse Rule indicated in the NOHOST [xx] token additional data field (rule number 1 - 30). If this token is not used, the SDS begins Reorder and Permanent Signal processing for the port involved when the host setup timer expires. NOTE: If the 'Disable Host Setup Timing' system feature flag is set to Y, NOHOST [xx] tokens are ignored during Inpulse Rule processing. This feature setting prevents the host setup timer from even being started. The Inpulse Rule specified in the NOHOST [xx] token can contain voice prompts directing the caller to go on hook or an alternate method of completing the call. If this 'backup' rule does not include a NOHOST [xx] token, the port is subject to the six-second setup timer once a $DA, $DB, or $DD report is sent to the host.

EBS Confidential

A.7.4 Answer Supervision Signaling Events[1]

| Event | Meaning |
|---|---|
| ***DIALTONE*** | Signal indicating the connected equipment is ready to receive digits. Combined 350Hz and 440Hz steady tone; event reported after approximately 0.75 seconds (requires CPA). |
| ***RINGBACK*** | Signal indicating a connection is established to the called equipment (although the call is not completed until answer supervision is received). Audible ringback is a combination of 440Hz and 480Hz with a cadence of 2 seconds on/4 seconds off. Ringback, including nonprecise or 'dirty' ringback, is reported after two cycles (requires CPA). |
| ***BUSY*** | Signal indicating the called equipment is in use. Combined 480Hz and 620Hz tone with a 0.5 seconds on/0.5 seconds off cadence; event reported after two (precise) or three (non-precise) cycles of this pattern (requires CPA). |
| ***REORDER*** | Signal indicating an error condition (all circuits busy, invalid destination, Permanent Signal Condition, etc.). Combined 480Hz and 620Hz tone with a 0.25 seconds on/0.25 seconds off cadence; event reported after two (precise) or three (non-precise) cycles of this pattern (requires CPA). |
| ***SITTONES*** | Signals providing additional information (special information tones). Signal frequencies and cadences depend on system applications. Standard tones are used for invalid dialed numbers and changed numbers. All SIT tones are treated the same; different SIT tone types are not distinguished (requires CPA). |
| ***RINGCESS*** | Silence detected immediately after presence of ringback is established. Event reported after 3 _ 6.5 seconds of silence once ringback is detected (requires CPA). |
| ***VOICEDET*** | Signal within the range of human speech. Signal must be within 200Hz to 3400Hz. Event reported after 0.25 _ 0.50 seconds (requires CPA). |

1. *Source:* Summa Four VCO V4.0 Management Information Base

| Event | Meaning |
|---|---|
| ***DIALTONE*** | Signal indicating the connected equipment is ready to receive digits. Combined 350Hz and 440Hz steady tone; event reported after approximately 0.75 seconds (requires CPA). |
| ***VOICECESS*** | Silence detected immediately after presence of voice is established. Event reported after 0.5 _ 1 seconds of silence once voice is detected (requires CPA). |
| ***WINK*** | Signal indicating the distant end is ready to receive outpulsed address digits from the originating central office. Signal is a brief off-hook/on-hook on an unanswered circuit (detected on T1, E+M and UTC ports only). |
| ***ANSWER*** | True answer supervision received from the distant end. Answer supervision varies based on link/trunk type (detected on all line/trunk types except for DID and Loop Start UTC). |
| ***TIME*** | Expiration of a timer on a port waiting for supervision. When an ANSBK or ANSREP token is specified, the timeout functions as a grace timer. When an ERROR or FAIL token is specified, the timeout indicates a supervision error or a call failure, respectively. Timer is started when template processing begins and ends when an event that satisfies the template is detected. The timers duration is specified in a preceding TIME SUP [xx] Outpulse Rule token. If no token is specified, timing is not performed (supported for all line/trunk types). |
| ***HOOKFLASH*** | Signal indicating a change in the status of the call (depending on application). Signal is a brief on-hook/off-hook (detected by SLIC and E+M only) |
| ***PAGERCUE*** | Signal presented by pager terminal equipment requesting the callback number (the callback number is then transmitted to the paged party). Signal is nominally a three to four 1400Hz tone burst at 100-125ms intervals (requires CPA). |
| ***ISUPTONE*** | Signal that indicates the detection of an ISDN user part continuity test tone. |
| ***ISUPCESS*** | Silence detected immediately after presence of an ISDN user part continuity test tone is established. |

A.7.5 Answer Supervision Condition Tokens[1]

1.7.5.1 REP Token: Supervision events marked with REP tokens are reported to the host when detected but do not end template processing. An Outgoing Port Change of State ($DA) or Incoming Port Change of State ($DB) report is generated containing one or two Change byte codes (10 or 80) and the appropriate Answer Supervision code for the event. Template processing continues until an event marked with another type of condition token is detected. REP tokens function the same for both intermediate and final supervision.

1.7.5.2 OK and OKREP Tokens: Supervision events marked with OK token end template processing when detected but are not reported to the host. When the event is detected during intermediate supervision, the WAIT SUP [xx] Outpulse Rule token is satisfied and rule processing continues. When the event is detected during final supervision (after an Outpulse Rule containing FINAL SUP [xx] token), template processing ends; however, the port is only considered answered if the OK token was assigned to the Answer event. Events assigned OKREP token are handled similarly to OK tokens, but also generate a report to the host.

1.7.5.3 ANSBK and ANSREP Tokens: Supervision events marked with ANSBK token end template processing and cause the system to answer back over the incoming port (assuming it is not already answered). A report is not sent to the host. When the event is detected and answerback sent, a WAIT SUP [xx] Outpulse Rule token is satisfied and rule processing continues. Because the outgoing port is considered answered when answerback is sent, the call automatically goes to stable state when Outpulse Rule processing completes (unless a FINAL SUP [xx] token is specified). Events assigned ANSREP token are handled similarly to ANSBK tokens, but also generate a report to the host.

1.7.5.4 ERROR Token: specifies that the signaling event should be treated as a supervision error and causes a rehunt for another outgoing port. The error count for the outgoing port is incremented, and an Outgoing Port Change of State ($DA) report is generated indicating a supervision error and whether a rehunt was performed. Template processing ends and the Outpulse Rule is aborted. The incoming port is left in *cp-setup* state if no rehunt is performed. If a rehunt is performed successfully, Outpulse Rule processing starts again on the new outgoing port.

1.7.5.5 FAIL Token: Specifies that the signaling event indicates a failed call. The outgoing port is removed from the call (no rehunt performed) and the incoming port is left in *cp-setup* state. An Outgoing Port Change of State ($DA) report is generated indicating a failed call attempt. Template processing ends when the event is detected and the Outpulse Rule is aborted.

1.7.5.6 QUIT Token: Specifies that the signaling event causes Outpulse Rule processing to abort. Template processing ends, and the outgoing port returns to the state it was in prior to Outpulse Rule processing (*cp-idle, cp-att, cp-setup, or cp-stab* - Section A.7.1 on page 129) but is not removed from the call. An Outgoing Port Change of State is generated indicating an Outpulse Rule failure. The Quit condition can occur any time during Outpulse Rule processing, even after the port is considered answered.

1. *Source:* Summa Four SDS Documentation V3.3, SDS System Administrator's Guide

TABLE II

Chapter 1: Excel Switching Engine Interface Specification

1.1 Chapter Overview

This chapter details the implementation of the various Switching Engine interfaces, including In-band Signalling, Connection, Media, and Object Servers (as described in the previous chapters) for the Excel LNX-2000 platforms. This chapter assumes that the reader is familiar with the LNX-2000 Host Command Interface. This chapter is organized into the following sections:

- In-band Signalling Server Interface Implementation
- Connection Server Interface Implementation
- Media Server Interface Implementation
- Object Server Implementation
- Operating Commands

1.2 In-band Signalling Interface Implementation

The In-band Signalling Interface implementation relies heavily upon programmability of LNX-2000's host interface for incoming and outgoing call setup. In most cases, the IBSS API message are a direct translation to and from LNX-2000 host messages.

As described in the IBSS Interface Specification, each IBSS API message contains a header in the form of an *IBSS_MSG_HDR_S* structure as given below:

```
typedef struct {
    DWORD            prim_id;
    SYS_LOG_DEV_ID   log_dev;
    DWORD            pass_thru;
    WORD             resp_cntrl;
} IBSS_MSG_HDR_S;
```

The *prim_id* is translated into an LNX-2000's host message as described in the following sections, *log_dev* is the device id which contains the logical span id and channel offset, *pass_thru* is held internally when a REQ message is issued and returned in the corresponding CNF or IND, *resp_cntrl* provides selective response control. In addition, IBSS API messages contain a number of parameters which must be translated into their LNX-2000 equivalents. The details of these translations are described in the following sections.

1.2.1 IBSS_OUTSEIZE_REQ

This primitive is translated into an OUTSEIZE CONTROL (0x2C) command in the following way.

```
typedef struct {
        BYTE        scen_id;
        BOOL        cpa_flag;
} IBSS_OUTSEIZE_INFO_S;
```

The *scen_id* is an identification of a configurable list of outseize control instructions, which will form a set of Information Control Blocks (ICBs), to control outgoing call setup. When the OUTSEIZE CONTROL command is successfully processed (return all) it is then passed back to the call-control entity as an IBSS_OUTSEIZE_CNF. If a failure occurs, an IBSS_ERROR_IND is returned with the appropriate error code.

1.2.2 IBSS_RELEASE_REQ

This primitive is translated into an RELEASE CHANNEL (0x08) command to initiate the release of a single channel or a connected pair of channels.

Upon the release completion of a channel, a CHANNEL RELEASED (0x49) message is returned, which is in turn passed to the call-control entity as an IBSS_RELEASE_CNF primitive. If a failure occurs, an IBSS_ERROR_IND is returned with the appropriate error code.

1.2.3 IBSS_ANSWER_REQ

This primitive is translated into an INSEIZE CONTROL (0x2B) which executes a pre-programmed Inpulse Rule containing a single ANSWER token.

If the INSEIZE CONTROL (0x2B) command returns an error (status byte other than 0x10) it will be translated in an IBSS_ERROR_IND. When an CALL PROCESSING EVENT (with ANSWER event - 0x20) report is received, it will be translated into a IBSS_ANSWER_CNF.

1.2.4 IBSS_WINK_REQ

This primitive is translated into a GENERATE CALL PROCESSING EVENT (0xBA) with event 'Wink 1 - 0x03'.

When the CALL PROCESSING EVENT message returns it will be translated into an IBSS_WINK_CNF if the status byte indicates success (0x10) or IBSS_ERROR_IND otherwise.

1.2.5 IBSS_FLASH_REQ

This primitive is translated into a GENERATE CALL PROCESSING EVENT (0xBA) (with Flash event - 0x02) command.

When the CALL PROCESSING EVENT message returns it will be translated into an IBSS_FLASH_CNF if the status byte indicates success (0x10) or IBSS_ERROR_IND otherwise.

1.2.6 IBSS_ERROR_IND

This primitive is returned when a message coming from the switch contains a status byte other than 0x10. The device id, which consists of logical span id and channel offset, is placed in the *log_dev* of the *IBSS_MSG_HDR_S*.

1.2.7 IBSS_DIGITS_IND

This primitive is returned whenever a CALL PROCESSING EVENT (0x2E) messages of event 'Digits - 0x02' is received by the switch engine during incoming signalling. If there are errors in any MF Digits or DTMF Digit reports (errors in the status field), and error indication will be returned. The channel id is placed in the *log_dev* of the *IBSS_MSG_HDR_S*.

1.2.8 IBSS_RELEASE_IND

This primitive is returned whenever a CHANNEL RELEASED (0x49) message is received by switch engine. The channel id is placed in the *log_dev* of the *IBSS_MSG_HDR_S*.

1.2.9 IBSS_ANSWER_IND

This primitive is returned whenever an CALL PROCESSING EVENT (0x2E) messages of event 'Answer - 0x20'. The channel id is placed in the *log_dev* of the *IBSS_MSG_HDR_S*.

1.2.10 IBSS_INSEIZE_IND

This primitive is returned when a REQUEST FOR SERVICE (0x40) message is received by switch engine. The channel id is placed in the *log_dev* of the *IBSS_MSG_HDR_S*.

1.2.11 IBSS_WINK_IND

This primitive is returned when CALL PROCESSING EVENT (0x2E) with event 'Wink 1' message is received. The channel id is placed in the *log_dev* of the *IBSS_MSG_HDR_S*.

1.2.12 IBSS_FLASH_IND

This primitive is returned when CALL PROCESSING EVENT (0x2E) with event 'Flash' message is received. The channel id is placed in the *log_dev* of the *IBSS_MSG_HDR_S*.

1.2.13 IBSS_CPA_IND

This primitive is returned when CALL PROGRESS ANALYSIS RESULT (0x34) message is received by switch engine. The CPA result is placed in *code* field of IBSS_CPA_CODE_S.

```
typedef struct {
        BYTE        code;
} IBSS_CPA_CODE_S;
```

The channel id is placed in the *log_dev* of the *IBSS_MSG_HDR_S.*

1.2.14 IBSS_OUTSEIZE_CNF

As described in the IBSS_OUTSEIZE_REQ section, when the OUTSEIZE CONTROL (0x2C) command is successfully processed (return all) it is then passed back to the call-control entity as an IBSS_OUTSEIZE_CNF. The channel id is placed in the *log_dev* of the *IBSS_MSG_HDR_S.*

1.2.15 IBSS_RELEASE_CNF

As described in the IBSS_RELEASE_REQ section, a CHANNEL RELEASED (0x49) report is returned, which is in turn passed to the call-control entity as an IBSS_RELEASE_CNF primitive. The channel id is placed in the *log_dev* field of the *IBSS_MSG_HDR_S.*

1.2.16 IBSS_ANSWER_CNF

As described in the IBSS_ANSWER_REQ section, when a CALL PROCESSING EVENT (0x2E) messages of event 'Answer - 0x20' is received it will be translated into a IBSS_ANSWER_CNF. The channel id is placed in the *log_dev* field of the *IBSS_MSG_HDR_S.*

1.2.17 IBSS_WINK_CNF

As described in the IBSS_WINK_REQ section, when a CALL PROCESSING EVENT (0x2E) messages of event 'Wink 1 - 0x03' is received it will be translated into a IBSS_WINK_CNF. The channel id is placed in the *log_dev* field of the *IBSS_MSG_HDR_S.*

1.2.18 IBSS_FLASH_CNF

As described in the IBSS_FLASH_REQ section, when a CALL PROCESSING EVENT (0x2E) messages of event 'Flash Detected - 0x23' is received it will be translated into an IBSS_FLASH_CNF. The channel id is placed in the *log_dev* field of the *IBSS_MSG_HDR_S.*

1.2.19 IBSS_INSEIZE_RSP

This primitive is translated into an INSEIZE CONTROL (0x2B) command. The structure is defined as follows:

```
typedef struct {
        BYTE        scen_id;
} IBSS_INSEIZE_RSP_INFO_S;
```

The *scen_id* is an identification of a configurable list of inseize control instructions, which will form a set of Information Control Blocks (ICBs), to control incoming call setup.

1.3 Connection Server Interface Implementation

The Connection Server Interface is implemented as a direct translation between CONS API primitives and LNX-2000 host messages to provide connection related as well as other maintenance services. In most cases, the mapping of CONS API and LNX-2000's host message will be one to one, however, there will be situations where a CONS API will generate a group of LNX messages to service the request. Furthermore, since CONS provides a very generic interface, there will be more than one LNX messages mapping to CONS API depending on the parameter values.

As described in the CONS Interface Specification each CONS API message contains a *CONS_MSG_S* in which all necessary header and message specific data is carried. The *CONS_MSG_S* is given below:

```
typedef struct {
        DWORD               prim_id;
        DWORD               pass_thru;
        DWORD               rep_cntrl;
        CONS_MSG_DATA_Umsg_data;
} CONS_MSG_S;
```

The *prim_id* field is directly translated into one or more of LNX-2000's host messages, the *pass_thru* field is maintained and returned by the Switching Engine with successive messages, the *rep_cntrl* provides selective message reply control. The translation of message specific data between CONS API formats and LNX-2000's host message formats can found in the following sections.

1.3.1 CONS_CONN_CMD

This primitive is translated into CONNECT (0x00) or CONNECT ONE-WAY (0x04) command depending on the value of *way* field in CONS_CONN_CMD_S. As described in the CONS API specification, a CONS_CONN_CMD contains the following data:

```
typedef struct {
        BYTE                way;
        SYS_LOG_DEV_ID      log_dev_a;
        SYS_LOG_DEV_ID      log_dev_b;
} CONS_CONN_CMD_S;
```

The *way* field is populated with L_WAY_ONE or L_WAY_TWO depending on the desired connection. *Log_dev_a* and *log_dev_b* contain the device id of the two channels to connect.

1.3.2 CONS_CONN_ACK

This primitive is returned when the CONNECT (0x00) or CONNECT ONE-WAY (0x04) command reply (return all) from a previous CONS_CONN_CMD returns a status of 0x10.

1.3.3 CONS_CONN_NACK

This primitive is returned for a semantic error or when the CONNECT (0x00) or CONNECT ONE-WAY (0x04) command reply (return all) from a previous CONS_CONN_CMD returns a status value other than 0x10.

1.3.4 CONS_CONF_CMD

This primitive is translated into CONFERENCE CREATE (0x4B), CONFERENCE DELETE REQUEST (0x4C), and/or CONNECT TO CONFERENCE (0x4E) depending on the values of CONS_CONF_CMD_S structure:

```
typedef struct {
        BYTE                cntrl;
        SYS_CONF_DEV_ID     conf_dev;
        BYTE                dev_cnt;
        struct {
                BYTE             action;
                BYTE             way;
                SYS_LOG_DEV_ID   log_dev;
        } dev_list[L_CONF_PARTY_MAX];
} CONS_CONF_CMD_S;
```

The *cntrl* field specifies whether to create or delete a conference circuit, and *dev_list* structure contains list of devices to connect to a conference point.

1.3.5 CONS_CONF_ACK

This primitive is returned when the CONFERENCE CREATE (0x4B), CONFERENCE DELETE REQUEST (0x4C), or CONNECT TO CONFERENCE (0x4E) command reply (return all) from a previous CONS_CONF_CMD with positive return code.

```
typedef struct {
        SYS_CONF_DEV_ID   conf_dev;
} CONS_CONF_ACK_S;
```

1.3.6 CONS_CONF_NACK

This primitive is returned when the CONFERENCE CREATE (0x4B), CONFERENCE DELETE REQUEST (0x4C), or CONNECT TO CONFERENCE (0x4E) command reply (return all) from a previous CONS_CONF_CMD with a status value other than 0x10.

1.3.7 CONS_DISC_CMD

This primitive is translated into a PARK CHANNEL (0xBF) command. As described in the CONS API specification, a CONS_DISC_CMD contains the following data:

```
typedef struct {
```

```
        SYS_LOG_DEV_ID          log_dev;
    } CONS_DISC_CMD_S;
```

*Log_dev* specifies the device to disconnect.

1.3.8 CONS_DISC_ACK

This primitive is returned when the PARK CHANNEL (0xBF) command reply (return all) from a previous CONS_DISC_CMD returns a status of 0x10.

1.3.9 CONS_DISC_NACK

This primitive is returned when the PARK CHANNEL (0xBF) command reply (return all) from a previous CONS_DISC_CMD returns a status value other than 0x10.

1.3.10 CONS_NAIL_UP_CONN_CMD

This primitive is translated into a CROSS CONNECT CHANNEL (0x1A) command. This command establishes a blind connection, and it must be tear down by CONS_NAIL_UP_DISC_CMD. It is assumed that the channels used in this command are in the out of service state.

```
    typedef struct {
        SYS_LOG_DEV_ID          log_dev_a;
        SYS_LOG_DEV_ID          log_dev_b;
    } CONS_NAIL_UP_CMD_S;
```

1.3.11 CONS_NAIL_UP_CONN_ACK

This primitive is returned when the CROSS CONNECT CHANNEL (0x1A) command reply (return all) from a previous CONS_NAIL_UP_DISC_CMD returns a status of 0x10.

1.3.12 CONS_NAIL_UP_CONN_NACK

This primitive is returned when the CROSS CONNECT CHANNEL (0x1A) command reply (return all) from a previous CONS_NAIL_UP_DISC_CMD returns a status value other than 0x10.

1.3.13 CONS_NAIL_UP_DISC_CMD

This primitive is translated into a CROSS DISCONNECT CHANNEL (0x1B) command.

```
    typedef struct {
        SYS_LOG_DEV_ID          log_dev;
    } CONS_NAIL_UP_DISC_CMD_S;
```

1.3.14 CONS_NAIL_UP_DISC_ACK

This primitive is returned when the CROSS DISCONNECT CHANNEL (0x1B) command reply (return all) from a previous CONS_NAIL_UP_DISC_CMD returns a status of 0x10.

1.3.15 CONS_NAIL_UP_DISC_NACK

This primitive is returned when the CROSS DISCONNECT CHANNEL (0x1B) command reply (return all) from a previous CONS_NAIL_UP_DISC_CMD returns a status value other than 0x10.

1.3.16 CONS_INS_STATE_IND

This primitive is returned when a DSO_STATUS_CHANGE (0x42) or BOARD_STATUS_REPORT (0xA6) message is received indicating that a channel (or a group of channels) is available to accept traffic. The channel id is placed in the *log_dev* field of the CONS_INS_STATE_IND_S. In the case of a BOARD_STATUS_REPORT, CONS_INS_STATE_IND messages will be sent for the full range of channels specified in the report.

```
typedef struct {
    DWORD            dev_cnt;
    SYS_LOG_DEV_ID   log_devs[L_MAX_LOG_DEV_CNT];
} CONS_INS_STATE_IND_S;
```

1.3.17 CONS_OOS_STATE_IND

This primitive is returned when a DSO_STATUS_CHANGE (0x42) or BOARD_STATUS_REPORT (0xA6) message is received indicating that a channel (or a group of channels) is NOT available to accept traffic. The channel id is placed in the *log_dev* field of the CONS_INS_STATE_IND_S. In the case of a BOARD_STATUS_REPORT, CONS_INS_STATE_IND messages will be sent for the full range of channels specified in the report.

```
typedef struct {
    DWORD            dev_cnt;
    SYS_LOG_DEV_ID   log_devs[L_MAX_LOG_DEV_CNT];
} CONS_OOS_STATE_IND_S;
```

1.4 Media Server Interface Implementation

The Media Server Interface is implemented as a direct translation between MEDS API primitives and LNX-2000 host messages to provide media related functionality.

As described in the MEDS Interface Specification, each MEDS API message contains a *MEDS_MSG_S* in which all necessary header and message specific data is carried. The *MEDS_MSG_S* is given below:

```
typedef struct {
        DWORD                   prim_id;
        SYS_LOG_DEV_ID          log_dev;
        DWORD                   pass_thru;
        WORD                    rep_cntrl;
        MEDS_MSG_DATA_U         msg_data;
} MEDS_MSG_S;
```

The *prim_id* field is directly translated into one or more of LNX-2000's host messages, the *log_dev* field specifies the device id, the *pass_thru* field is maintained and returned by the Switching Engine with successive messages, the *rep_cntrl* provides selective message reply control. The translation of message specific data between CONS API formats and LNX-2000's host message formats can found in the following sections.

1.4.1 MEDS_CONN_TONE_CMD

This primitive is translated into a CONNECT TONE PATTERN (0x2F) command.

```
typedef struct {
        BYTE        tone;
} MEDS_CONN_TONE_CMD_S;
```

1.4.2 MEDS_CONN_TONE_ACK

This primitive is returned when the CONNECT TONE PATTERN (0x2F) command reply (return all) from a previous MEDS_CONN_TONE_CMD contains status of 0x10.

1.4.3 MEDS_CONN_TONE_NACK

This primitive is returned for a semantic error or when the command reply CONNECT TONE PATTERN (0x2F) (return all) from a previous MEDS_CONN_TONE_CMD contains status other than 0x10.

1.4.4 MEDS_TONE_CMPLT_IND

This primitive will be returned when a tone plays to completion. Since MEDS_CONN_TONE_CMD_S does not have a field for the number of cycles to transmit, how are we going to set timer for tones.

1.4.5 MEDS_DISC_TONES_CMD

This primitive is translated into a DISCONNECT TONE PATTERN (0x1E) command used to terminate call progress tone transmission on a specified channel.

1.4.6 MEDS_DISC_TONES_ACK

This primitive is returned when the DISCONNECT TONE PATTERN (0x1E) command reply (return all) from a previous MEDS_DISC_TONE_CMD contains status of 0x10.

1.4.7 MEDS_DISC_TONES_NACK

This primitive is returned for a semantic error or when the DISCONNECT TONE PATTERN (0x1E) command reply (return all) from a previous MEDS_DISC_TONE_CMD contains status other than 0x10.

1.4.8 MEDS_COLL_DIG_CMD

This primitive is translated into a COLLECT DIGIT STRING (0xBC) command which instructs LNX-2000 to attach a digit receiver on a specified channel. The MEDS_COLL_DIG_CMD_S is defined as:

```
typedef struct {
        BYTE        tone_type;
        BYTE        mode;
        BYTE        dig_cnt;
        BYTE        trm_char_cnt;
        BYTE        trm_char_val[L_MAX_TERM_CHARS];
        BYTE        first_dig_tmr;
        BYTE        inter_dig_tmr;
        BYTE        complete_tmr;
} MEDS_COLL_DIG_CMD_S;
```

1.4.9 MEDS_COLL_DIG_ACK

This primitive is returned when the COLLECT DIGIT STRING (0xBC) command reply (return all) from a previous MEDS_COLL_DIG_CMD contains status of 0x10.

1.4.10 MEDS_COLL_DIG_NACK

This primitive is returned for a semantic error or when the COLLECT DIGIT STRING (0xBC) command reply (return all) from a previous MEDS_COLL_DIG_CMD contains status other than 0x10.

1.4.11 MEDS_COLL_DIGITS_IND

This primitive is returned when CALL PROCESSING EVENT (0x2E) report is received. The MEDS_COLL_DIG_IND_S *digits* field is populated from the Digit String field of the DTMF or MF DIGIT report and the *len* field is populated with the length of the collected string.

```
typedef struct {
        BYTE        digits[L_MAX_DIG_CNT];
        BYTE        len;
} MEDS_COLL_DIG_IND_S;
```

1.4.12 MEDS_COLL_ERR_IND

This primitive is returned when CALL PROCESSING EVENT (0x2E) report is received and the Status field indicates an error has occurred.

1.4.13 MEDS_STP_DIG_COLL_CMD

This primitive is translated into a DIGIT COLLECTION STOP (0xBE) command.

1.4.14 MEDS_STP_DIG_COLL_ACK

This primitive is returned when the DIGIT COLLECTION STOP (0xBE) command reply (return all) from a previous MEDS_STP_DIG_COLL_CMD contains status of 0x10.

1.4.15 MEDS_STP_DIG_COLL_NACK

This primitive is returned for a semantic error or when the DIGIT COLLECTION STOP (0xBE) command reply (return all) from a previous MEDS_STP_DIG_COLL_CMD contains status value other than 0x10.

1.4.16 MEDS_OUTP_DIG_CMD

This primitive is translated into an OUTPULSE DIGITS (0x20) command. This command causes execution of a pre-programmed rule that outpulses either DTMF or MF digits. The OUTPULSE DIGITS (0x20) command is populated from fields in the MEDS_OUTP_DIG_CMD_S. Depending upon *tone_type*, a "tone-specific" rule will be executed within the switch. The *digits* field will be copied to an Outpulse Control Segment. NOTE: The Outpulse Rule will not execute any out-of-band signalling (A/B bit state changes), it will only outpulse digits.

1.4.1 MEDS_OUTP_DIG_ACK

This primitive is returned when the OUTPULSE DIGITS (0x20) command reply (return all) from a previous MEDS_OUTP_DIG_CMD contains status of 0x10.

1.4.2 MEDS_OUTP_DIG_NACK

This primitive is returned for a semantic error or when the OUTPULSE DIGITS (0x20) command reply (return all) from a previous MEDS_OUTP_DIG_CMD contains status value other than 0x10.

1.4.3 MEDS_OUTP_CMPLT_IND

This primitive will be returned when an CALL PROCESSING EVENT (0x2E) (Outpulsing Complete) is returned for a channel issued a previous MEDS_OUTP_DIG_CMD.

1.4.4 MEDS_CONN_ANN_CMD

The primitive is translated into a RECORDED ANNOUNCEMENT CONNECT (0x55) command.

```
typedef struct {
        WORD        ann_cnt;
        WORD        ann_ids[L_MAX_ANN];
} MEDS_CONN_ANN_CMD_S;
```

1.4.5 MEDS_CONN_ANN_ACK

This primitive is returned when the RECORDED ANNOUNCEMENT CONNECT (0x55) command reply (return all) from a previous MEDS_CONN_ANN_CMD contains status of 0x10.

1.4.6 MEDS_CONN_ANN_NACK

This primitive is returned for a semantic error or when the RECORDED ANNOUNCEMENT CONNECT (0x55) command reply (return all) from a previous MEDS_CONN_ANN_CMD contains status value other than 0x10.

1.4.7 MEDS_ANN_CMPLT_IND

This primitive is returned when a CALL PROCESSING EVENT (0x2E) (Recorded Announcement Completed) report is received on a channel previous sent a MEDS_CONN_ANN_CMD.

1.4.8 MEDS_DISC_ANN_CMD

The primitive is translated into a RECORDED ANNOUNCEMENT DISCONNECT (0x56) command.

1.4.9 MEDS_DISC_ANN_ACK

This primitive is returned when the RECORDED ANNOUNCEMENT DISCONNECT (0x56) command reply (return all) from a previous MEDS_DISC_ANN_CMD contains status of 0x10.

1.4.10 MEDS_DISC_ANN_NACK

This primitive is returned for a semantic error or when the RECORDED ANNOUNCEMENT DISCONNECT (0x56) command reply (return all) from a previous MEDS_DISC_ANN_CMD contains status value other than 0x10.

1.5 Object Server Implementation

This section describes the implementation of the Managed Object Server functionality within the Excel LNX-2000 Switching Engine. The Managed Object Server or Object Server for short, provides all necessary logic for configuration, initialization, and maintenance of the Excel LNX-2000 switching matrix.

1.5.1 General Functionality

Figure 1.5.1-1 shows the message flows between various AccessSERVICES entities participating in the configuration of a Excel LNX-2000 switch. When a configuration command is typed into the MML command interpreter, it parses the string, encodes it into an Object Server Request PDU, and passes it down to an appropriate managed object server (in this case the Excel switching engine) for processing. The Excel switch engine maintains a mapping between the command parameters and the LNX host messages. Based on that mapping, Excel switch engine populates the corresponding LNX message and sends it down to the switch for processing. When a reply or an indication is received from LNX-2000, switch engine build a Reply PDU and send it back to MML.

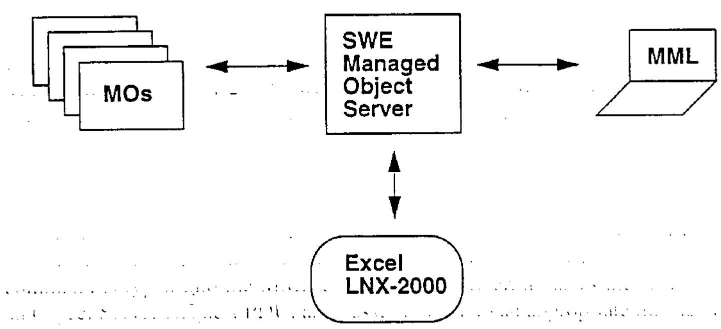

Figure 1.5.1-1 MML command processing

1.5.2 MML Command Processing Scenario
This is a typical scenario for processing of an MML command for configuration and maintenance of LNX-2000 switch:
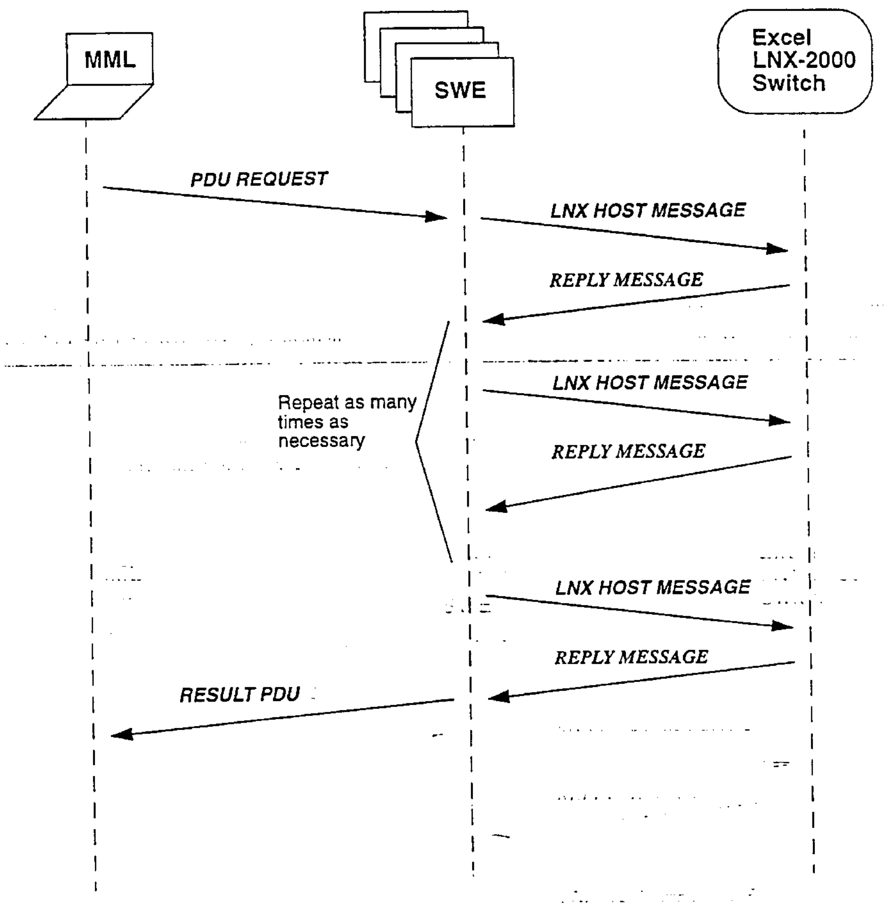

1.5.3 Managed Object (MO) Operations

For most of system resources and service entities in Excel LNX-2000 switch, a Managed Object has been defined. Along with the MOs, we define operations that can be performed on that particular MO. For most MOs, there is a generic set of operations which consists of: ADD, DELETE, MODIFY and DISPLAY. In following sections, we will show the mapping of MO operations and their corresponding LNX-2000 host messages.

Table 1-1 BOARD MO

| MO Operation | LNX-2000 Command |
|---|---|
| ADD-BOARD | Board Population Query (0x07) - check for consistency |
| DELETE-BOARD | None |
| MODIFY-BOARD | Service State Configure (0x0A) - bring boards in/out of service<br>Fault Log Query (0x86) - return faults and clear log |
| DISPLAY-BOARD | Board Status Query (0x83) - generates Board Status Report from the switch<br>Board Population Query (0x07) - when wild card is given as the slot number |

Table 1-2 SPAN MO

| MO Operation | LNX-2000 Command |
|---|---|
| ADD-SPAN | T1 Span Format Configure (0xA9) - Frame & Linecode<br>E1 Span Format Configure (0xD8) |
| DELETE-SPAN | None |
| MODIFY-SPAN | Service State Configure (0x0A) - Bring spans in/out of service<br>T1 Span Format Configure (0xA9) - Frame & Linecode<br>E1 Span Format Configure (0xD8) |
| DISPLAY-SPAN | T1 Span Format Query (0x85) - get framing & line coding information<br>E1 Span Format Query (0xDB) - get framing & line coding information<br>Span Format Configure (0x84) - get the rest |

Table 1-3 CHANNEL MO

| MO Operation | LNX-2000 Command |
|---|---|
| DISPLAY-CHAN | Channel Parameter Query (0x80) - receive channel configuration |

Table 1-4 DSPSIMM MO

| MO Operation | LNX-2000 Command |
|---|---|
| ADD-DSPSIMM | Service State Configure (0x0A) - take C31 SIMM out of service so that it can be configure |
| DELETE-DSPSIMM | None |
| MODIFY-DSPSIMM | Service State Configure (0x0A) |
| DISPLAY-DSPSIMM | None |

Table 1-5 DSP MO

| MO Operation | LNX-2000 Command |
|---|---|
| MODIFY-DSP | MFDSP SIMM Configure (0xC0) |
| DISPLAY-DSP | None |

Table 1-6 CPAC MO

| MO Operation | LNX-2000 Command |
|---|---|
| MODIFY-CPAC | Call Progress Analysis Class Configure (0xB3) |
| DISPLAY-CPAC | Call Progress Analysis Configuration Query (0x8A) |

Table 1-7 CPAP MO

| MO Operation | LNX-2000 Command |
|---|---|
| ADD-CPAP | Call Progress Analysis Pattern Configure (0x8A) |

Table 1-8 SYSLOG MO

| MO Operation | LNX-2000 Command |
|---|---|
| DISPLAY-SYSLOG | System Log Query (0x82) |

Table 1-9 ORULE MO

| MO Operation | LNX-2000 Command |
|---|---|
| ADD-ORULE | None |
| MODIFY-ORULE | None |
| DELETE-ORULE | None |

Table 1-10 IRULE MO

| MO Operation | LNX-2000 Command |
|---|---|
| ADD-IRULE | None |
| MODIFY-IRULE | None |
| DELETE-IRULE | None |

Table 1-11 SIGTMPL MO

| MO Operation | LNX-2000 Command |
|---|---|
| ADD-SIGTMPL | None |
| DISPLAY-SIGTMPL | None |
| DELETE-SIGTMPL | None |

1.6 Operating Commands

This section contains the Excel LNX-2000 Switching Engine specific MML commands.

1.6.1 ADD-BOARD

NAME

*ADD-BOARD* Add a board to the system

DESCRIPTION

*ADD-BOARD* Defines the board added to the system. The system automatically enables the board, if it is present, activating the board for call handling.

SYNOPSIS

*ADD-BOARD:SLOT=slot#,TYPE=boardtype;*

*slot#* Slot number where the card is situated (0x0-0x13, 0x20-0x21).

*boardtype* One of the recognized board types: ST1LC, SE1LC, MFDSP, PRI24, SE1LC256, E1LC128, M20LC, MTX-CPU, PWRSUP, FANTRAY, BACKPLANE

EXAMPLES

MML_TH>ADD-BOARD:SLOT=2,TYPE=ST1LC;

ERROR MESSAGES

*SLOT out of range*

*Invalid TYPE specified*

*BOARD already exists*

*Missing SLOT parameter*

*Missing TYPE parameter*

1.6.2 DELETE-BOARD

NAME

*DELETE-BOARD* Delete a board from the system

DESCRIPTION

*DELETE-BOARD* Removes definition of a board from the system. A card must be Out-Of-Service to be deleted. Prior to deletion all span on the board must be removed from any resource group that they belong to.

SYNOPSIS

*DELETE-BOARD:SLOT=*slot#*;*

*slot#* Slot number on the level (1 to 21).

EXAMPLES

MML_TH>DELETE-LC:SLOT=2;

ERROR MESSAGES

*Missing SLOT parameter*

*BOARD does not exist*

*BOARD contains valid spans*

*Invalid SLOT parameter*

1.6.3 MODIFY-BOARD

NAME

*MODIFY-BOARD* Modify a board status

DESCRIPTION

*MODIFY-BOARD* Modifies a status. Card location is specified by its R-L-S (rack-level-slot) address. The card should be physically installed in order to be put in *ACTIVE* or *MAINTENANCE* status.

SYNOPSIS

*MODIFY-BOARD:SLOT*=slot#,*SVCST*=newstatus;

*slot#* Slot number on the level (1 to 21).

*newstatus* New card status. Can be one of the following list:

*INS (IN-SERVICE)* - channels on this card can be involved in active calls and can be allocated for new calls.

*OOS (OUT-OF-SERVICE)* - No channels on this card can be involved in active calls or allocated to new calls. Any active calls into channels on this card are torn down.

EXAMPLES

MML_TH>MODIFY-BOARD:SLOT=2,SVCST=INS;

ERROR MESSAGES

*SLOT out of range*

*Invalid STATUS specified*

*BOARD does not exists*

*Missing SLOT parameter*

*Missing SVCSTparameter*

1.6.4 DISPLAY-BOARD

NAME

*DISPLAY-BOARD* Display current board information

DESCRIPTION

*DISPLAY-BOARD* Displays information about the specified board including its location in the system, its type, and its management and hardware state.

SYNOPSIS

*DISPLAY-BOARD:SLOT*=slot#;

*slot#* Slot number on the level (1 to 21).

Configuration is displayed in the following format:

| SLOT | TYPE | SVCST | CNFTST | HDWR | FLTLG |
|---|---|---|---|---|---|
| 0 | ST1LC192 | OOS | RAM Failure | FAIL | Board is Bad |
| 1 | MFDSP | INS | Passed | OK | |
| 32 | MTX-CPU | INS | Passed | OK | |
| 33 | MTX-CPU | INS | Passed | OK | |

EXAMPLES

MML_TH>DISPLAY-BOARD:SLOT=2;

MML_TH>DISPLAY-BOARD:SLOT=*;

ERROR MESSAGES

*Missing SLOT parameter*

*Invalid SLOT number*

*BOARD does not exist*

1.6.5 ADD-SPAN

NAME

| | |
|---|---|
| *ADD-SPAN* | Add a T1 or an E1 span to the system. |

DESCRIPTION

| | |
|---|---|
| *ADD-SPAN* | Defines a particular span to the system, which can be a T1 span or an E1 span. The board to which the subunit is being added must be previously added. |

SYNOPSIS

*ADD-SPAN:,SLOT*=slot#,*OFFSET*=offset#,*FRAME*=frametype;

| | |
|---|---|
| *slot#* | Slot number on the level (1 to 21). |
| *offset#* | Span offset number on the board (1 to 8). |
| *frametype* | Frame encoding format of the span (B8ZS, D4, Clear Channel). |

EXAMPLES

MML_TH>ADD-SPAN:SLOT=2,OFFSET=0,FRAME=D4F-B78ZS;

MML_TH>ADD-SPAN:SLOT=2,OFFSET=1,FRAME=D4F-B78Z-CLR;

ERROR MESSAGES

*Missing SLOT parameter*

*Missing OFFSET parameter*

*SLOT out of range; must be 0-21*

*span OFFSET out of range; must be 0-7*

*BOARD does not exist*

1.6.6 DELETE-SPAN

NAME

*DELETE-SPAN* Delete a span from a particular board on the system.

DESCRIPTION

*DELETE-SPAN* Delete the definition of a span from the system. The command is only accepted if the span is in the OOS state.

SYNOPSIS

*DELETE-SPAN:SLOT*=slot#,*OFFSET*=offset#;

*slot#* Slot number on the level (1 to 21).

*offset#* Span offset number on the board (1 to 8).

EXAMPLES

```
MML_TH>DELETE-SPAN:SLOT=2,OFFSET=0;
```

ERROR MESSAGES

*Missing SLOT parameter*

*Missing OFFSET parameter*

*SLOT out of range; must be 0-21*

*span OFFSET out of range; must be 0-7*

*SPAN does not exist*

*BOARD does not exist*

1.6.7 MODIFY-SPAN

NAME

| | |
|---|---|
| *MODIFY-SPAN* | Modify span from a particular board on the system. |

DESCRIPTION

| | |
|---|---|
| *MODIFY-SPAN* | Modify the attributes of a span in the system such as its linecoding, framing, or maintenance status. The board to which the subunit is being added must be previously added. |

SYNOPSIS

*MODIFY-SPAN:,SLOT*=slot#,*OFFSET*=offset#,*SVCST*=status,*FRAME*=frametype;

| | |
|---|---|
| *slot#* | Slot number on the level (1 to 21). |
| *offset#* | Span offset number on the board (1 to 8). |
| *status* | Maintenance status of the span (INS I OOS). |
| *frametype* | Frame encoding format of the span (B8ZS, D4, Clear Channel). |

EXAMPLES

MML_TH>MODIFY-SPAN:SLOT=2,OFFSET=0,SVCST=INS;

MML_TH>MODIFY-SPAN:SLOT=2,OFFSET=0,SVCST=INS,FRAME=D4F-B78Z-CLR;

ERROR MESSAGES

*Missing SLOT parameter*

*Missing OFFSET parameter*

*SLOT out of range; must be 0-21*

*span OFFSET out of range; must be 0-7*

*BOARD does not exist*

1.6.8 DISPLAY-SPAN

NAME

*DISPLAY-SPAN* Display a span (or a group of spans) from a particular board on the system.

DESCRIPTION

*DISPLAY-SPAN* Displays information about the described span, including its location in the system, its management staus, as well as span format.

SYNOPSIS

*DISPLAY-SPAN:SLOT*=slot#,*OFFSET*=offset#;

*slot#* Slot number on the level (1 to 21).

*offset#* Span offset number on the board (1 to 8).

Configuration is displayed in the following format:

| SLOT | OFFSET | FRAMING | LINECODE | SVCST | ALRMST |
|---|---|---|---|---|---|
| 3 | 0 | ESF | B8ZS | INS | Rcv RED |

EXAMPLES

MML_TH>DISPLAY-SPAN:SLOT=2,OFFSET=0;

ERROR MESSAGES

*Missing SLOT parameter*

*Missing OFFSET parameter*

*SLOT out of range; must be 0-21*

*span OFFSET out of range; must be 0-7*

*BOARD does not exist*

1.6.9 DISPLAY-CHAN

NAME

*DISPLAY-CHAN* Display current channel(s) information of a span.

DESCRIPTION

*DISPLAY-CHAN* Displays location information, the group that the device belongs to, the index within the group, and the signalling type employed. If "*" is entered as the circuit, information about all the circuits in the given subunit is displayed.

SYNOPSIS

*DISPLAY-CHAN:SLOT*=slot#,*OFFSET*=offset#,*CHAN*=chan#,
*ENDCHAN*=endchan#;

| | |
|---|---|
| *slot#* | Slot number on the level (1 to 21). |
| *offset#* | Span offset number on the board (1 to 8). |
| *chan#* | Beginning channel number within a span. |
| *endchan#* | Ending channel number within a span (optional). |

Configuration is displayed in the following format:

*Slot<slot number>, Offset<offset number>, Chan<channel number>:*
*STATUS=<device status>*
*MNTC=<maintenance status>*
*HDWR=<hardware status>*

EXAMPLES

```
MML_TH>DISPLAY-CHAN:SLOT=2,OFFSET=0,CHAN=5;
MML_TH>DISPLAY-CHAN:SLOT=2,OFFSET=0,CHAN=0,ENDCHAN=23;
```

ERROR MESSAGES

*Missing SLOT parameter*

*Missing OFFSET parameter*

*SLOT out of range; must be 0-21*

*span OFFSET out of range; must be 0-7*

*BOARD does not exist*

1.6.10 ADD-DSPSIMM

NAME

*ADD-DSPSIMM* Add a DSP SIMM to the system.

DESCRIPTION

*ADD-DSPSIMM* Introduce a new DSP SIMM to an existing MFDSP board. When a C31 simm is added, it must be taken out-of-service in order to configure it. Use *MODIFY-DSPSIMM* command to bring the card spans on line and make it available for the system to use. VRAS SIMM does not need to be configured since it only serves one purpose.

SYNOPSIS

*ADD-DSPSIMM:SLOT*=slot#, *SIMM*=simm#, *TYPE*=simmtype;

| | |
|---|---|
| *slot#* | Slot number of the board (1 to 21). |
| *simm#* | Location of DSP SIMM on the MFDSP board (0-3). |
| *simmtype* | DSP simm type. Can be either C31 or VRAS. |

EXAMPLES

```
MML_TH>ADD-DSPSIMM:SLOT=0,SIMM=0,TYPE=C31;
MML_TH>ADD-DSPSIMM:SLOT=0,SIMM=0,TYPE=VRAS;
```

ERROR MESSAGES

*Missing SLOT parameter*

*Missing SIMM parameter*

*SLOT out of range; must be 0-21*

*SIMM out of range; must be 0-3*

*BOARD does not exist*

*invalid SIMM type; must be C31 or VRAS*

1.6.11 DELETE-DSPSIMM

NAME

*DELETE-DSPSIMM* Delete a DSP SIMM from the system.

DESCRIPTION

*DELETE-DSPSIMM* Removes a DSP SIMM from the system. The simm must be out-of-service to be deleted. If the simm is C31 type, then prior to deletion, all the DSPs on the simm must be removed.

SYNOPSIS

*DELETE-DSPSIMM:SLOT*=slot#, *SIMM*=simm#;

*slot#* Slot number on the level (1 to 21).

*simm#* Location of DSP SIMM on the MFDSP board (0-3).

EXAMPLES

```
MML_TH>DELETE-DSPSIMM:SLOT=0,SIMM=2;
```

ERROR MESSAGES

*Missing SLOT parameter*

*Missing SIMM parameter*

*SLOT out of range; must be 0-21*

*SIMM out of range; must be 0-3*

*BOARD does not exist*

1.6.12 MODIFY-DSPSIMM

NAME

*MODIFY-DSPSIMM* Modify a DSP SIMM status.

DESCRIPTION

*MODIFY-DSPSIMM* Modifies a DSP SIMM status. SIMM location is specified by its slot and simm number. The simm should be physically installed in order to be put in *INS* or *OOS* status.

SYNOPSIS

*MODIFY-DSPSIMM:SLOT*=slot#,*SIMM*=simm#;

| | |
|---|---|
| *slot#* | Slot number on the level (1 to 21). |
| *simm#* | Location of DSP SIMM on the MFDSP board (0-3). |
| *status* | Maintenance status of the simm (INS I OOS). |

EXAMPLES

MML_TH>MODIFY-DSPSIMM:SLOT=0,SIMM=0,SVCST=INS;

ERROR MESSAGES

*Missing SLOT parameter*

*Missing SIMM parameter*

*SLOT out of range; must be 0-21*

*SIMM out of range; must be 0-3*

*BOARD does not exist*

1.6.13 DISPLAY-DSPSIMM

NAME

*DISPLAY-DSPSIMM* Display current resourcible card information

DESCRIPTION

*DISPLAY-DSPSIMM* Display DSP SIMM information on a MFDSP BOARD

SYNOPSIS

*DISPLAY-DSPSIMM:SLOT*=slot#,*SIMM*=simm#;

*slot#* Slot number on the level (1 to 21).

*simm#* Location of DSP SIMM on the MFDSP board (0-3).

Configuration is displayed in the following format:

| SLOT | SIMM | SVCST | TYPE |
|---|---|---|---|
| 3 | 0 | OOS | VRA |
| 3 | 1 | INS | C31 |
| 3 | 2 | INS | C31 |
| 3 | 3 | INS | C31 |

EXAMPLES

MML_TH>DISPLAY-DSPSIMM:SLOT=0,SIMM=1;

ERROR MESSAGES

*Missing SLOT parameter*

*Missing SIMM parameter*

*SLOT out of range; must be 0-21*

*SIMM out of range; must be 0-3*

*BOARD does not exist*

1.6.14 MODIFY-DSP

NAME

*MODIFY-DSP* Modify a digital signal processor (DSP) configuration.

DESCRIPTION

*MODIFY-DSP* Modify the funtionality of a DSP or (a group of DSPs) on a particular DSP SIMM. The SIMM must be C31 type. In order to modify DSP funtionality, the SIMM must be taken out-of-service first.

SYNOPSIS

*MODIFY-DSP:SLOT*=slot#,*SIMM*=simm#,*DSP*=dsp#, *FUNC=function;*

| | |
|---|---|
| *slot#* | Slot number on the level (1 to 21). |
| *simm#* | Location of DSP SIMM on the MFDSP board (0-3). |
| *dsp#* | Location of DSP on the SIMM board (0-3). |
| *function* | DSP function types such as tone generation, tone reception, conferencing, etc. |

EXAMPLES

MML_TH>MODIFY-DSP:SLOT=0,SIMM=0,FUNC=DTMF-RCV;

MML_TH>MODIFY-DSP:SLOT=0,SIMM=1,FUNC=CONF;

ERROR MESSAGES

*Missing SLOT parameter*

*Missing SIMM parameter*

*SLOT out of range; must be 0-21*

*SIMM out of range; must be 0-3*

*invalid SIMM type; must be C31*

*BOARD does not exist*

1.6.15 DISPLAY-DSP

NAME

*DISPLAY-DSP* Display a DSP (or a group of DSPs) configuration.

DESCRIPTION

*DISPLAY-DSP* Displays DSP function configuration. DSP location is specified by its SIMM and DSP number.

SYNOPSIS

*DISPLAY-DSP:SLOT*=slot#,*SIMM*=simm#,*DSP*=dsp#,;

*slot#* Slot number on the level (1 to 21).

*simm#* Location of DSP SIMM on the MFDSP board (0-3).

*dsp#* Location of DSP on the SIMM board (0-3).

Configuration is displayed in the following format:

| SLOT | SIMM | DSP | FUNC |
|---|---|---|---|
| 3 | 1 | 0 | DTMF-RCV |
| 3 | 1 | 1 | DTMF-GEN |
| 3 | 1 | 2 | CPA |
| 3 | 1 | 3 | CONF |

ERROR MESSAGES

*Missing SLOT parameter*

*Missing SIMM parameter*

*SLOT out of range; must be 0-21*

*SIMM out of range; must be 0-3*

*BOARD does not exist*

1.6.16 ADD-IRULE, ADD-ORULE

NAME

| | |
|---|---|
| *ADD-IRULE* | Add an inpulse rule to the system |
| *ADD-ORULE* | Add an outpulse rule to the system |

DESCRIPTION

Introduces a new Inpulse or Outpulse Rule to the system.

SYNOPSIS

*ADD-IRULE:ID*=id#,*INSTR1*=instr1,*DATA1*=data1, ...,
*INSTR20*=instr20,*DATA20*=data20;
*ADD-ORULE:ID*=id#,*INSTR1*=instr1,*DATA1*=data1, ...,
*INSTR20*=instr20,*DATA20*=data20;

| | |
|---|---|
| ***instr#*** | Inpulse or Outpulse instruction number (0 to 15) |
| ***data#*** | A single inpulse rule instruction, which consists of an operator token and an argument. For the list of instructions Section 1.7.2 on page 82 and Section 1.7.3 on page 87. |

EXAMPLES

MML_TH>ADD-IRULE: RULE=3, TOKEN1=DTMF, TOKEN2=TONE ENAB 3, TOKEN3=TONE FDIG 1, TOKEN4=DIGITS 10, TOKEN5=IP FIELD 1;

MML_TH>ADD-ORULE: RULE=2, TOKEN1=SEIZE, TOKEN2=TIME SUP 5, TOKEN3=WAIT SUP 1, TOKEN4=OP DTMF, TOKEN5=OP FIELD 1;

ERROR MESSAGES

*Inpulse rule already exists*

*Outpulse rule already exists*

*Inpulse rule is empty*

*Outpulse rule is empty*

*Invalid position*

*Exceeded maximum number of instructions*

*Illegal token value*

1.6.17 DELETE-IRULE, DELETE-ORULE

NAME

*DELETE-IRULE* Delete an inpulse rule from the system
*DELETE-ORULE* Delete an outpulse rule from the system

DESCRIPTION

Removes an Inpulse or Outpulse Rule from the system.

SYNOPSIS

*DELETE-IRULE: RULE*=rule#;
*DELETE-ORULE: RULE*=rule#;

*rule#* Inpulse or Outpulse Rule number (1 to 30)

EXAMPLES

MML_TH>DELETE-IRULE: RULE=3;
MML_TH>DELETE-ORULE: RULE=5;

ERROR MESSAGES

*Inpulse rule is empty*

*Invalid position.*

1.6.18 MODIFY-IRULE, MODIFY-ORULE

NAME

*MODIFY-IRULE* Modify an inpulse rule contents

*MODIFY-ORULE* Modify an outpulse rule contents

DESCRIPTION

Modifies an Inpulse or Outpulse Rule contents. Each token mentioned in the command replaces the corresponding instruction in the rule. Other instructions in the rule remain intact.

SYNOPSIS

*MODIFY-IRULE: RULE*=rule#, *TOKEN1*=token, *TOKEN2*=token, ..., *TOKEN16*=token;

*MODIFY-ORULE: RULE*=rule#, *TOKEN1*=token, *TOKEN2*=token, ..., *TOKEN16*=token;

*rule#* Inpulse or Outpulse Rule number (1 to 30)

*token* A single inpulse rule instruction, which consists of an operator token and an argument. For the list of instructions Section 1.7.2 on page 82 and Section 1.7.3 on page 87. Use NULL token to delete an individual instruction.

EXAMPLES

MML_TH>MODIFY-IRULE: RULE=3, TOKEN5=IP FIELD 2; -- tokens other than 5 remain unchanged MML_TH>MODIFY-ORULE: RULE=2, TOKEN3=WAIT SUP W, TOKEN6=TIME SUP 30, TOKEN7= FINAL SUP A; -- tokens 1, 2, 4, and 5 are not changed

ERROR MESSAGES

*Inpulse rule already exists*

*Outpulse rule already exists*

*Inpulse rule is empty*

*Outpulse rule is empty*

*Invalid position*

*Exceeded maximum number of instructions*

*Illegal token value*

1.6.19 DISPLAY-IRULE, DISPLAY-ORULE

NAME

| | |
|---|---|
| *DISPLAY-IRULE* | Display an inpulse rule |
| *DISPLAY-ORULE* | Display an outpulse rule |

DESCRIPTION

Shows contents of an Inpulse or Outpulse Rule.

SYNOPSIS

*DISPLAY-IRULE: RULE*=rule#;
*DISPLAY-ORULE: RULE*=rule#;

| | |
|---|---|
| ***rule#*** | Inpulse or Outpulse Rule number (1 to 30) |

Rule is displayed in the following format (empty instructions are represented by NULL) :

<rule type> rule <rule#>:

TOKEN1 = <rule instruction>

TOKEN2 = <rule instruction>

...

TOKEN16 = <rule instruction>

OWNER = <configuration entity name>

EXAMPLES

MML_TH>DISPLAY-IRULE: RULE=3;

MML_TH>DISPLAY-ORULE: RULE=5;

ERROR MESSAGES

*Inpulse rule is empty*

*Outpulse rule is empty*

*Invalid position*

What is claimed is:

1. A method of controlling a plurality of different high speed digital telecommunications switches, each of which responds to a different set of native messages, with a single messaging protocol, said method comprising:

a) determining a global set of switch functions to be controlled;

b) categorizing at least some switch functions into first subsets of the global set;

c) defining a set of generic messages for each first subset of switch functions;

d) providing a generic message interpreter of each different switch of the plurality of different high speed digital telecommunications switches to interpret generic messages and native switch messages;

e) coupling a first generic message interpreter to a first respective switch; and f) coupling the first generic message interpreter to a source of generic messages, wherein messages from the source of generic messages are interpreted by the first generic message interpreter to control the first switch with native switch messages.

2. A method according to claim 1, wherein:

the first subsets of the global set include separate subsets for inband signalling, connection services, and media services.

3. A method according to claim 1, further comprising:

g) categorizing at least some switch functions into a second subset of the global set; and h) defining a superset of messages for each second subset.

4. A method according to claim 3, wherein:

the first subsets of the global set include inband signalling, connection services, and media services, and the second subset of the global set includes operation, administration, and maintenance.

5. A method according to claim 4, further comprising:

i) providing each generic message interpreter with an operation, administration, and maintenance interpreter.

6. A method according to claim 1, wherein:

the source of generic messages is an applications development system.

7. A method according to claim 6, wherein:

the applications development system includes i) at least one man/machine interface (MMI) agent;

ii) an object server with predefined managed objects and a database management library;

iii) means for permitting a developer to create and define a user-defined managed object for the object server;

iv) an object server applications programmer interface (API) means coupled to the at least one MMI agent and coupled to the object server for hiding the internal architecture of the object server from the at least one MMI agent with respect to the predefined and user-defined managed objects; and v) a database which stores managed object related data, wherein, the user-defined managed objects utilize the database management library and the database which stores managed object related data, and provides the object server with user-defined managed objects without requiring the object server API to be rewritten.

8. A method according to claim 7, wherein:

at least one generic message interpreter is a predefined managed object.

9. A method according to claim 8, wherein:

said database includes data relating to native switch messages.

10. A method according to claim 1, wherein:

at least some messages from the source of generic messages are interpreted by the first generic message interpreter as multiple native switch messages.

11. An apparatus for controlling a plurality of different high speed digital telecommunications switches, each of which responds to a different set of native messages, with a single messaging protocol, said apparatus comprising:

a) at least one man/machine interface (MMI) agent;

b) an object server with predefined managed objects and a database management library;

c) an object server applications programmer interface (API) means coupled to said at least one MMI agent and coupled to said object server for hiding the internal architecture of the object server from said at least one MMI agent with respect to said predefined managed objects; and d) a database which stores managed object related data, wherein said API includes a set of generic messages for controlling the plurality of different high speed digital telecommunications switches, each of which responds to a different set of native messages, said object server includes a generic message interpreter, and said database includes data relating to native switch messages.

12. An apparatus according to claim 11, wherein:

said generic messages are arranged in subsets including a subset of messages for inband signalling, a subset of messages for connection services, and a subset of messages for media services.

13. An apparatus according to claim 12, wherein:

said database includes a superset of native switch messages for operation, administration, and maintenance.

14. An apparatus according to claim 13, wherein:

said API includes a superset of messages for operation, administration, and maintenance.

15. An apparatus according to claim 11, wherein:

said generic message interpreter interprets at least one of said generic messages into a plurality of native switch messages.

* * * * *